(12) United States Patent
Yuyama et al.

(10) Patent No.: US 9,511,000 B2
(45) Date of Patent: *Dec. 6, 2016

(54) MEDICINE FEEDING DEVICE AND A MEDICINE COUNTING DEVICE USING THE MEDICINE FEEDING DEVICE

(71) Applicant: YUYAMA MFG. CO., LTD., Toyonaka-shi, Osaka (JP)

(72) Inventors: Hiroyuki Yuyama, Toyonaka (JP); Naoki Koike, Toyonaka (JP); Mitsuhiro Mitani, Toyonaka (JP); Masao Fukada, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,302

(22) Filed: Sep. 11, 2015

(65) Prior Publication Data
US 2016/0000655 A1    Jan. 7, 2016

Related U.S. Application Data

(63) Continuation of application No. 13/813,928, filed as application No. PCT/JP2012/051040 on Jan. 19, 2012, now Pat. No. 9,155,681.

(30) Foreign Application Priority Data

Jan. 20, 2011 (JP) ................ 2011-010281
Mar. 1, 2011 (JP) ................ 2011-044113
Apr. 27, 2011 (JP) ................ 2011-099558

(51) Int. Cl.
*G07F 11/00*    (2006.01)
*A61J 7/00*    (2006.01)
(Continued)

(52) U.S. Cl.
CPC ............ *A61J 7/0084* (2013.01); *A61J 7/0076* (2013.01); *A61J 7/02* (2013.01); *B65B 5/103* (2013.01);
(Continued)

(58) Field of Classification Search
CPC ....... A61J 7/02; G07F 11/44; G07F 17/0092
See application file for complete search history.

(56) References Cited

U.S. PATENT DOCUMENTS

| | | | | |
|---|---|---|---|---|
| 6,161,721 A | * | 12/2000 | Kudera | G07F 11/16 221/277 |
| 8,827,112 B2 | * | 9/2014 | Yuyama | G07F 17/0092 221/224 |
| 8,924,008 B2 | * | 12/2014 | Yuyama | A61J 7/0084 221/237 |

(Continued)

FOREIGN PATENT DOCUMENTS

CN    201777395 U    3/2011
FR    2 072 180 A5    9/1971
(Continued)

OTHER PUBLICATIONS

EPO, the Extended European Search Report including the Supplementary European Search Report and the European Search Opinion issued on Nov. 17, 2015 in European Patent Application No. 12736231.7, total 8 pages.

*Primary Examiner* — Timothy Waggoner
(74) *Attorney, Agent, or Firm* — Masuvalley & Partners

(57) ABSTRACT

A medicine feeding device is configured by providing a first rotor that rotates around a first shaft, a second rotor that rotates around a second shaft, a partition wall extending from the second rotor towards the first rotor, a medicine discharge port provided on the outside of the second rotor, a medicine guide section located in the downstream of a movement section in the medicine transport direction, and a height regulator disposed between the movement section and medicine guide section. In addition, the width regulator that is disposed between the medicine guide section and the height regulator is further provided. Also, a medicine counting device is further provided with a medicine detection means for detecting the medicine that is supplied from the medicine discharge port, and a counting means (central control unit) for counting the medicines based on the detection performed by the medicine detection means.

19 Claims, 47 Drawing Sheets

(51) Int. Cl.
  *A61J 7/02*     (2006.01)
  *B65G 47/14*    (2006.01)
  *G07F 11/44*    (2006.01)
  *G07F 17/00*    (2006.01)
  *B65D 83/04*    (2006.01)
  *B65B 35/06*    (2006.01)
  *B65B 57/20*    (2006.01)
  *B65B 59/00*    (2006.01)
  *B65B 5/10*     (2006.01)

(52) U.S. Cl.
  CPC ............... *B65B 35/06* (2013.01); *B65B 57/20* (2013.01); *B65B 59/00* (2013.01); *B65D 83/04* (2013.01); *B65G 47/14* (2013.01); *B65G 47/1457* (2013.01); *B65G 47/1464* (2013.01); *G07F 11/005* (2013.01); *G07F 11/44* (2013.01); *G07F 17/0092* (2013.01); *B65G 2201/027* (2013.01)

(56) References Cited

U.S. PATENT DOCUMENTS

| | | | | |
|---|---|---|---|---|
| 8,985,389 | B2 * | 3/2015 | Yuyama | G07F 11/44 221/224 |
| 9,004,315 | B2 * | 4/2015 | Yuyama | B65B 35/06 221/224 |
| 9,155,681 | B2 * | 10/2015 | Yuyama | B65G 47/1464 |
| 2010/0205002 | A1 | 8/2010 | Chambers | |
| 2011/0301747 | A1 | 12/2011 | Chambers | |

FOREIGN PATENT DOCUMENTS

| | | |
|---|---|---|
| JP | H1-51403 B2 | 11/1989 |
| JP | H8-225142 A | 9/1996 |
| JP | 2000-203525 A | 7/2000 |
| JP | 3131582 B2 | 11/2000 |
| JP | 2002-338033 A | 11/2002 |
| JP | 2004-275550 A | 10/2004 |
| JP | 2008-127133 A | 6/2008 |
| JP | 2010076873 A | 4/2010 |
| TW | M308903 | 4/2007 |

\* cited by examiner (A)

(B)

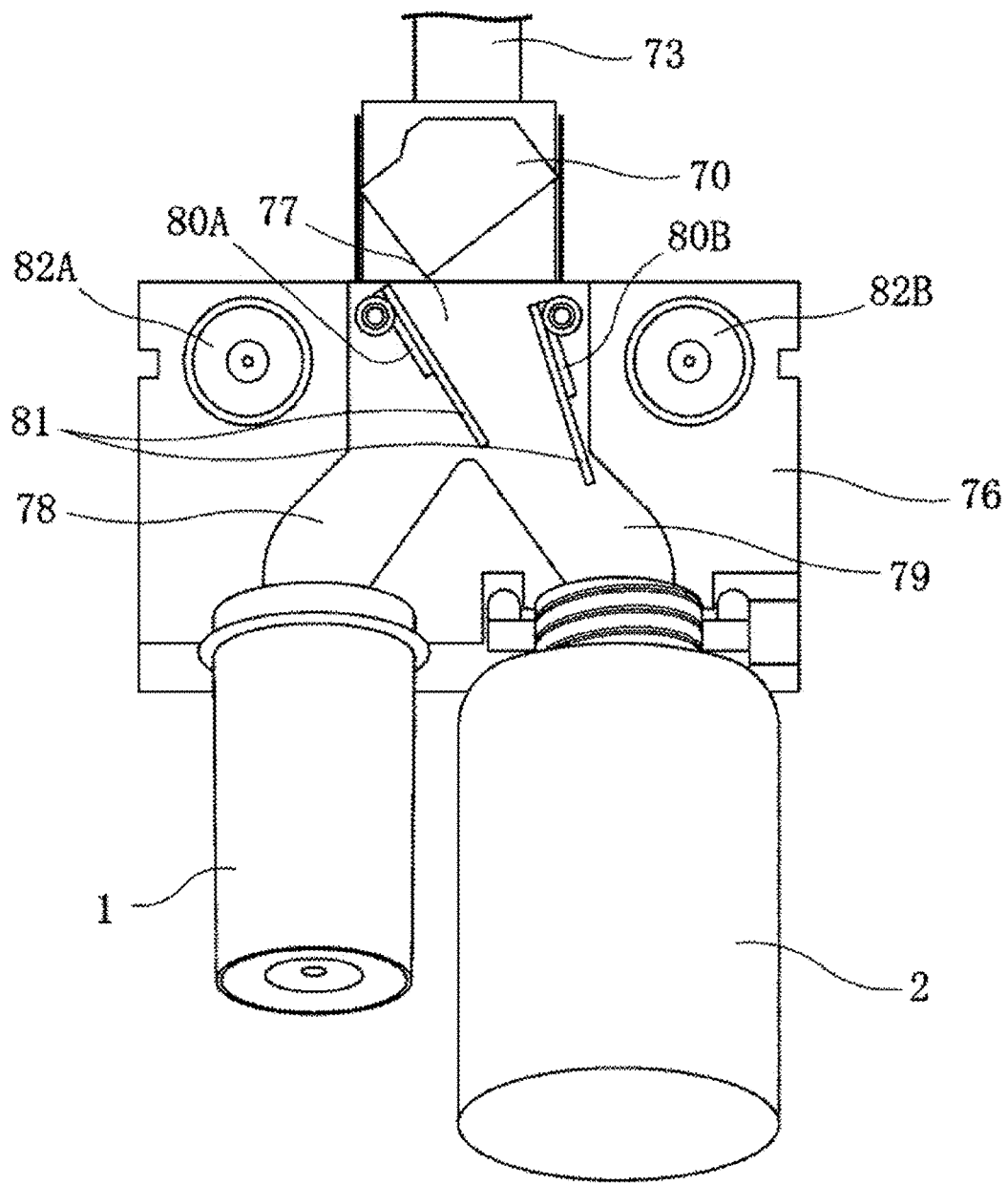

(A)

(B)

(A)

(B)

(A)

(B)

(C)

(A)

(B)

(A)

(B)

(A)

(B)

MEDICINE FEEDING DEVICE AND A MEDICINE COUNTING DEVICE USING THE MEDICINE FEEDING DEVICE

This application claims priority under 35 U.S.C. §120 as a continuation of U.S. patent application Ser. No. 13/813,928, filed Feb. 1, 2013, which is a national phase application under 35 U.S.C. §371 of International Application Serial No. PCT/JP2012/051040, filed on Jan., 19, 2012, and claims the priority under 35 U.S.C. §119 to Japan Patent Application No. 2011-010281, filed on Jan. 20, 2011, Japan Patent Application No. 2011-044113, filed on Mar. 1, 2011, and Japan Patent Application No. 2011-099558, filed Apr. 27, 2011 which are hereby expressly incorporated by reference in their entirety for all purposes.

TECHNICAL FIELD

The present invention relates to a medicine feeding device capable of supplying medicines of different shape or size such as tablets, capsules, etc. one by one, and a medicine counting device which prescribes by counting a predetermined number of the medicine using the medicine feeding device.

BACKGROUND OF THE INVENTION

A medicine counting device that counts many medicines has been described in Patent Document 1: Republic of China new patent Notice No. M308903. This medicine counting device consists of a central circular plate member rotated by a first drive means, and a circular ring member rotated by a second drive means. The rotational axes of each of the circular plate member and the circular ring member are made coaxial so as to be mutually planar, and they are rotated in opposite directions by each drive means. Also, a medicine guide section extending outwards is provided in the outer circumference of the circular ring member.

However, in this medicine counting device, a number of medicines that were not supplied to the medicine guide section are transported in the opposite direction on the circular ring member and on the circular plate member. Due to this, the medicine that moves from the plate member to the circular ring member collides with the medicine that is already moving on the circular ring member, and the medicine that was moved from the circular ring member to the plate member also collides with the medicine on the plate member. As a result, in case of a medicine that is in the form of a tablet made by compressing the medicine, there is a problem of occurrence of cracking and chipping.

On the other hand, Patent Document 2: Japanese Patent Application Publication No. 1-51403 (Translation of PCT Application) describes a feeder effecting supply by aligning small items. This feeder is provided with a first disk-shaped rotor that is rotated by a first drive means, and a second ring-shaped rotor that is rotated by a second drive means. The first axis of the first rotor is arranged so as to be inclined at a predetermined angle, and the second axis of the second rotor is arranged so as to extend in a vertical direction. Further, the first rotor is configured such that the part that is positioned at the top end due to inclination is positioned at the same height of the inner circumference of the second rotor. In addition, in the inner circumference of the second rotor, a frame wall is provided integrally so as to enclose the outer circumference of the first rotor.

In the feeder according to the Patent document 2, the feed material is moved from the upper edge to the second rotor by the rotation of the first rotor. Thereupon, with the help of a regulator provided on the second rotor, only a feed material of designated posture is passed through to the downstream side, and a feed material of different posture is dropped from the inner circumference of the second rotor onto the first rotor. Therefore, it is possible to prevent the feed materials, which are being supplied, from colliding with each other.

However, when such a feeder is used for feeding medicines, two or more feed materials may pass through the regulator at the same time, and be fed to the guide section at the outlet in a state where the feed materials are lined up in two rows in the radial direction. As a result, there is a problem of occurrence of clogging at the entrance of the guide section. Moreover, if the medicine is a tablet of non-circular in a planar view or a capsule wherein a medicine is housed inside the capsule, even if they are fed one by one, for example, there is a problem of occurrence of clogging at the entrance of the guide section, or inside the guide section, depending on the moving posture.

The present invention is proposed in view of the above aforementioned problems. The present invention provides a medicine feeding device wherein medicines of different shapes and sizes can be fed one by one with certainty and without causing cracking and chipping. Secondly, the present invention provides a medicine counting device, using the medicine feeding device of the present invention that can dispense predetermined number of medicine with certainty.

SUMMARY OF THE INVENTION

To solve the problems mentioned above, a medicine feeding device of the present invention is provided with:
a first rotor that is configured to rotate around a first axis;
a second rotor in annular shape that is configured to rotate around a second axis extending in a direction different from that of the first axis; and
a partition wall extending from an inner circumference of the second rotor toward an outer circumference of the first rotor;
wherein a medicine fed to the first rotor is transferred by rotation of the first rotor to a transfer part of the second rotor, and transferred medicine is transported to a downstream side in a rotating direction by rotation of the second rotor,
and further provided with:
a medicine discharging port provided outside in a radial direction of the second rotor;
a medicine guiding section that is configured to guide a medicine on the second rotor to the medicine discharge port, the medicine guiding section including
an inner guide provided in downstream in a medicine transport direction of a transfer part of the second rotor and extending from an inner circumference of the second rotor towards the medicine discharge port, and
an outer guide positioned outer side in a radial direction of the second rotor with respect to an inner guide and having a gap that is roughly same as a width of a medicine; and
a height regulator provided between a transfer part of the second rotor and the medicine discharging port and positioned so as to have a gap that is roughly same as a height of a medicine from an upper surface of the second rotor.

Here, the second axis extending in a direction that is different from that of the first axis implies that the first axis and the second axis are neither parallel nor identical.

As another embodiment, a medicine feeding device can be provided with:
a first rotor that is configured to rotate around a first axis;
a second rotor that is configured to rotate around a second axis, which extends in a direction that is different from that of the first axis, and located in an outside of the first rotor and forming a ring as viewed from an axial direction of this second axis, and arranged such that an outer circumference of the first rotor forms a small step with respect to an inner circumference of the second rotor; and a partition wall extending from an inner circumference of the second rotor toward an outer circumference of the first rotor;

wherein a medicine fed to the first rotor is transferred by rotation of the first rotor to a transfer part of the second rotor, and a transferred medicine is transported to a downstream side of a rotating direction by a rotation of the second rotor, the medicine feeding device further provided with:

a medicine discharge port provided in a radially outward direction of the second rotor; and a medicine guiding section that includes an inner guide provided in downstream of a transfer part of the second rotor in a medicine transport direction and extending from an inner circumference of the second rotor toward the medicine discharge port, and an outer guide positioned on an outside of a radial direction of the second rotor with respect to the inner guide and having a gap that is roughly same as a width of a medicine, and the medicine guiding section guides a medicine on the second rotor to the medicine discharge port.

In this medicine feeding device, by the rotation of the first rotor, the medicine is moved onto the second rotor from the movement section that has a small step with the second rotor. Thereupon, for the medicine that has climbed on the second rotor, a height that it can pass through is regulated by the height regulator. Therefore, a medicine on the top of medicines moving in a vertically stacked state is dropped onto the second rotor or otherwise dropped from the inner circumference onto the first rotor by coming in contact with the height regulator. Moreover, the medicine that has passed through the height regulator passes through the medicine guide section consisting of a pair of guides positioned by providing a gap roughly same as the width of the medicine, and is supplied to the discharge port one by one. During this, if two or more medicines are supplied together to the entrance of the medicine guide section, the medicine positioned on the inner circumference of the second rotor comes in contact with the inner guide and is dropped from the inner circumference of the second rotor on to the first rotor.

Thus, in the medicine feeding device of the present invention, it becomes possible to transport the medicines to the upper side of the second rotor with the help of the height regulator by lining up one by one without piling up, and align the medicines one by one with the help of the medicine guide section and discharge to outside through the medicine discharge port. As it is of a configuration wherein many medicines that are transported are dropped on the first rotor without being held back at the height regulator or medicine guide section, clogging can be reliably prevented. Because a mutual collision of a large number of medicines can also be prevented, it is possible to reliably prevent the occurrence of chipping and cracking of the medicines. In addition, in this medicine feeding device, if a medicine is of a height that can pass through between the second rotor and the height regulator, and of a width so as to pass through medicine guide section, even if the shape of the medicine is different, it can be moved and supplied without adjustment. Therefore, it is possible to increase the versatility of the supply of medicine.

In this medicine feeding device, it is preferable to further comprise a width regulator provided between the medicine guiding section of the second rotor and the height regulator, and disposed outside in a radial direction of the second rotor from an inner circumference of the second rotor with a predetermined gap, and is configured to regulate a transport width of a medicine in a space between an inner circumference of this second rotor and the width regulator. In this way, a medicine that passes through the height regulator, on coming into contact with the width regulator, which regulates the transport width of the second rotor, is moved to the inner circumference side of the second rotor, and only a medicine of predetermined width can pass to the downstream side of this width regulator.

Due to this, by setting the transporting width of the second rotor by this width regulator, among the medicines that were moving by aligning in the radial direction, only a medicine on the outside that contacts the width regulator will be able to pass through, whereas the other medicine that is not in contact with the width regulator will be dropped from the inner circumference of the second rotor onto the first rotor. Further, in case of a medicine that is non-circular in a planar view, by setting the transport width of the second rotor smaller than the width of the medicine, only a medicine of predetermined width in which the longitudinal direction is extended along the medicine transport direction will be able to pass through, while a medicine of different posture will be dropped from the inner circumference of the second rotor onto the first rotor. Therefore, it becomes possible to reliably prevent the occurrence of clogging at the inlet of the medicine guide section located on the downstream side of medicine transport direction.

In this case, it is preferable that a transport width of the second rotor is adjustable by the width regulator. In this way, adjustment can be made so that a medicine with a different width can pass through one by one. As a result, the supply of medicines having a variety of different shapes and sizes can be achieved.

It is preferable to adjust the transport width of the second rotor to between ½ or more of a medicine width and a width equal to the medicine width. In this way, a medicine that is non-circular in a planar view cannot pass through unless the longitudinal direction is in an extended state along the direction of medicine transport. Therefore, it is possible to reliably prevent the occurrence of clogging at the inlet of the medicine guide section.

It is further preferable that the width regulator and an outer guide of the medicine guiding section are integrally provided for allowing a transport width of the second rotor and a space between each of guides of the medicine guiding section to be simultaneously adjustable. In this way, it becomes possible to improve the workability relating to adjustment, and also to reduce the number of parts.

It is preferable that a regulated height between the height regulator and the second rotor is adjustable. In this way, adjustment can be made so that a medicine with a different height can pass through one by one. As a result, the supply of medicines having a variety of different shapes and sizes can be achieved.

Specifically, it is preferable that a regulated height between the height regulator and the second rotor is adjustable, a first medicine detector to detect a medicine passing through the height regulator and a second medicine detector to detect a medicine passing through the medicine guiding section are provided, and the medicine feeding device has a configuration that the height regulator is gradually raised; the height regulator is stopped when a passage of a medicine is detected by the first medicine detector; an outer guide of the medicine guiding section and the width regulator are gradually moved in a radially outward direction of the second rotor; and an outer guide of the medicine guiding section and the width regulator are stopped when a passage of a medicine is detected by the second medicine detector. In this way, by enabling automatic adjustment of height regulator, outer guide of the medicine guide section and the width regulator respectively, the convenience of use can be greatly improved.

As a specific configuration of such an automatic adjustment, it is preferable to comprise a memory means to memorize a regulated height when the height regulator is vertically moved to allow a medicine to pass through, the regulated height being memorized in association with the medicine, wherein a regulated height of the height regulator is configured to be adjusted by reading a regulated height of the height regulator associated with a medicine to be supplied from the memory means.

In addition, it is preferable to comprise a memory means to memorize a transport width when the width regulator is moved to allow a medicine to pass through, the transport width being memorized in association with the medicine, wherein a transport width of the width regulator is configured to be adjusted by reading a transport width of the width regulator associated with a medicine to be supplied from the memory means.

Furthermore, it is preferable that an inner guide of the medicine guiding section is provided with an inclined edge inclining upward at an end section located in an inner circumference of the second rotor. In this way, the medicine that was transferred in a projecting state from the inner circumference of the second rotor to inside can be reliably prevented from being clogged at the entrance of the medicine guide section. This is useful especially when a medicine that is non-circular in a planar view is transported with a slight tilt.

Furthermore, it is preferable that an angle between a first axis of the first rotor and a second axis of the second rotor is configured to be mutually variable. In this way, the volume of the medicine loading space enclosed by the first rotor and the partition wall can be varied depending on the loading quantity of the medicine. Moreover, it is possible to reliably move the medicine to the transfer part by the rotation of the first rotor, and to move them onto the second rotor.

It is preferable that an annular rib is provided in an inner circumferential edge of the second rotor so as to come in contact with a medicine transported on the second rotor. With this, even if a medicine that is transported on the second rotor is not flat, because the medicine comes in contact with two points that are the second rotor and the rib, the medicine can be prevented from falling on the first rotor due to a change of the direction of the medicine.

It is preferable to provide a means to reverse the second rotor after completion of supply of medicine so as to return medicine remaining on the second rotor onto the first rotor.

In such case, it is preferable to provide
a means for detecting a medicine transported on the second rotor when the second rotor is rotated in a reverse direction for a certain period followed by rotating the first rotor and the second rotor in a forward direction; and
a means for notifying if there is a remaining medicine based on a detection signal from a means for detecting a medicine transported on the second rotor.

In this way, it is possible to confirm the presence of remaining medicine inside the medicine feeding device without having to visually monitor, and to prevent intermixing (contamination) when different medicines are loaded.

It is possible that the first rotor is able to be raised or lowered so as to move closer to and be separate from the second rotor. In this case, it is possible the first rotor be movable parallel to a second axis of the second rotor. Also, it is possible the first rotor be movable parallel to a first axis of the first rotor. Further, it is possible that the first rotor be moved along an arc. In this case, it is preferable that the arc be provided in the plane formed by the first axis of the first rotor and the second axis of the second rotor.

It is preferable to provide a medicine detector for detecting a medicine transported on the second rotor, and when a medicine transported on the second rotor is not detected by the medicine detector, the first rotor is raised so as to move closer to the second rotor until a medicine transported on the second rotor is detected by the medicine detector.

It is also preferable that at a time of supply of medicine to the first rotor, the first rotor is lowered so as to separate from the second rotor.

The medicine counting device using this medicine feeding device comprises a medicine detector for detecting a medicine that is discharged from the medicine discharge port; and a counting means for counting number of medicines supplied based on a detection by the medicine detector.

This medicine counting device can reliably supply medicines of different shape or size one by one from the medicine discharge port to the outside, and reliably count that number with a medicine detection means and a counting means. Accordingly, it is possible to reliably dispense a predetermined number of a medicine and prescribe it to patients.

In this medicine counting device, it is preferable to further provide a switching valve unit comprising a medicine passage that is divided into a first passage and a second passage, and a switching valve that is able to switch a discharge destination of a medicine discharged from the medicine guiding section to either the first passage or the second passage.

It is preferable that the switching valve is provided with a first swing member for opening and closing the first passage and a second swing member for opening and closing the second passage,
wherein each swing member is provided with an elastic part that is elastically deformable, and
when both the first and the second passages are closed by each of the swing members, the elastic members will mutually contact and elastically deform, making it possible to hold a medicine in an upstream side, and
if the first passage is opened by the first swing member in this state, due to elastic reversion of an elastic part of the second swing member, it becomes possible to discharge a medicine to the first passage, or
if the second passage is opened by the second swing member, due to elastic reversion of an elastic part of the first swing member, it becomes possible to discharge a medicine to the second passage.

In this way, if more than the predetermined number of a medicine is dispensed, by maintaining both the first passage and the second passage in a closed state with the respective swing members, the excess medicine can be temporarily retained in its upstream side, and thus prevent dispensing of excess medicine. By opening the first or second passage by operation of the first or second swing member respectively, it is possible to elastically restore the elastic part of the other second or first swing member, and force the retained medicine to the opened first passage or second passage. Therefore, mixing at the closed second or first passage can be reliably prevented.

It should be noted that the configuration of providing medicine passages and switching valve is not limited to a medicine counting device, and can be used in any medicine dispensing device where it is possible to dispense required amount as per the medicine prescription data.

In the medicine feeding device according to the present invention, the medicine moved by the second rotor will not be held back in the height regulator or medicine guide section, and because it is a configuration wherein the medicine is made to drop on the first rotor by utilizing the step between the first and second rotors, it is possible to reliably prevent the occurrence of a jam. Because a mutual collision of a large number of medicines can also be prevented, it is possible to reliably prevent the occurrence of chipping and cracking of the medicines. Moreover, in this medicine feeding device, if a medicine is of a height that can pass through between the second rotor and height regulator, and of a width that can pass through medicine guide section, even if the shape of the medicines is different, the medicines can be moved and supplied without adjustment. Therefore, it is possible to increase the versatility of the supply of medicine.

Also, by providing a width regulator between the medicine guide section of the second rotor and height regulator for regulating the transport width of the medicine between the inner circumference of the second rotor, because a medicine is made to be transported one by one to the medicine guide section, it is possible to prevent clogging at the inlet of the medicine guide section. In case of a medicine that is non-circular in a planar view, since the width regulator will be able to allow passage of the medicine having a specific width wherein the longitudinal direction is extended along the medicine transport direction, and the other medicine will be dropped on the first rotor from the inner circumference of the second rotor, it is possible to reliably prevent clogging at the inlet of the medicine guide section.

Thus, since a medicine counting device using the medicine feeding device of the present invention can reliably supply medicines of different shapes or sizes one by one from medicine discharge port to outside and count the quantity with a medicine detection means and a counting means, it becomes possible to reliably dispense predetermined number of medicine and prescribe to patients.

BRIEF DESCRIPTION OF THE DRAWINGS

The present disclosure is described in conjunction with the appended figures:

FIG. 10C is a front view of the state of recovery to recovery container.

DETAILED DESCRIPTION OF EMBODIMENTS

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims.

Figure 1:
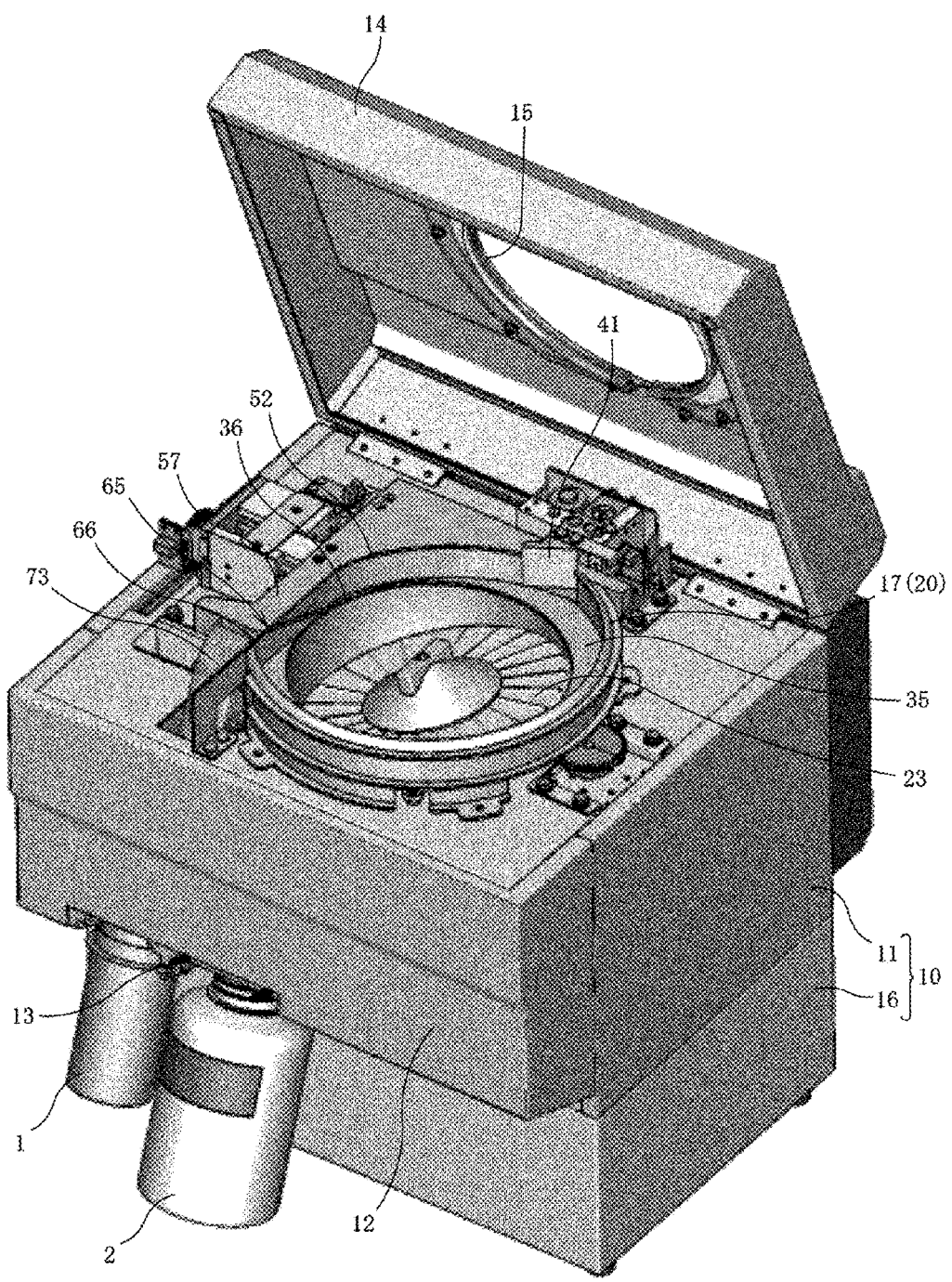
FIG. 1 is a perspective view showing a medicine counting device using the medicine feeding device of the present invention.

FIG. 1 shows a medicine counting device using a medicine feeding device according to an embodiment of the present invention. This medicine counting device, by being provided with a medicine feeding device, switching valve unit 76 and a central control unit 83 that functions as a counting means, automatically adjusts the mechanism of the medicine feeding device, supplies medicines of different shapes and sizes one by one, and counts.

Figure 2:
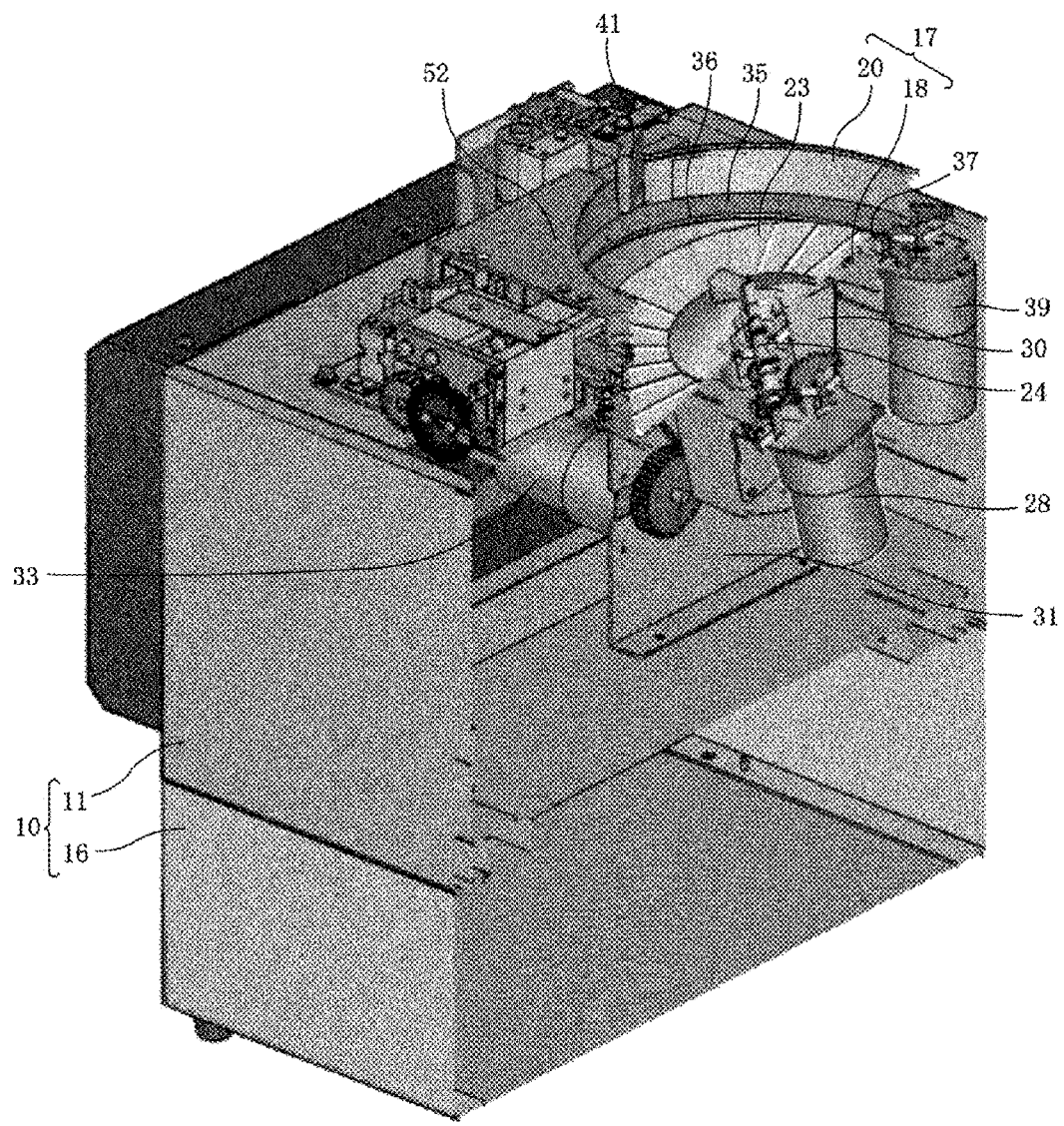
FIG. 2 is a cross-sectional perspective view of main unit in FIG. 1.

As shown in FIG. 1 and FIG. 2, the outer body 10 of the medicine counting device is provided with an exterior body 11 located on the upper side, and a stand 16 located in the lower side. Exterior body 11 is a casing that is closed on all sides and at top and bottom, and its front cover 12 bulges further in the front direction than frame 16. In the front cover 12, on the left hand side of the diagram, a container mounting section 13 has been provided for attaching a container 1 for handing over to patient and a recovery container 2 for storing medicines. A rotatable top cover 14 is provided on the rear side of the exterior body 11. Provided to this top cover 14 is a loading port 15 for exposing the inside of a frame body 17 (described later). Frame 16 is the casing for upper end opening where the exterior body 11 is disposed at the top. This frame 16 is used, as needed, for disposing the exterior body 11 at a predetermined height such that containers 1 and 2 attached to the exterior body 11 do not contact a shelf or the like that is a mounting surface.

Figure 3:
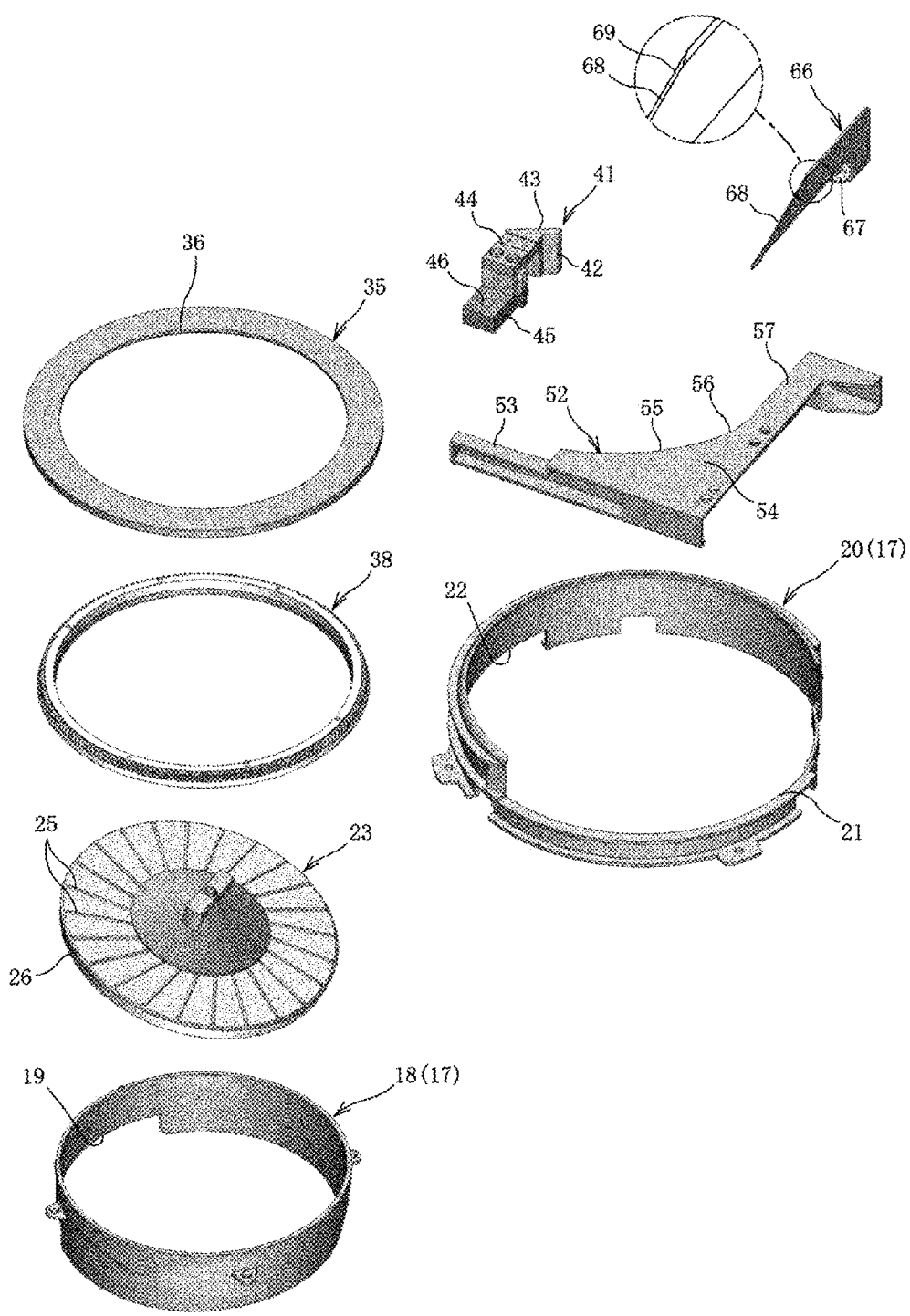
FIG. 3 is a dismounted perspective view showing various rotors and various regulators.

As shown in FIG. 3, the medicine feeding device is provided with a substantially cylindrical frame 17, a disc-shaped first rotor 23, a ring-shaped second rotor 35, a height regulator 41 to regulate the height of the medicine that is supplied, a width regulator 52 to regulate the transport width of the second rotor 35, and a medicine guide section 65 comprised of an inner guide 66 and an outer guide 57. Thereupon, in this embodiment, the width regulator 52 and the outer guide 57 of the medicine guide section 65 are configured from a single resin product.

Figure 4:
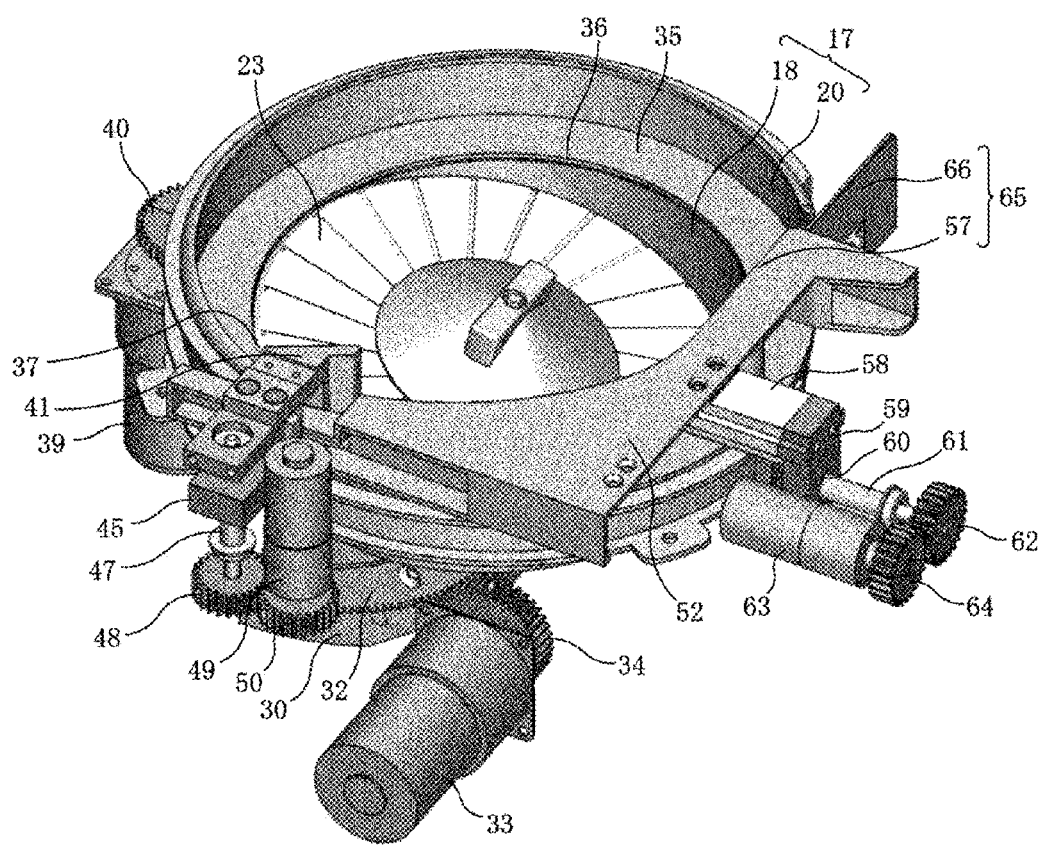
FIG. 4 is a perspective view showing the configuration of the medicine feeding device.
Figure 5:
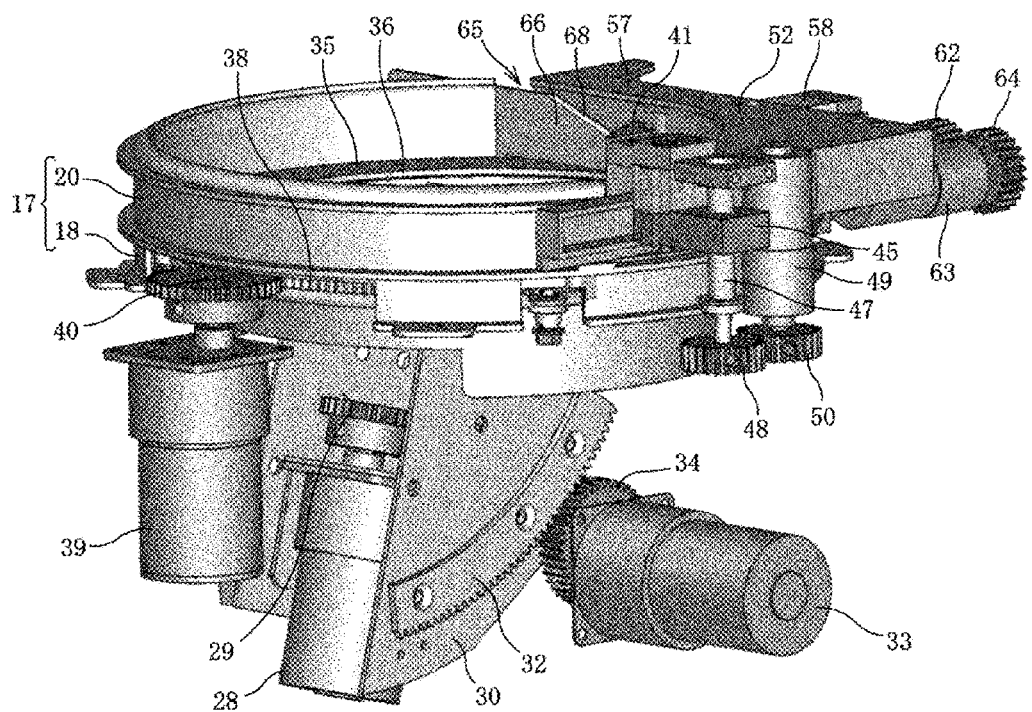
FIG. 5 is a perspective view of the medicine feeding device viewed from a different direction.

The body frame 17, as shown in FIG. 3, FIG. 4 and FIG. 5, consists of a partition wall 18 covering the outer circumference of the first rotor 23, and an outer wall 20 covering the outer circumference of the second rotor 35. These are fixed at top and bottom respectively with respect to the top plate of the exterior body 11. The partition wall 18 is substantially cylindrical and extending from the inner circumference 36 of the second rotor 35 to the outer circumference of the first rotor 23, and partitions the space between these. In one part on the lower side of the outer circumference of this partition wall 18 is provided with a notch 19 for preventing interference from a rotary bracket 30 that is used for securing the first drive motor 28 of the first rotor 23. The outer wall 20 is cylindrical intended for preventing falling off of medicine on the second rotor 35. In this outer wall 20, a first notch 21 is provided in one part on the upper side of the outer circumference and a second notch 22 is provided in one part on the lower side of the outer circumference. The first notch 21 is intended for exposing the second rotor 35 as well as to dispose the width regulator 52 and the medicine guide section 65. The second notch 22 is intended for laterally exposing the gear member 38 of the second rotor 35. Moreover, frame 17, outer wall 18 and the partition wall 20 may also be formed as an integral unit.

Figure 6A:
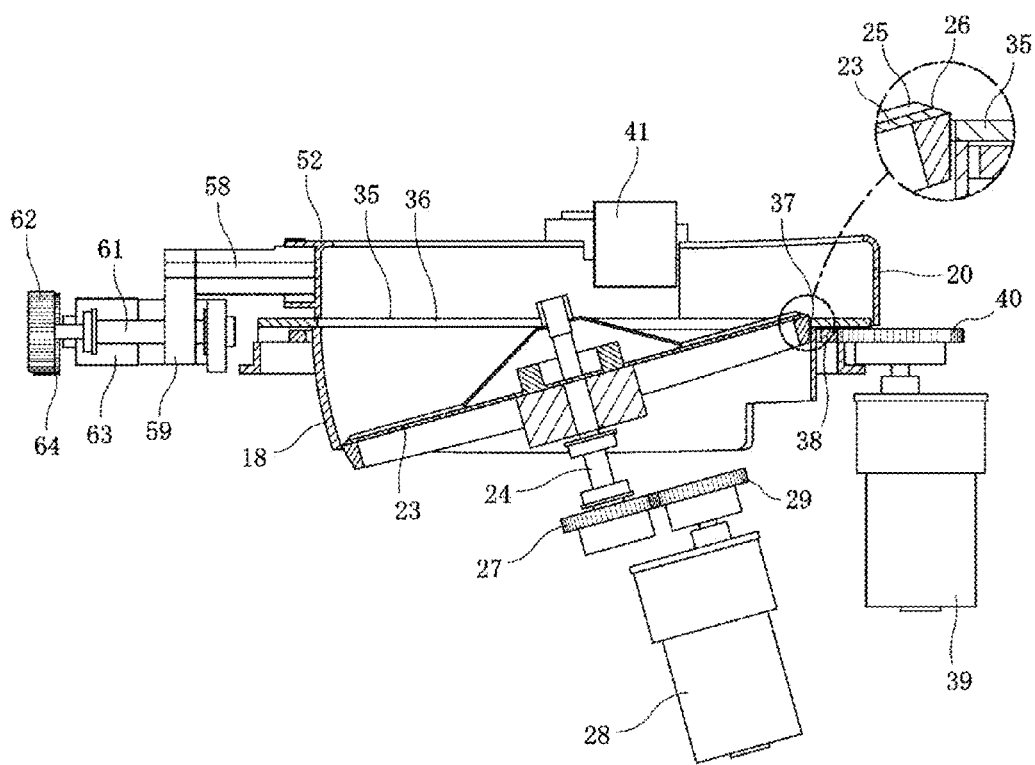
FIG. 6A is a cross-sectional view showing the configuration of the medicine feeding device.
Figure 6B:
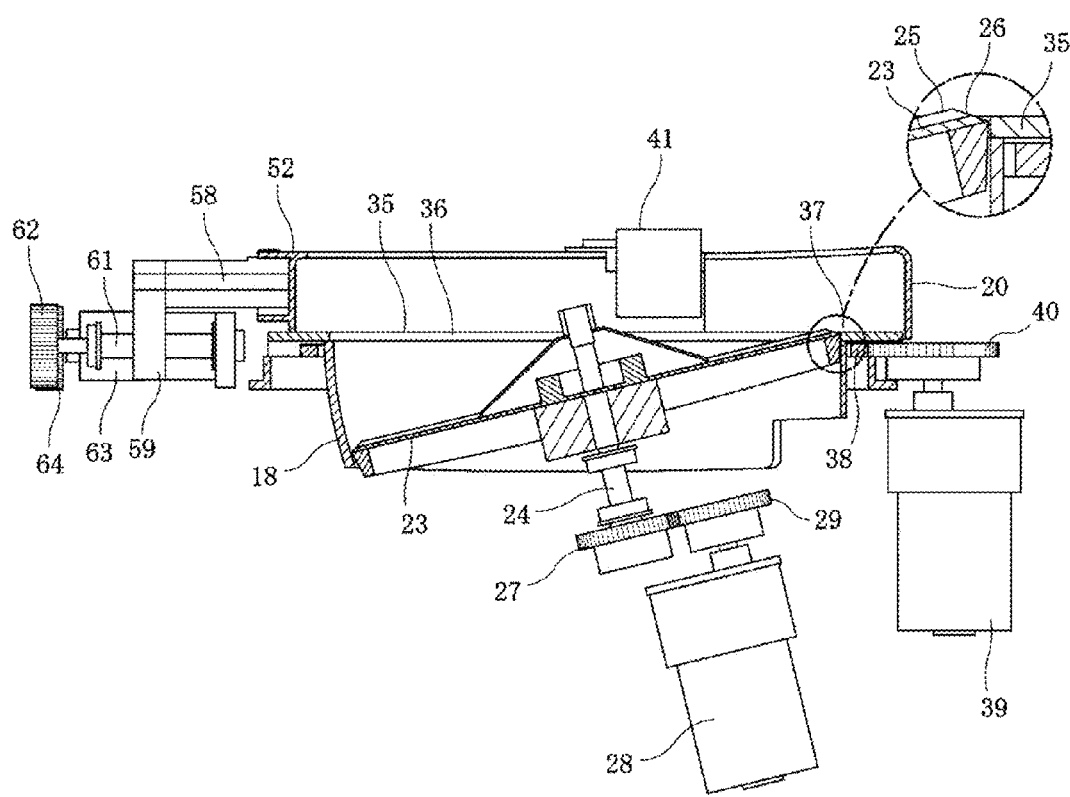
FIG. 6B is a cross-sectional view showing a state after adjusting the positions of various members of the medicine feeding device.

The first rotor 23 is of disk shape, and is disposed inclined in this partition wall 18 so as to seal the bottom of the partition wall 18. That is, as shown in FIG. 6A and FIG. 6B, the first shaft 24 of the first rotor 23 is arranged so as to incline at a predetermined angle with respect to the vertical direction. On the upper surface of this first rotor 23 is provided with a plurality of convex portions 25 in a radial pattern to function as resistance for moving the medicine (rolling suppression). Provided in the outer circumference of the first rotor 23 is a slope section 26 inclining downwards in a radially outward direction. This slope section 26 is disposed with a predetermined angle of inclination such that the inner circumference edge at the top end is located in the upstream of the second rotor 35, and outer circumference edge at the lower end is located in the downstream of the inner circumference edge.

A gear 27 coupled to the lower end of the first shaft 24 is provided to this first rotor 23. Accordingly, this gear 27 is configured to mesh with a gear 29 connected to the output shaft of the first drive motor 28 which is the first drive means, so that it can rotate around the first shaft 24. The first shaft 24 and first drive motor 28 are attached to the rotary bracket 30. A bearing for the guide (not shown) is disposed on the side of this rotary bracket 30, and this bearing is engaged with the guide groove of a mounting bracket 31 that is fixed to the exterior body 11. As shown in FIG. 4 and FIG. 5, an arc-shaped gear strip 32 is fixed on the side of the rotary bracket 30. Engaged to this gear strip 32 is the gear 34 of an angle adjusting motor 33 which is an angle adjusting means. By operating this angle adjusting motor 33, the rotary bracket 30 can be rotated against the mounting bracket 31. When the rotary bracket 30 is rotated, the first rotor 23 rotates together with the first drive motor 28, and the angle of inclination of the first rotor 23 can be adjusted. This adjustment of the angle of inclination is configured to take place with the upper end of the first rotor 23 as the supporting point.

The second rotor 35 is in the form of a ring positioned above the first rotor 23, and disposed so as to be able to rotate at the upper end of the partition wall 18. As shown in FIG. 6A and FIG. 6B, the second rotor 35 is horizontally disposed such that the second shaft (not illustrated) can extend in a vertical direction. With this, the second shaft of the second rotor 35 extends by intersecting in a direction that is different from that of the first shaft 24 of the first rotor 23 (a direction that is neither parallel nor identical). The angle between these shafts can be varied relatively by the operation of the angle adjusting motor 33 described above. In addition, the second rotor 35, when viewed from the axial direction of the second shaft, is located outside of the first rotor 23, and the first rotor 23 is positioned within the inner circumference 36. As for the inner circumference 36 of the second rotor 35 and the outer circumference of the first rotor 23, due to the inclination of the first rotor 23, the outer circumference of the first rotor 23 becomes lower than the inner circumference 36 of the second rotor 35, and a step of predetermined height is formed in that gap. As for this step, due to the inclination of the first rotor 23, the portion located at the bottom edge in the vertical direction that is on the left side of the drawing is largest, and the portion located at the upper edge in the vertical direction that is on the right side of the drawing is the smallest.

Accordingly, the portion with smallest step, with the rotation of the first rotor 23, constitutes the movement section 37 where a medicine that is supplied to the receiving space demarcated by the first rotor 23 and the partition wall 18 will be transferred to the second rotor 35 from the first rotor 23. The movement section 37 of this embodiment is configured in such a way wherein the inner circumference 36 of the second rotor 35 opens a gap with the outer circumference of the first rotor 23 to such an extent that a medicine will not be lost, and is positioned at substantially the same height. However, as for setting the height of the inner circumference 36 of the second rotor 35 and outer circumference of the first rotor 23 in the movement section 37, as long as it is possible for a medicine to transfer from the first rotor 23 to the second rotor 35, the inner circumference 36 of the second rotor 35 may be located either above or below the outer circumference of the first rotor 23.

As shown in FIG. 3 and FIG. 5, a gear member 38 in the form of a ring is fixed to the underside of this second rotor 35. This gear member 38 is engaged with the gear 40 of the second drive motor 39, which is the second drive means, through the second notch 22 of the outer wall 20. The outer circumference of the gear member 38 is supported by a support member, which is not shown. With this, the upper rotating member is rotated around the second axis without having to move along the second axis.

Figure 7A:
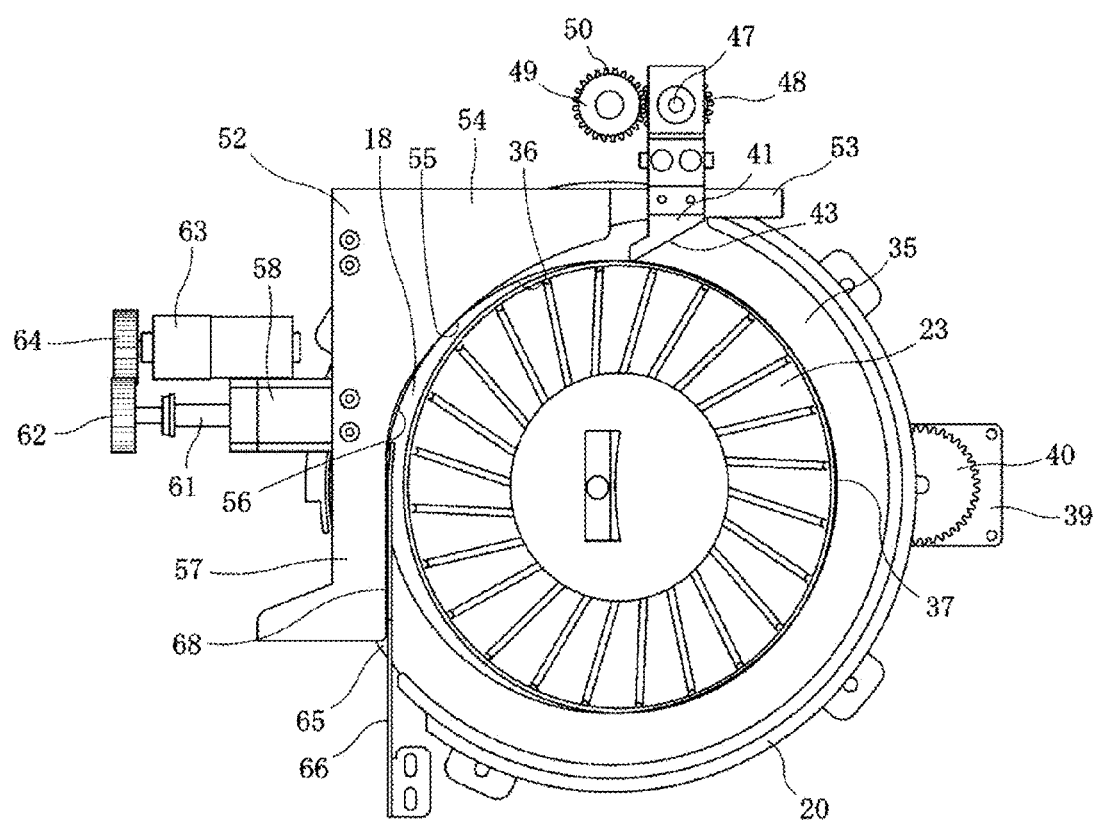
FIG. 7A is a plan view showing the configuration of the medicine feeding device.
Figure 7B:
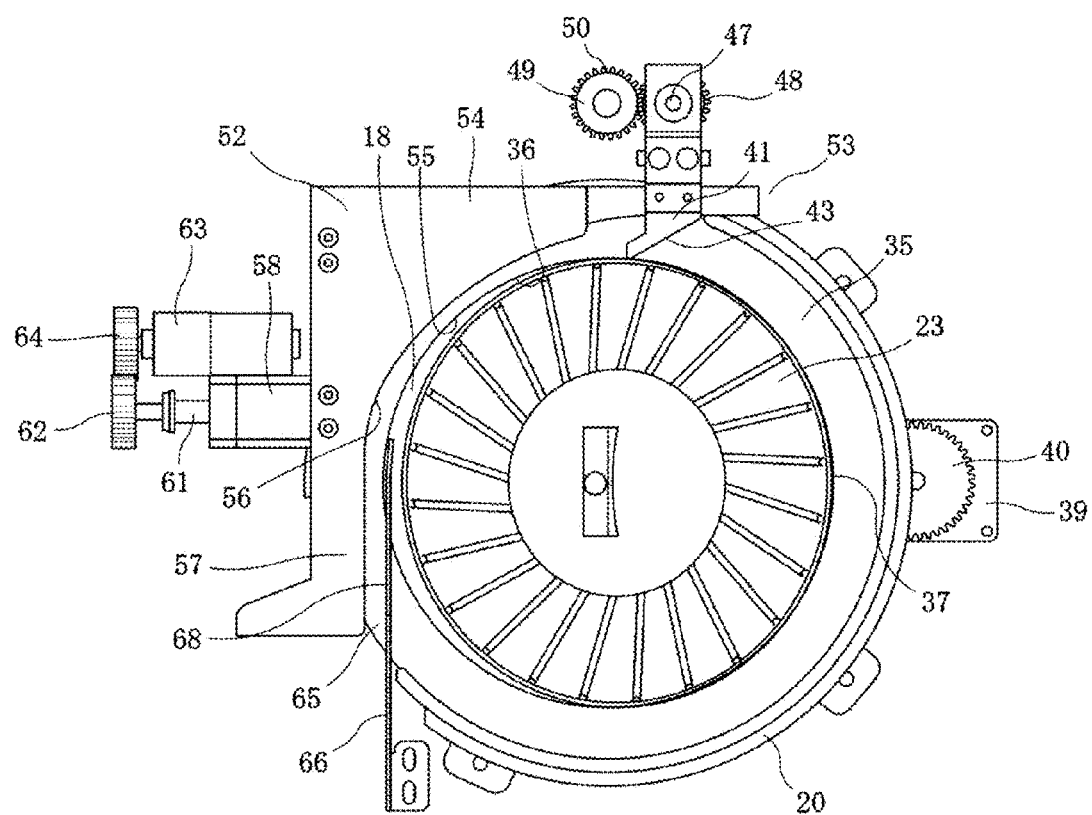
FIG. 7B is a plan view showing a state after adjusting the position of width regulator.

The height regulator 41 is disposed so as to be positioned on the downstream of rotation (medicine transfer) direction with respect to the movement section 37 of the second rotor 35. The height regulator 41 consists of a height regulating member 42, an erection member 44 and an operation receiving member 45. As shown in FIG. 7A and FIG. 7B, the height regulating member 42 is disposed so as to be positioned above the second rotor 35. This height regulating member 42 is provided with a guide surface 43 that extends from the outer circumference of the second rotor 35 to the inner circumference 36 and that is also inclined at a predetermined angle along the direction of medicine transport. The erection member 44 is intended to couple with the height regulating member 42 and to dispose this height regulating member 42 on the second rotor 35 striding over the width regulator 52. The operation receiving member 45 is intended to couple with the erection member 44 and to receive power via this erection member 44 for vertically moving the height regulating member 42. This operation receiving member 45 is provided with a screw hole 46 for receiving the power in a manner such that it penetrates in the vertical direction.

A screw member 47 has been inserted through the screw hole 46 of the height regulator 41. This screw member 47 is supported by the bracket fixed to the top plate of exterior body 11 such that it can rotate but cannot move along the axial direction. Further, gear 48 is coupled to the lower end of the screw member 47. This gear 48 is engaged with the gear 50 of the height adjusting motor 49, which is a height adjusting means. The screw member 47 is rotated by operating the height adjusting motor 49, and the height of the gap between the height regulator 41 and the top surface of the second rotor 35 is adjusted such that a gap that is approximately equal to the medicine height is provided. Disposed in the downstream side of the height regulator 41 is a medicine detection sensor 51 as the first medicine detection means for detecting the medicine that has passed the lower part of this height regulator 41.

The width regulator 52 is disposed on the second rotor 35 so as to be positioned further downstream of the height regulator 41 in the medicine transport direction. This width regulator 52 is provided with a rectangular section 53 extending in a tangential direction with respect to the outer circumference of the second rotor 35. This rectangular section 53 is disposed so as to circumvent the erection member 44 of the height regulator 41, and to be able to directly move without interfering with this erection member 44. The width regulator 52 is coupled to a width regulating section 54 in the downstream of the medicine transport direction of the rectangular section 53. This width regulating section 54 is provided with a first curved section 55 having a diameter larger than that of the inner circumference 36 of the second rotor 35. With this, the gap with the inner circumference 36 of the second rotor 35 is configured such that the transport width in only part of the radial direction becomes narrowest. Here, the transport width refers to a width (area) between the inner circumference 36 of the second rotor 35 and the first curved section 55 where a medicine can pass through. Further, the width regulator 54 is provided with a second curved section 56 that is connected such that the transport width in the downstream of medicine transport direction of the first curved section 55 becomes gradually wider. And, the width regulator 52 is connected to an outer guide 57 that constitutes the medicine guide section 65 in the downstream of the medicine transport direction of the width regulating section 54. This outer guide, in addition to extending tangentially with respect to the second curved section 56, is configured so as to extend orthogonally with respect to the rectangular section 53.

Connected to the width regulating section 54 of this width regulator 52 is a coupling member 58 extending to the rectangular section 53 in a parallel fashion. An operation receiving member 59 is connected to this coupling member 58 similarly to the height regulator 41. A screw member 61 is inserted through the screw hole 60 of the operation receiving member 59, and this screw member 61 is supported by the bracket fixed to the top plate of exterior body 11 such that it can rotate but cannot move along the axial direction. Also, gear 62 is coupled to the outer end of the screw member 47, and this gear 62 is engaged with a gear 64 of the width adjusting motor 63, which is a width adjusting means for moving the width regulator 52 in horizontal direction. When the width regulator 52 is moved outside of the second rotor 35 by the width adjusting motor 63, the transport width between the width regulating section 54 and the inner circumference of the second rotor 35, and also the gap between the outer guide 57 and the inner guide (described later) 66, can be widened. If moved inside with respect to the second rotor 35, it becomes possible to narrow the transport width of the second rotor 35, and also the gap between each guide 57 and 66. Thereupon, in this embodiment, the diameter of the first curved surface portion 55 of the width regulating section 54 (radius of curvature) is set such that the width of the gap between the outer guide 57 and inner guide 66 will be approximately double (2W) the transport width W between the inner circumference 36 of the second rotor 35. Accordingly, in this embodiment, the transport width W is configured to be ½ of the width of the medicine being transported. It should be noted that, in case of a medicine having an oval shape in a planar view or elliptical shape in a planar view, the medicine width refers to the short side direction. Further, it is preferable that the transport width W is not limited to ½ the width of the medicine, and is greater than ½ the width of the medicine and smaller than the width of the medicine.

The medicine guide section 65 is intended for guiding a medicine passing through the width regulation section 54 of the width regulator 52 to the medicine discharge member 73 (described later) that is the medicine discharge port. This medicine guide section 65, shown in FIG. 3, FIG. 7A and FIG. 7B, is disposed on the second rotor 35 so as to be located further downstream in the medicine transport direction than the width regulating section 54 of the width regulator 52. The inner guide 66 of the medicine guide section 65 is disposed such that, in addition to being parallel to the outer guide 57 in the radially inward direction of the second rotor 35, it also extends in the tangential direction with respect to the inner circumference 36 of the second rotor 35. The inner guide 66 extends towards the medicine discharge member 73, and its end is provided with a bracket section 67 that is fixed to the top plate of the exterior body 11. The gap between the guides 57 and 66 of this medicine guide section 65 is adjusted so as to be approximately same as the medicine width by driving the width adjusting motor 63. Also, an inclined edge 68 inclining upwards at a predetermined angle is provided to the inner guide 66 at the inner end located in the inner circumference 36 of the second rotor 35 above the step between the first rotor 23 and second rotor 35. The inner surface side of this inclined edge 68 is made as the inclining surface 69 that inclines with a downward slope.

Figure 8:
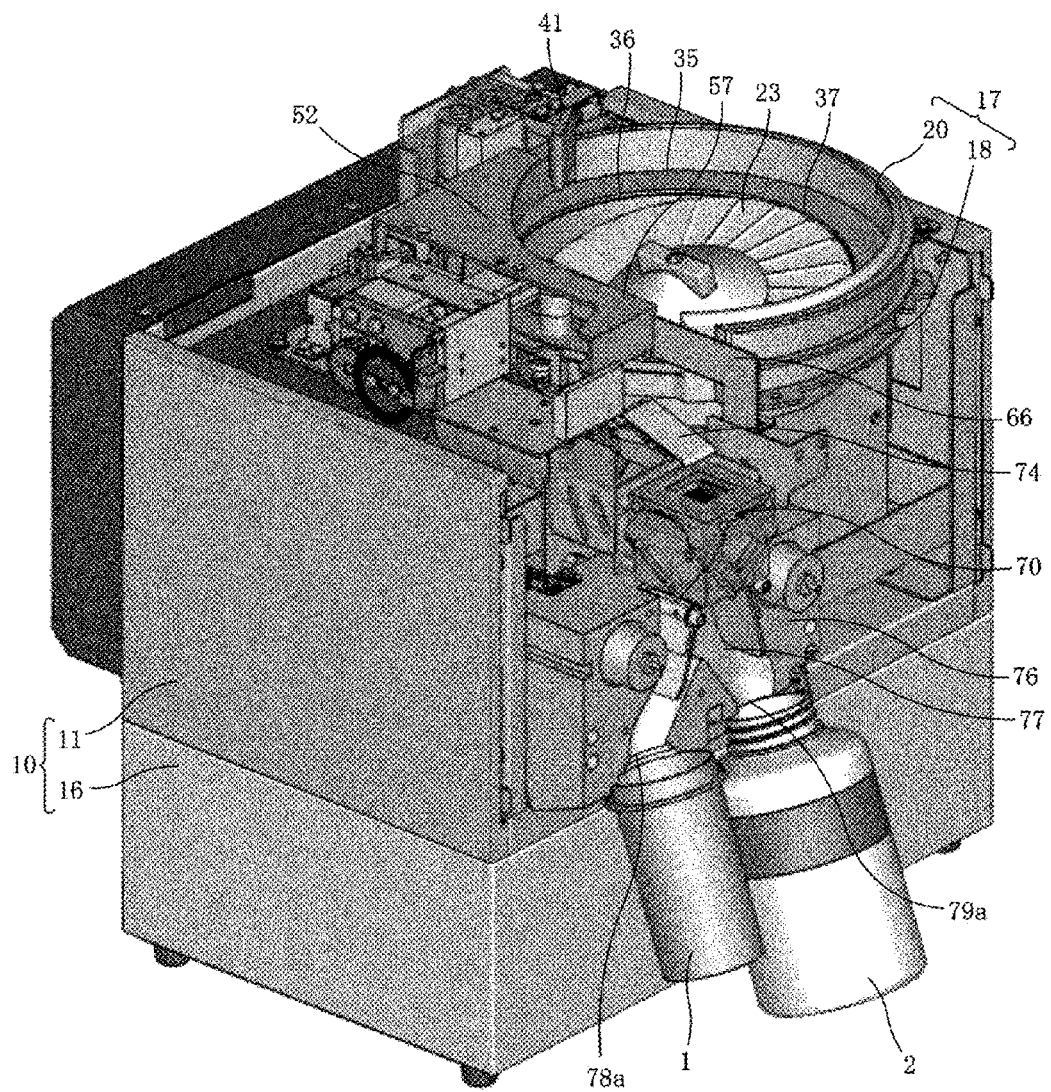
FIG. 8 is a perspective view showing a switching valve unit of a medicine counting device.

As shown in FIG. 8, in the medicine counting device, at the bottom of the medicine discharge member 73 provided at the outlet of the medicine guide section 65, a detector 70 for detecting medicines, a shutter 74 that determines whether the medicine is going to be discharged to this detector 70 or not, and a switching valve unit 76 for distributing the medicine that has passed through the detector 70 are provided. The medicine discharge member 73 constitutes the medicine discharge port that will be provided in the radially outward direction of the second rotor 35 and guides the medicine discharged from the medicine guide section 65 to the medicine detector 70.

Figure 9:
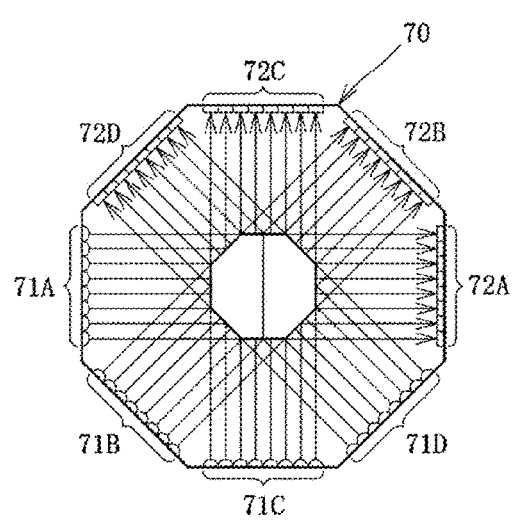
FIG. 9 is a schematic configuration of the medicine detection means to detect a medicine that was supplied, and (A) is a conceptual diagram and (B) is a perspective view.
Figure 9:
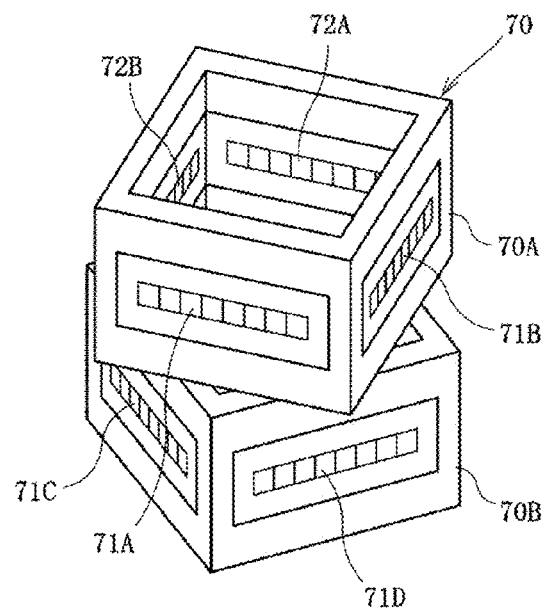

The detector 70, which is the second medicine detection means, as shown in FIG. 9(A) and FIG. 9(B), is composed of a pair of square-tubular shaped casings 70A and 70B. The upper casing 70A is provided with a pair of light emitting units 71A and 71B on adjacent sides, and the opposite sides are provided with a pair of light receiving units 72A and 72B. The lower casing 70B is provided with a pair of light emitting units 71C and 71D on adjacent sides, and the opposite sides are provided with a pair of light receiving units 72C and 72D. The pairs of light emitting unit 71A and light receiving unit 72A, light emitting unit 71B and light receiving unit 72B, light emitting unit 71C and light receiving unit 72C, and light emitting unit 71D and light receiving unit 72D, that are on opposite sides, each constitute one set of optical sensor (line sensor). In this way, the respective two pairs (total of 4 pairs) of optical sensors, which are disposed on the two casings 70A and 70B, are located in the axial direction with a predetermined gap. Further, it is possible to vary the detection direction by mutually disposing each casing 70A and 70B at a phase angle of 45 degree. Miniaturization in a planar shape (occupied area) can be achieved for the detector 70 configured in this way as compared to the use of an octagonal casing wherein all 4 pairs of optical sensors can be disposed.

As shown in FIG. 8, the shutter 74 is disposed inside the outlet side of the medicine discharge member 73. This shutter 74 can be rotated between the horizontally-extended discharge-stop position and the downward-inclined discharge-permit position by drive motor 75, which is a discharge permit/stop means. In the discharge-stop position, the outlet of the medicine discharge member 73 is closed to prevent discharge of the medicine into the detector 70. In the discharge-permit position, the outlet of the medicine discharge member 73 is opened to allow discharge of the medicine into the detector 70.

The switching valve unit 76 is disposed below the detector 70 so as to be positioned on the container mounting section 13 of the exterior body 11. Provided in the casing of this switching valve unit 76 is an inverted Y-shaped medicine passage 77 branching into a dispensing section 78, which is the first passage, and a recovery section 79, which is the second passage. The end of the dispensing section 78 and recovery section 79 are provided with stepped sections 78a and 79a for attaching medicine container 1 and recovery container 2. Of this, the stepped section 78a of the dispensing section 78 located on the left side in the diagram is provided with 3 sets for attaching 3 types of medicine containers 1 of different diameters (capacity). In the medicine passage 77, a switching valve is provided for switching the discharge destination to either the dispensing section 78 or the recovery section 79. The switching valve of the present embodiment is comprised of a pair of swing members 80A and 80B disposed so as to extend from the entrance of the medicine passage 77 towards discharge section 78 and recovery section 79. The first swing member 80A on the left side in the diagram opens and closes the dispensing section 78, whereas the second swing member 80B on the right side in the diagram opens and closes the recovery section 79. An elastically deformable elastic part 81 is provided to each of these swing members 80A and 80B on mutually opposite faces. Also, each swing member 80A and 80B is swung on an individual basis by the respective drive motors 82A and 82B which are the driving means. In this embodiment, it is possible to change to 3 positions, namely, the medicine dispensing position (first operation position) shown in FIG. 10A, the pause position (second operation position) shown in FIG. 10B and the medicine recovery position (third operation position) shown in FIG. 10C. Of these, in the pause position, each swing member 80A and 80B is rotated by an angle such that the elastic parts 81 and 81 will mutually contact and deform elastically. Further, the swing members 80A and 80B can also be formed of an elastically deformable material.

Figure 11:
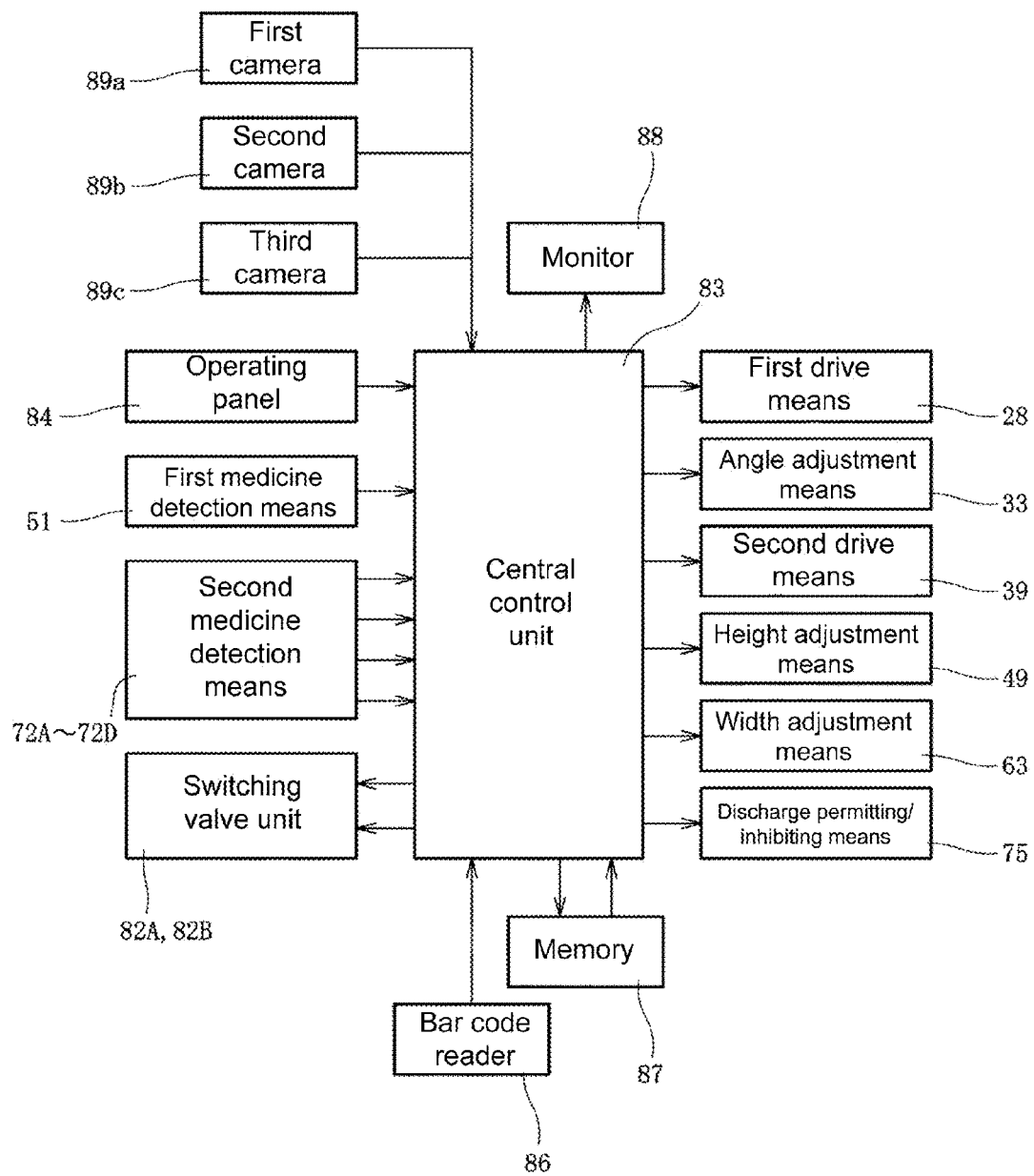
FIG. 11 is a block diagram showing the configuration of the medicine counting device.

The medicine counting device consisting of a medicine feeding device, as shown in FIG. 11, functions by the command from a central control unit 83, and counts and supplies required number of medicines according to the prescription data.

Figure 18:
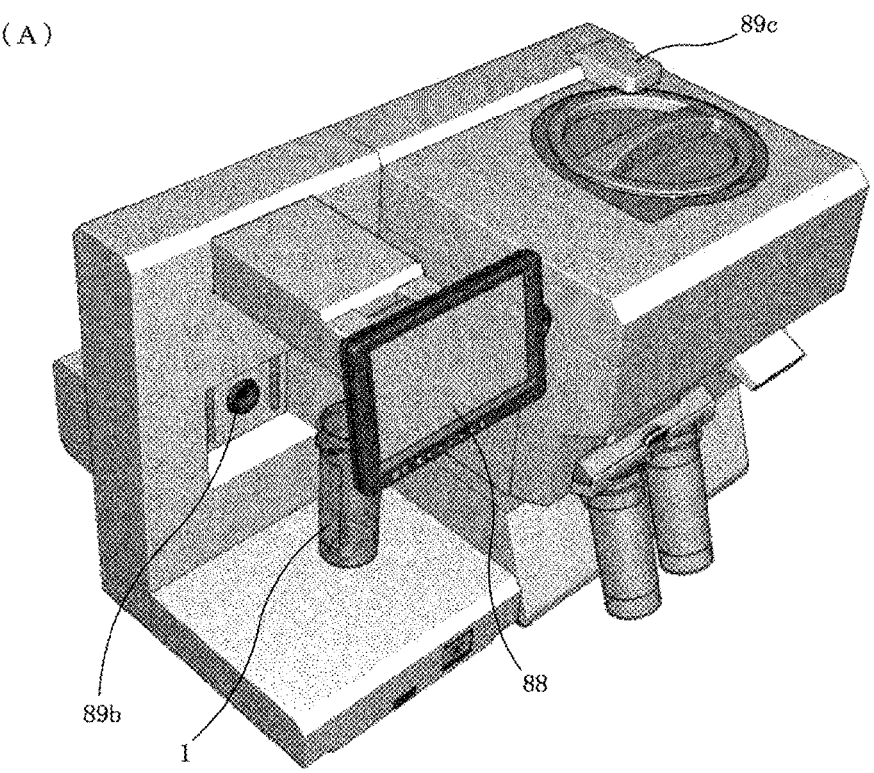
FIG. 18 shows an example of modification by providing a monitoring platform to the medicine counting device, and (A) is a perspective view as seen obliquely from top, and (B) as seen obliquely from bottom.
Figure 18:
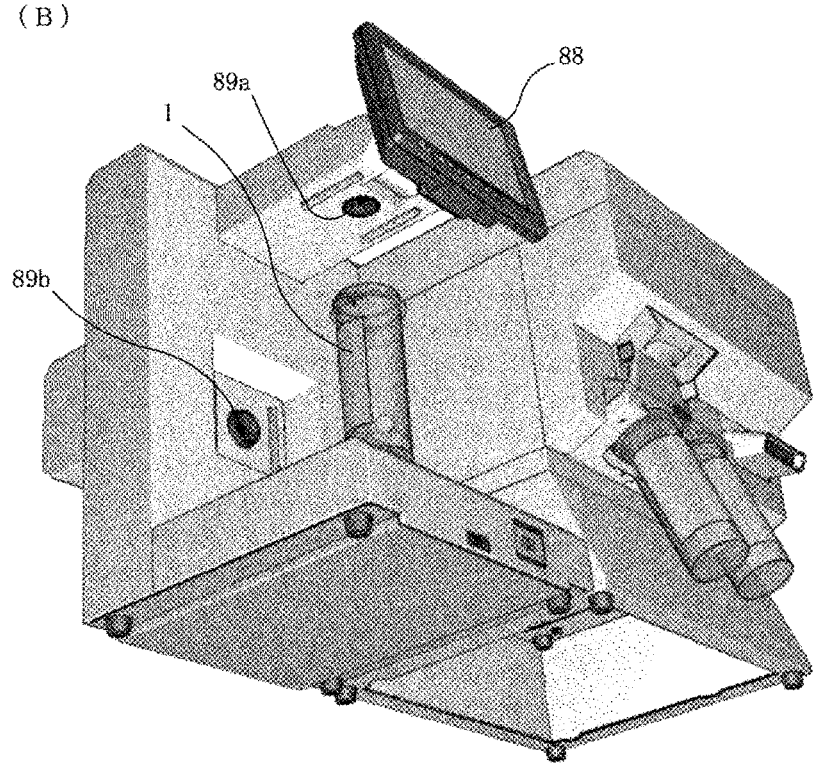

As shown in FIG. 18, the medicine counting device is provided with a monitoring platform. The monitoring platform is provided with a monitor 88, a first camera 89A for photographing the medicines inside the medicine container 1 from the upper side of the opening of the medicine container into which the medicine was dispensed, and a second camera 89b for photographing the label on the side of the medicine container 1. The monitor 88 displays images photographed with the first camera 89a, the second camera 89b, and a third camera 89c that is provided in the vicinity of the medicine loading port of the medicine counting device and that photographs the circumference of the movement section 37 from the first rotor 23 to second rotor 35 or the circumference of the height regulator 41 Further, the first camera 89a may also be made movable, and the function of the first camera 89a can be combined with that of the third camera 89c to eliminate the third camera.

Before charging a medicine, an operator will read the medicine type ID (bar code), which is printed on the medicine bottle, with a bar code reader 86, and only if this medicine is a correct medicine wherein this medicine type ID is consistent with the medicine shown in the prescription data, a charging of the medicine is allowed. With this, it is possible to prevent the dispensing of a wrong medicine. Next, the operator reads the prescription ID (bar code) printed on a medicine container 1 that is going to receive the medicine and will allow the dispensing of the medicine only when this prescription ID is consistent with the prescription ID shown in the prescription data. With this, it is possible to prevent the mistake in taking the medicine container 1.

Next, the operator will adjust the angle of inclination of the first rotor 23 by manipulating the operating panel 84, loads the medicine in the space for loading medicine that is partitioned by the first rotor 23 and partition wall 18, enter the quantity of the medicine to be prescribed, and starts the counting process. In the counting process, after the central control unit 83 performs automatic adjustment of each of the regulators 41 and 52 (auto calibration) depending on the medicine, a counting process for actually counting is executed. In this counting process, the central control unit 83 performs the role as a counting means for counting the medicine supplied based on the detection by the detector 70.

The process of angle adjustment of the first rotor 23 is carried out based on the quantity and size or shape of the medicine that is going to be loaded. That is, if the quantity of the medicine being loaded is large, the angle of inclination of the first rotor 23 is made steep (close to vertical) so that the accommodating space formed between the partition wall 18 and first rotor 23 and second rotor 35 becomes wider. In case of a spherical medicine that rolls (rotates) on the upper surface and that does move onto the second rotor 35 even when the first rotor 23 is revolved, the angle of inclination of the first rotor 23 is made moderate (close to horizontal). With this, adjustment is performed so that a large amount of the medicine can be placed on the first rotor 23, and the medicine can move to the second rotor 35. Also, this process of angle adjustment may also be configured to be an automatic adjustment by disposing a medicine detection means on the movement section 37 of the second rotor 35 or the like. In this case, such process of angle adjustment is carried out in the first stage of the automatic adjustment process.

Figure 10A:
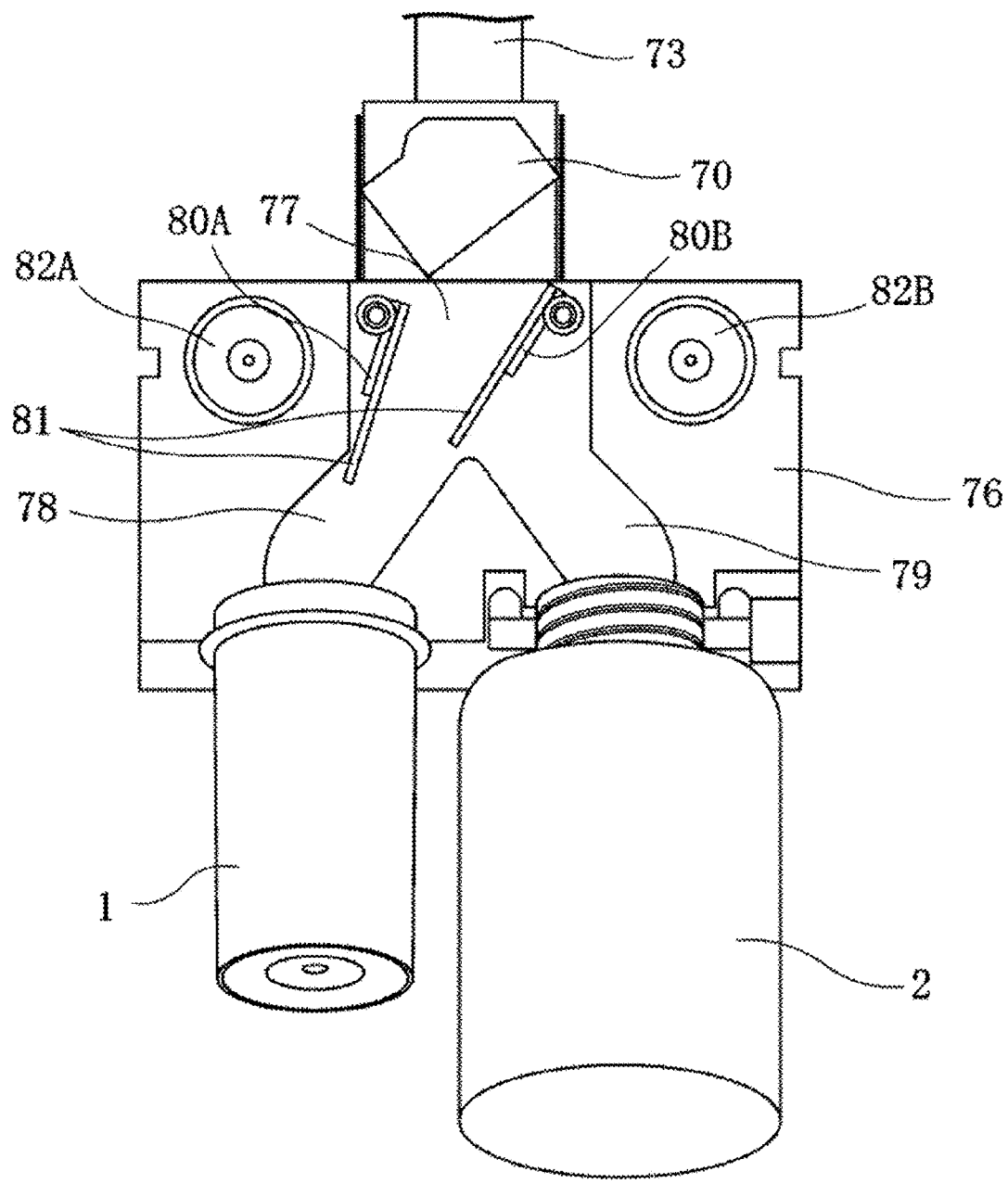
FIG. 10A shows a front view of the state of dispensing to a medicine container.

In the automatic adjustment process of counting process, the height regulator 41 is lowered and the width regulator 52 is moved inwards. In this way, it is made such that the medicine will not be discharged even when each of the rotors 23 and 35 is rotated. In this state, as shown in FIG. 10A, the swing members 80A and 80B of the switching valve unit 76 are revolved towards the dispensing section 78, the dispensing section 78 is opened while the recovery section 79 is closed, and each of the rotors 23 and 35 is rotated. Then, the height regulator 41 is slowly moved upwards. When a medicine passed through the height regulator 41 is detected by the medicine detection sensor 51, the movement of the height regulator 41 is stopped. Next, the width regulator 52 is moved radially outward so as to slowly widen. Then, when the discharge of a medicine is detected by the detector 70, the movement of the width regulator 52 is stopped.

It is preferable to memorize the positions of the height regulator 41 and width regulator 52 beforehand for each medicine.

For this purpose, the bar code of the medicine bottle containing the medicine to be counted is first read by a bar code reader 86 provided in the medicine counting device. Also, when the medicine detecting sensor 51, which is provided in the downstream of the height regulator 41, detects the medicine passing through the height regulator 41, the stipulated height (or position) of the height regulator 41 at this time is stored in the memory 87. At the same time, the medicine in the vicinity of the height regulator 41 is photographed by the third camera 89c. Further, when a sensor or the detector 70 provided in the downstream of the width regulator 52 detects the medicine passing through the width regulator 52, the transport width (or position) of the width regulator 52 at this time is stored in the memory 87. In the memory 87, the stipulated height of the height regulator 41, and the transport width of the width regulator 52 are linked to the medicine read by the bar code reader and stored. The stored information of the stipulated height and transport width may be displayed on the monitor 88 for the operator to check, fine-tuned as needed, and overwritten with the stipulated height and transport width after fine-tuning. With this, next time, before supplying a medicine to the first rotor 23, the ID (bar code) of the medicine printed on the medicine bottle is read with the bar code reader 88, and in case the stipulated height of the height regulator 41 and the transport width of the width regulator 52 associated with the medicine matching this ID is already stored, it is possible to immediately adjust to those values, and to initiate the counting of the medicine. In case the stipulated height of the height regulator 41 and the transport width of the width regulator 52 associated with the medicine have not been stored, such as when using new medicines, their stipulated height and the phase width are obtained as described above.

Figure 10B:
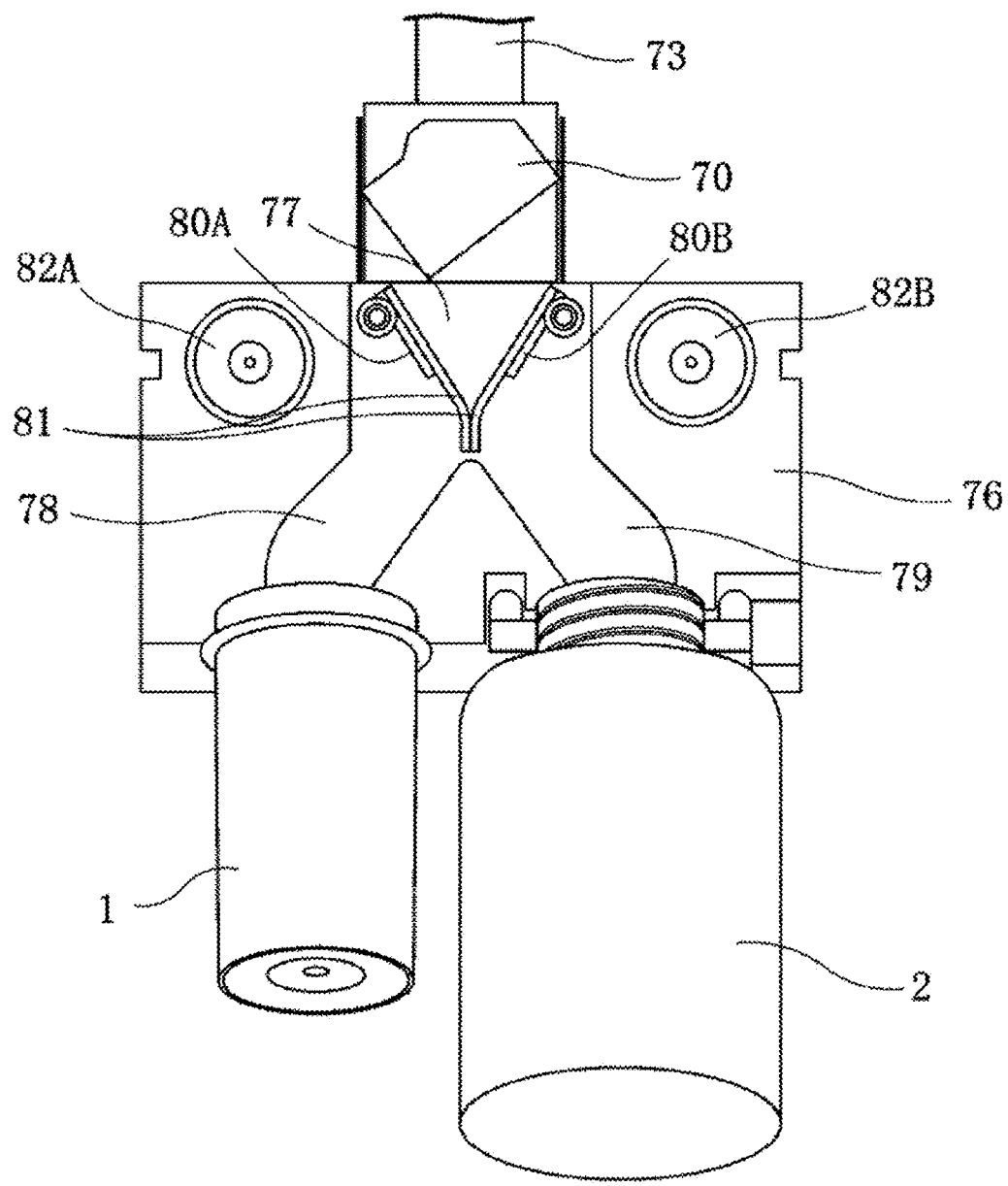
FIG. 10B shows a front view showing the completion of dispensing to the medicine container.

In the counting step of the counting process, the rotational speeds of each of the rotors 23 and 35 are accelerated by the automatic adjustment process, and made to count at a high speed. When the quantity of medicine dispensed approaches the set quantity of the medicine, rotation number of the second rotor 35 is reduced. With this, the speed of discharge from the medicine guide section 65 is slowed down. When the dispensing of the set amount of medicine is counted, as shown in FIG. 10B, the swing member 80A positioned on the side of the dispensing section 78 is rotated to the side of the recovery unit 79, and both the dispensing section 78 and recovery section 79 are closed. In this pause position, each elastic part 81 and 81 is deformed elastically on mutual contact, and becomes in a pressure-contacted state. In this state, the dispensed medicine is temporarily held in the upstream side of the pair of swing members 80A and 80B. Next, as shown in FIG. 10C, the swing member 80B located in the recovery section 79 is rotated to the swing section side to open the side of the recovery section 79. With this, the medicine that was temporarily held in the upstream of the pair of swing members 80A and 80B is flipped towards the recovery section 79 due to elastic restoration of the elastic part 81 on the dispensing section 78 side. Therefore, dispensing of excess medicine to the dispensing section 78 is reliably prevented. Finally, the rotational speed of the rotors 23 and 35 are increased, and all of the medicine in the frame 17 is discharged to the recovery container 2.

The counting by the central control unit 83 takes place based on the input signal from 4 pairs of optical sensor groups (8 pieces per group) of the detector 70. The detector 70 of this embodiment detects a medicine falling under its own weight due to discharge (at constant speed) with each line sensor 71A, 72A to 71D and 72D from four different directions. As a result, based on the input value from the light receiving units 72A to 72D, it is possible to determine the volume including the shape such as width and height of the medicine that has passed through. More specifically, based on inputs from various light receiving elements of various light receiving units 72A to 72D, the width of a medicine is determined from four different directions. Because the heights of the light receiving units 72A and 72B of the upper casing 70A and the light receiving units 72C and 72D of the lower casing 70B are different in the vertical direction, based on the width determined by each of the light receiving units 72A to 72D by having the detection time difference due to falling into consideration, it becomes possible to accurately determine the horizontal cross-sectional shape of the medicine that is falling. By repeating the determination at predetermined time intervals, the horizontal cross-sectional shape of a predetermined time interval can be determined with time. Then, based on all of the horizontal cross-sectional shapes for each of the time intervals, the volume of the medicine including shape (3D) of the falling medicine can be determined. In addition, the information relating to all medicines of different shapes and sizes are stored in the central control unit 83. Therefore, this medicine information is compared with the determined shape and volume, and the type of the medicine that is being counted is decided (confirmed). Based on this confirmed medicine information, the quantity of the medicine that was dispensed is counted. As a result, it is possible to even detect when 2 or more medicines pass together. Thus, a counting with high accuracy can be achieved.

Figure 19:
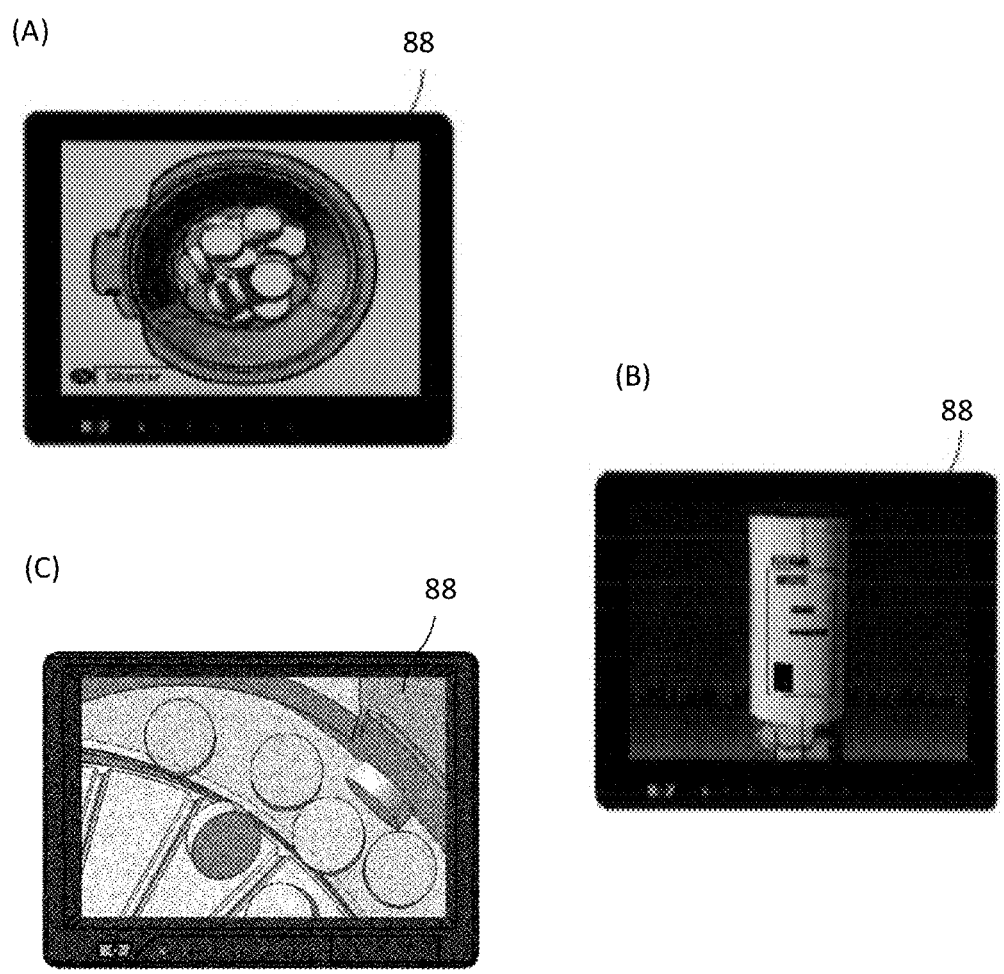
FIG. 19 shows the images displayed in the monitor, and (A) is an image of medicines dispensed into the medicine container as photographed by the first camera, (B) is the image of the prescription data on the side surface of the medicine container as photographed by the second camera and (C) is the photo image while a medicine is being dispensed as photographed by the third camera.

When dispensing of the medicine is finished, the opening of the medicine container 1 is placed facing the first camera of the monitoring platform shown in FIG. 18 and the medicine dispensed inside the medicine container 1 is photographed as shown in FIG. 19(A). Next, the label on the side surface of the medicine container 1 is placed facing the second camera 89b and the prescription data is photographed as shown in FIG. 19(B). Next, the photographed image of FIG. 19(A), the photographed image of FIG. 19(B), and the photographed image of medicine during the process of dispensing captured by the third camera as shown FIG. 19(C) are simultaneously displayed on the monitor 88, and whether the medicine as per the prescription data is being dispensed or not is monitored.

Next, the medicine transport operation of a disk-shaped tablet X, which is one type of a medicine, by the medicine feeding device is explained in detail. The transport operation of this disk-shaped tablet X is similar even for spherical shaped medicines.

Figure 12:
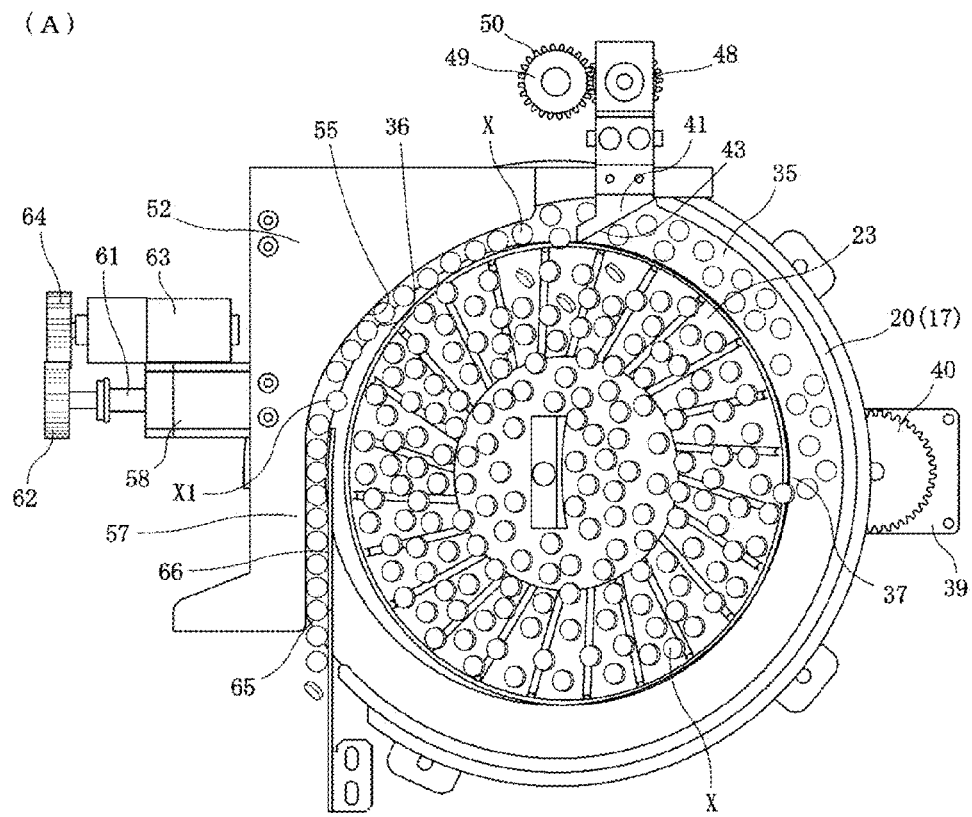
FIG. 12 shows the state of supplying tablets as the medicine, and (A) is a plan view, and (B) is a cross-sectional view.
Figure 12:
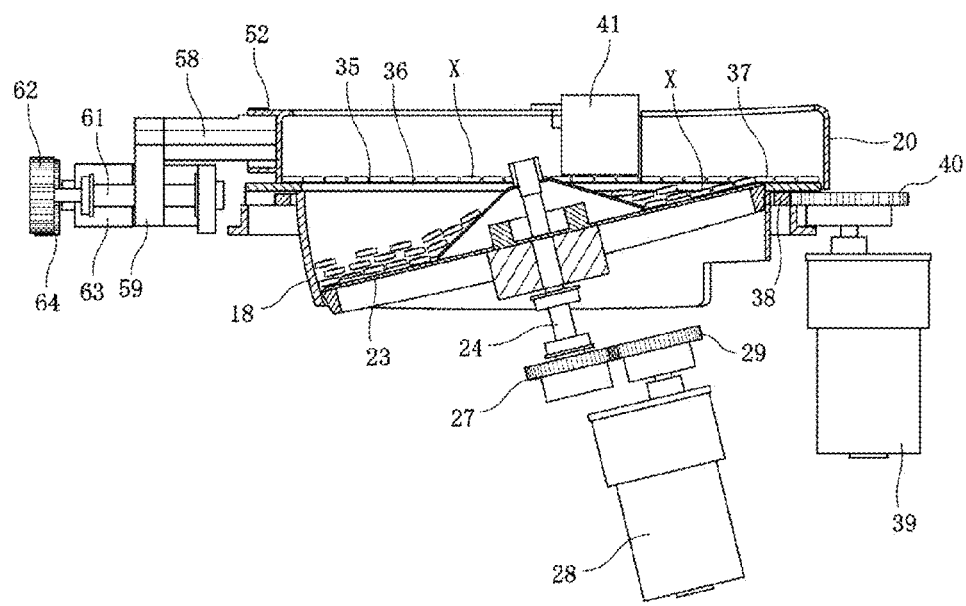

As shown in FIG. 12(A) and FIG. 12(B), when the first rotor 23 is rotated, the tablet X rotates on the upper surface, and it moves in the radial direction due to centrifugal force. The tablet X on the first rotor 23 moves in the transport section 37 that is positioned at approximately the same height as that of the second rotor 35, and is transferred onto the second rotor 35.

The tablet X that was transferred onto the second rotor 35 is moved to the side of the medicine guide section 65, and movement to further downstream is regulated by the height regulator 41. For example, the tablet X that is moving in a vertically stacked state, when the tablet X at the upper side comes in contact with the guide surface 43 of the height regulator 41, will be dropped onto the second rotor 35, or from the inner circumference 36 on to the first rotor 23.

The tablet X that has passed through the height regulator 41 comes into contact with the first curved section 55 of the width regulator 52, which regulates the transport width, and is moved to the inner circumference 36 side of the second rotor 35. Because the transport width of the second rotor 35 is ½ of the medicine width because of the first curved section 55 of the width regulator 52, only a tablet X coming in contact with the width regulator 52 will be able to move to downstream of the width regulator 52. In other words, when tablet X is being transported aligned radially in 2 lines, the tablet X in the inner side is pressed by the outside tablet X that is in contact with the width regulator 52, and is dropped from the inner circumference 36 of the second rotor 35 onto the first rotor 23. Even if the tablets X are not aligned in the radial direction, a tablet X, whose center of gravity is located inside of the inner circumference 36 of the second rotor 35, will also drop onto the first rotor 23 from the inner circumference 36. Therefore, other tablets X that are not in contact with the width regulator 52 are not transferred to downstream.

A tablet X that has passed through the first curved section 55 of the width regulator 52 is transferred in a steady state through the second curved section 56 where the transport width is larger. Then, it is transported between the inner guide 66 and the outer guide 57 of the medicine guide section 65, moved to the outlet side in a state of being aligned one by one, and discharged to the detector 70. At this time, a tablet X1 that protrudes inward from the inner circumference 36 of the second rotor 35 comes in contact with an end of the inner guide 66, and is either guided to the space between the outer guide 57, or dropped onto the first rotor 23 from the inner circumference 36. Only tablets X that have passed through the medicine guide section 65 are supplied to the detector 70 via the medicine discharge member 73 that is the medicine discharge port.

Next, the medicine transport operation of capsule medicine Y that differs from a disk-shaped tablet X in shape and size will be described in detail. Moreover, the transport operation of the capsule Y is similar even for tablets of non-circular shape such as elliptical shape.

Figure 13:
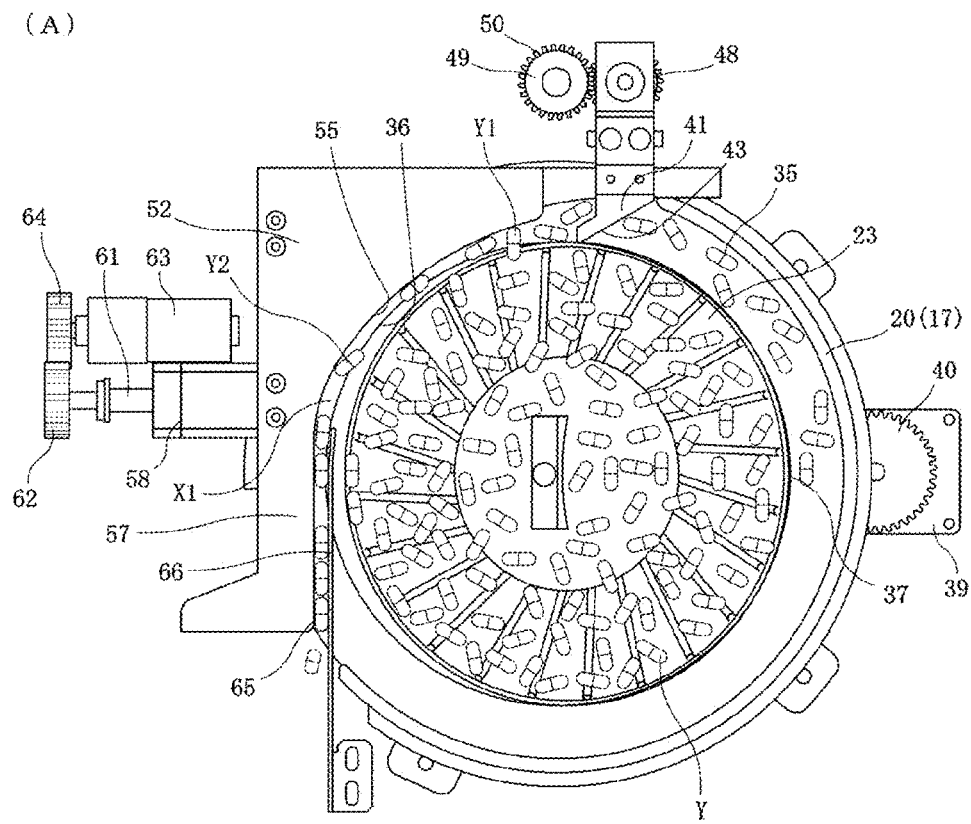
FIG. 13 shows the state of supplying capsules as the medicine, and (A) is a plan view, and (B) is a cross-sectional view.
Figure 13:
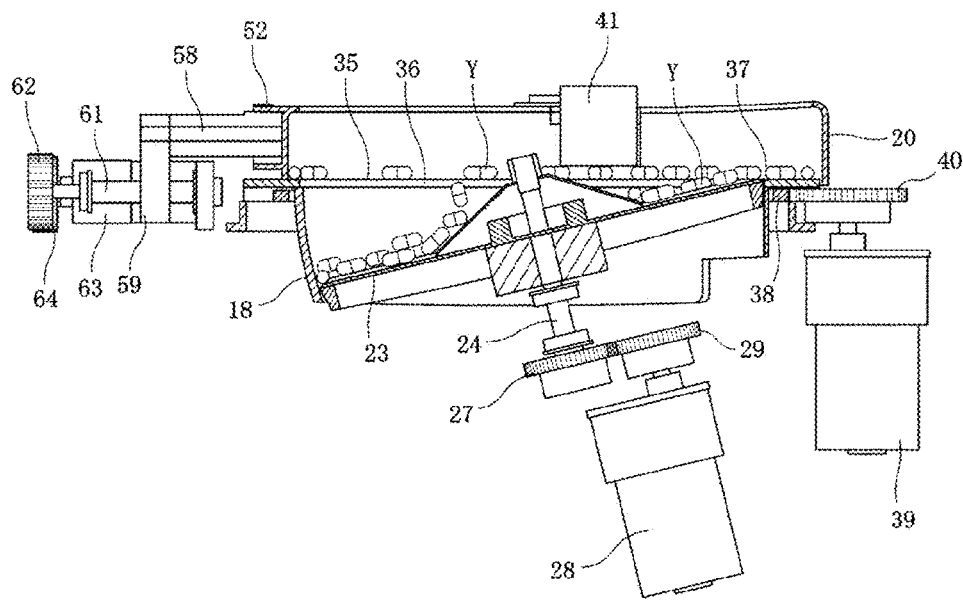

As shown in FIG. 13(A) and FIG. 13(B), when the first rotor 23 is rotated, the capsule Y rotates on the upper surface, and it moves in the radial direction due to centrifugal force. The capsule Y on the first rotor 23 moves in the transport section 37 that is positioned at approximately the same height as that of the second rotor 35, and is transferred on to the second rotor 35.

A capsule Y that was transferred onto the second rotor 35 is moved to the side of the medicine guide section 65, and movement to further downstream is regulated by the height regulator 41, and the capsule Y that is moving in a vertically stacked state will be dropped onto the second rotor 35, or from the inner circumference 36 onto the first rotor 23.

A capsule Y that has passed through the height regulator 41 comes to contact with the first curved section 55 of the width regulator 52, which regulates the transport width, will be moved to the inner circumference 36 side of the second rotor 35, and corrected such that the directivity (posture) of the longitudinal direction extends along the medicine transport direction. Only a capsule Y that contacts the width regulator 52 will pass to the downstream of the width regulator 52, whereas a capsule Y that is not in contact with the width regulator 52 is dropped from the inner circumference 36 of the second rotor 35 on to the first rotor 23. A capsule Y1 whose posture could not be corrected by being in contact with the first curved section 55 will be dropped from the inner circumference 36 of the second rotor 35 onto the first rotor 23 because the transport width due to the second rotor 35 is approximately ½ of the capsule Y1, and balance cannot be maintained because the center of gravity is located inside of the inner circumference 36 of the second rotor 35.

A capsule Y that has passed through the first curved section 55 of the width regulator 52 is transferred in a steady state through the second curved section 56 where transport width is larger. Then, it is transported between the inner guide 66 and the outer guide 57 of the medicine guide section 65, moved to the outlet side in a state of being aligned one by one, and discharged to the detector 70. At this time, a capsule Y2 whose posture could not be completely corrected comes in contact with an end of the inner guide 66, and either will have its posture corrected and guided to the space between the outer guide 57, or dropped onto the first rotor 23 from the inner circumference 36. Only a capsule Y that has passed through the medicine guide section 65 is supplied to the detector 70 via the medicine discharge member 73 that is the medicine discharge port.

Figure 15:
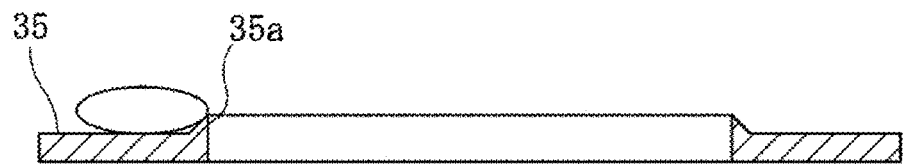
FIG. 15 shows an example of modification by providing ribs to the second rotor, and (A) is a cross-sectional view of a second rotor having ribs of first modification example, (B) is a partial cross-sectional view of a second rotor having ribs of second modification example, and (C) is a partial cross-sectional view of a second rotor having ribs of third modification example.
Figure 15:
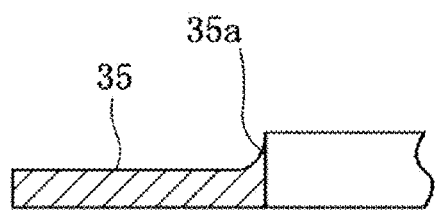
Figure 15:
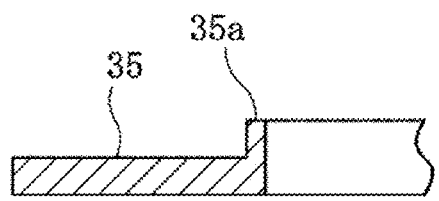

Because the capsule Y is not flat unlike the disk-shaped tablet X, rotation is easy when moving on the second rotor 35 by point contact or linear contact with the second rotor 35. Therefore, a tablet that is not flat like the capsule Y may change its orientation on the second rotor 35 and may be dropped onto the first rotor 23 after passing through the width regulator 52 and before reaching the tablet guiding section 65. As shown in FIGS. 15(A) through (C), it is preferable that the inner circumferential edge on the second rotor 35 be provided with a ring-shaped vertically protruding rib 35a. As shown in FIG. 15(A), rib 35a may have a triangular-shaped radial cross-section where the inner circumferential surface is flush-mounted with the inner circumferential surface of the second rotor 35, upper end is tapered and the outer circumferential surface is inclined in a straight line; or as shown in FIG. 15(B), the outer circumferential surface is curved with a recess and inclined; or as shown in FIG. 15(C), a rectangular-shaped radial cross-section made of an inner circumferential surface flush-mounted with the inner circumferential surface of the second rotor 35, a flat upper end, and a vertical outer circumferential surface As shown in FIG. 15(A), by providing ribs like 35a, because a tablet that is not flat will contact at 2 points, namely the upper surface of the second rotor 35 and rib 35a, it will become difficult for the tablet to rotate on the second rotor 35, and is prevented from falling onto the first rotor 23.

In this way, in the medicine feeding device of the present invention, because medicine can be supplied to the medicine guide section 65 by lining up one by one with the help of the height regulator 41 and the width regulator 52, the medicine can be reliably passed one by one through the medicine guide section 65 and supplied to outside from the medicine discharge member 73 without causing a problem of occurrence of clogging and the like. Further, because of the configuration wherein a medicine, when transported in large numbers, is dropped onto the first rotor 23 rather than holding back at each of the regulators 41 and 52 and medicine guide section 65, it is possible to reliably prevent occurrence of clogging at the regulators 41 and 52, and to prevent mutual collision of a large number of the medicine. Thus, occurrence of chipping of a medicine can be reliably prevented. In particular, with the transport width of the second rotor 35 being regulated to ½ of the medicine width by the width regulator 52, a medicine of non-circular in a planar view cannot pass through unless it is in a state wherein the longitudinal direction is extended along the medicine transport direction. Therefore, it is possible to reliably prevent occurrence of clogging at the inlet of the medicine guide section 65.

Also, because of the configuration which makes it possible to adjust the stipulated height by the height regulator 41 and the transport width of the second rotor 35 by the width regulator 52, supply of a large variety of medicines of different shapes and sizes can be achieved. Also, since the width regulator 52 and the outer guide 57 of the medicine guide section 65 are integrally provided and these can be adjusted at the same time, it is possible to improve the workability of adjustment, and also to reduce the number of parts. Moreover, in this embodiment, because of a configuration in which the regulators 41 and 52 can be adjusted automatically, an operator does not need to make any adjustment, and convenience in use can be significantly improved.

Further, since the inner guide 66 of the medicine guide section 65 is provided with a inclining edge 68 inclining upward, a medicine that is transferred in a state of protruding inward from the inner circumference 36 of the second rotor 35 can be reliably prevented from clogging at the entrance of the medicine guide section 65. This configuration is particularly effective because, when a medicine of non-circular in a planar view is transported in a slightly tilted state, it is possible to correct the posture or drop onto the first rotor 23. Furthermore, because the angle of inclination of the first shaft 24 of the first rotor 23 is adjustable, it is possible to reliably transport the medicine to the transfer section by the rotation of the first rotor 23, and to transfer it onto the second rotor 35.

Further, the medicine counting device using the medicine feeding device will be able to reliably discharge medicines of different shapes and sizes one by one to the outside, detect the medicine by the detector 70, and reliably count with the central control unit 83. Accordingly, it is possible to reliably dispense a predetermined number of a medicine and prescribe to patients. Because the switching valve unit 76 provided to the container mounting section 13 is provided with a dispensing section 78 for attaching a medicine container 1 that is handed over to patient and a recovery section 79 for attaching a recovery container 2, it is possible to improve the workability related to prescription. Moreover, because the swing members 80A and 80B that are switching valves are operated so as to temporarily shut both the dispensing section 78 and recovery section 79 once the prescribed number of medicine is counted, dispensing of a medicine exceeding the predetermined quantity to the medicine container 1 can be prevented. When setting the recovery position later to the recovery container 2, because the medicine retained in the upstream of the pair of swing members 80A and 80B can be withdrawn to the recovery section 79 by elastically restoring the elastic part 81, dispensing of excess medicine passing through the dispensing section to the medicine container 1 can be reliably prevented.

By providing the third camera 89c to the device body along with the height regulator 41, movement of the height regulator 41 can be prevented. For this reason, as shown in FIG. 18(A), it is preferable to provide the third camera to the lid rather than to the device body. Similarly, by disposing the height regulator 41 to the lid rather than the device body, it is possible to prevent damage due to collision between the height regulator 41 and width regulator 52 when the height regulator 41 is moved radially outwards of the second rotor 35 with the intention of cleaning the first rotor 23 and the second rotor 35.

(Other Embodiments)

Moreover, the medicine counting device of the present invention is not limited to the configuration of the embodiment described above, and various modifications are possible. In particular, it is possible to variously modify the medicine feeding device.

For example, in the embodiment, adjustment of the stipulated height on the second rotor 35 was made possible by the height regulator 41, and adjustment of transport width of the second rotor 35 was made possible by the width regulator 52, however, they may also be made as a non-adjustable, fixed type. Even in this case, when the medicine is of a height that can pass through the space between the second rotor 35 and height regulator 41 and a width that can pass through the transport width of the second rotor 35 specified by the width regulator 52, medicines of different shapes and sizes can be transported and supplied. Therefore, it is possible to increase the versatility of the supply of medicine.

In the embodiment described above, it was made possible to change the transport width of the second rotor 35 by the width regulator 52, however, a configuration without width regulator 52 is also possible. Even in this case, when the medicine is of circular shape in a planar view, and the medicine is of spherical or disc-like shape, medicines of different shapes and sizes can be transported and supplied. It should be noted that, in this case, the medicine passing through the height regulator 41 is aligned in two lines in the radial direction and supplied to the entrance of the medicine guide section 65. However, because the pair of guides 57 and 66 of the medicine guide section 65 have a gap approximately same as the width of the medicine, a medicine that is located on the side of the inner circumference 36 of the second rotor 35 will come in contact with the inner guide 66 and dropped from the inner circumference 36 of the second rotor 35 onto the first rotor 23. Therefore, it becomes possible to prevent clogging of the medicine at the inlet of the medicine guide section 65, and to reliably dispatch one by one to outside.

Figure 14A:
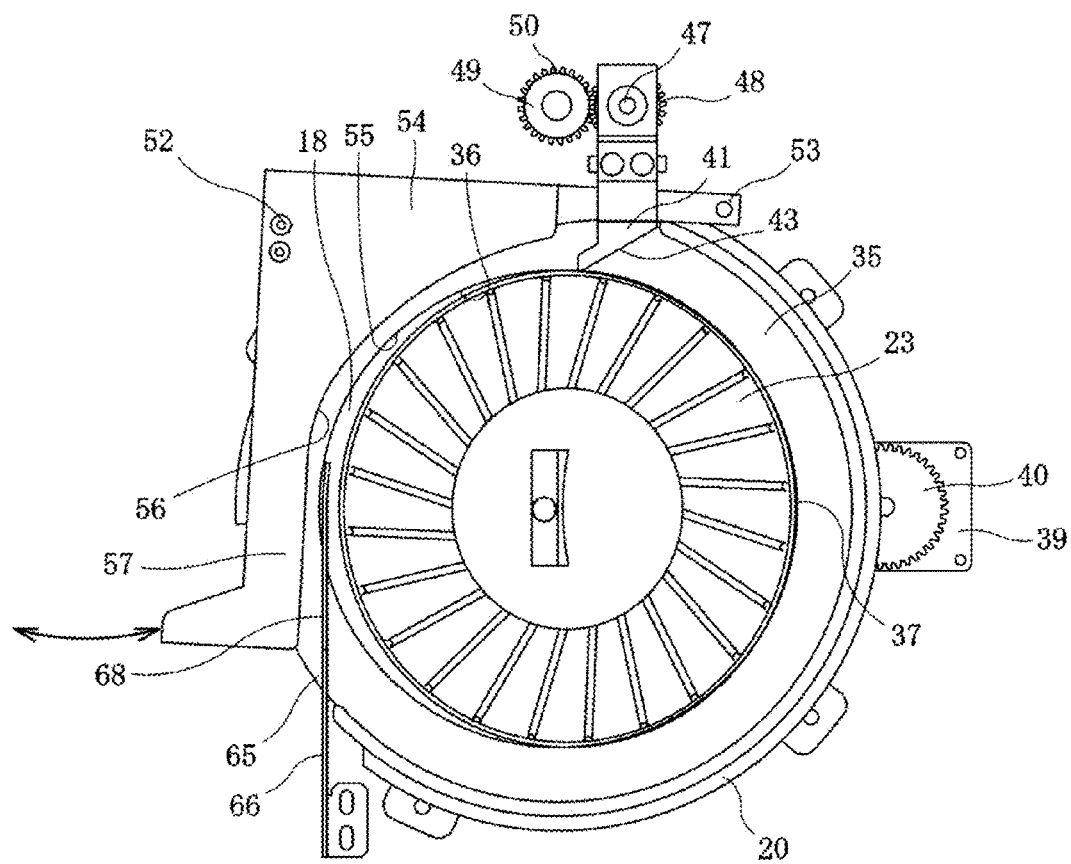
FIG. 14A is a plan view showing an example of modification of medicine feeding device.
Figure 14B:
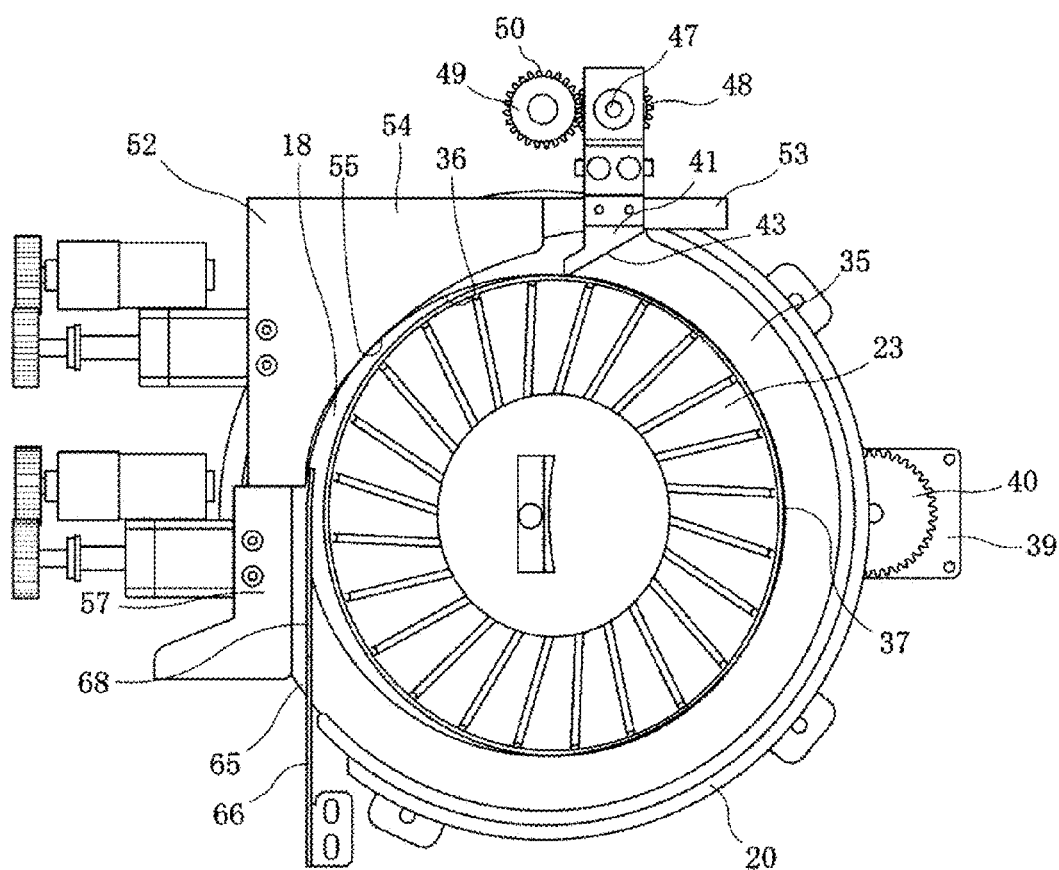
FIG. 14B is a plan view showing another example of modification of medicine feeding device.

Also, adjustment of the height regulator 41 was made possible by directly moving in a vertical direction, and adjustment of the width regulator 52 was made possible by directly moving in the horizontal direction, however, as shown in FIG. 14A, it is also possible to make it adjustable through rotation. Moreover, although the width regulator 52 was provided integrally with the outer guide 57 of the medicine guide section 65, it is also possible provide it separately to facilitate adjustment as shown in FIG. 14B. In this case, the width regulator 52 without the outer guide 57 may be constituted from an elastically deformable material, and may be configured to adjust the transport width through partial movement.

Furthermore, in the embodiment described above, although a configuration was provided wherein the first rotor 23 was disposed inclining at a predetermined angle and the second rotor 35 was disposed horizontally, a configuration is also possible wherein the first rotor 23 is disposed horizontally and the second rotor 35 is disposed inclining at a predetermined angle. Of course, a configuration is also possible wherein both the first rotor 23 and the second rotor 35 are inclined at a predetermined angle. That is, it can be of a configuration wherein the rotational axes of the first rotor 23 and the second rotor 35 intersect at an angle so as to facilitate movement of medicine.

In the embodiment described above, although the first rotor 23 and the second rotor 35 were configured to rotate in the same direction, it is also possible to configure so as to rotate in mutually opposite directions. In the embodiment described above, although a configuration was provided wherein the partition wall 18 was of a fixed structure impossible to rotate, it may also be configured to be rotatable. In this case, the partition wall 18 may also rotate integrally with the second rotor 35, or to independently rotate coaxially. Furthermore, in the embodiment described above, although the inner guide 66 of the medicine guide section 65 was disposed at the edge of inner circumference 36 of the second rotor 35, it is also possible to dispose it so as to position radially outward from the inner circumference 36 as long as it is at a position where a medicine whose center of gravity is shifted can be dropped from the inner circumference 36 onto the first rotor 23.

In the embodiment described above, although first rotor 23 and second rotor 35 were fixed in an axial direction, and the heights of first rotor 23 and second rotor 35 were made approximately same in the movement section 37 where the medicine moves from the first rotor 23 to the second rotor 35, it is also possible to move the first rotor 23 in the axial direction, and to make it possible to adjust the extent of transfer of the medicine. If the quantity of medicine is large, by lowering the first rotor 23, the pile of medicine on the first rotor 23 is moved to the movement section 37, and the topmost part of the medicine pile is transferred to the second rotor 35. When the quantity of the medicine becomes low and the medicine on the second rotor 35 is exhausted, the first rotor 23 is raised to approach the second rotor 35 and facilitate movement of medicine from the first rotor 23 to second rotor 35.

In the embodiment described above, although the distance of the second rotor 35 between the movement section 37, in which the medicine from the first rotor 23 moves to the second rotor 35, and height regulator 41 is constant, it is also possible to make this distance changeable. This is possible by changing the inclination direction of the first rotor 23. If the quantity of medicine is large, and if the distance from the movement section 37 up to the height regulator 41 is short, the quantity of the medicine clogging at the height regulator 41 or the quantity of medicine dropping increases, and as it will take more time for discharge, and therefore, the position of the movement section 37 is moved away from the height regulator 41 so that the distance from the movement section 37 up to the height regulator 41 becomes longer. When the quantity of medicine is low, as it takes longer to reach the height regulator 41 if the distance from the movement section 37 to height regulator 41 is longer, the position of the movement section 37 is moved nearer to the height regulator 41 so as the shorten the distance between the movement section 37 and height regulator 41.

Figure 16:
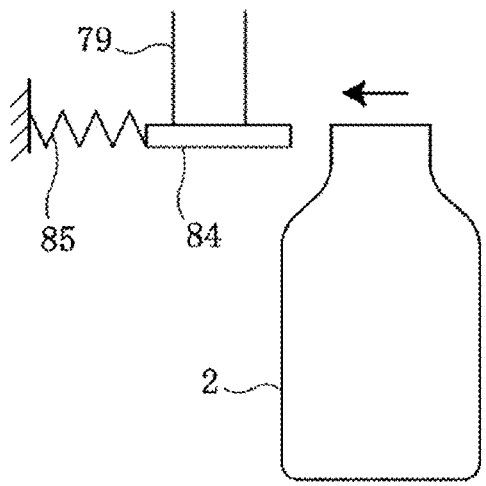
FIG. 16 shows an example of modification in which the recovery unit is provided with by a lid, and (A) is a side view with lid closed and (B) with lid released.
Figure 16:
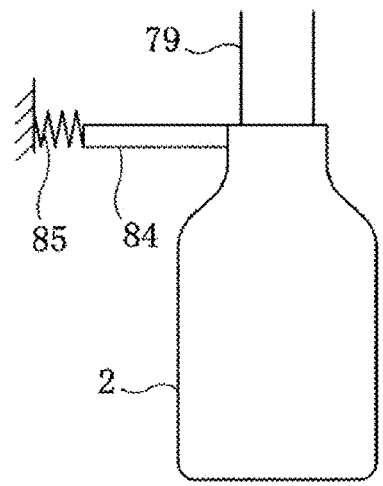

As shown in FIG. 16(A), an openable/closeable lid 84 may be provided at the opening end of the recovery section 79, which is the second passage way of the medicine passage 77, the openable/closeable lid 84 may be biased in the closing direction of the opening end by a spring 85, and the lid 84 may open and position the mouth of the recovery container 2 below the opening end of the recovery section 79 by pressing the lid 84 at the mouth of the recovery container 2. With this, it becomes possible to accumulate the medicine in the recovery section 79 closed by lid 84, and at once retrieve the accumulated medicine into the recovery container 2.

Further, a holding mechanism for holding the medicine container 1 may be provided to the medicine feeding device to grip the medicine container 1 with the holding mechanism so that even without manually holding the medicine container 1, the medicine that was dispensed from the dispensing section 78 can be dispensed into the medicine container 1.

Whether the medicine supplied on the first rotor 23 is completely dispensed or not is visually checked by the operator. However, even when the medicine is remaining undispensed, there is risk of an operator erroneously determining that it has been completely dispensed. In such case, if a different medicine is supplied to the first rotor 23 for counting of the quantity of the next medicine, different types of medicines will mix, and there is a possibility of not only causing mistake in counting, but also of supplying a wrong medicine to the patient resulting in medical mishaps.

Therefore, after the counting of the medicine is finished, before supplying the next medicine, the second rotor 35 is rotated in reverse direction for a predetermined duration. With this, even if the medicine is remaining on the second rotor 35, particularly, between inner guide 66 and outer guide 57, such medicine will be dropped onto the first rotor 23 by the width regulator 52. After this, the medicine guide section 65 is closed by moving the outer guide 57 to the maximum limit to the inside, and further, the height regulator 41 is raised to the maximum limit. The height regulator 41 may also be raised before operating the outer guide 57. Subsequently, the first rotor 23 and the second rotor 35 are rotated in normal direction. With this, the medicine on the first rotor 23 moves onto the second rotor 35, and although passes through the height regulator 41, falls onto the first rotor 23 due to the width regulator 52, and this process is repeated. Here, if a medicine is detected to have passed through the height regulator 41, or the width regulator 52, it becomes possible to notify the fact that a medicine is remaining undispensed by sounding an alarm or the like. Regarding the timing of the reverse rotation of the second rotor 35, it is preferable to do so after the lid 84 of the recovery section 79 of the second passage described above changes from an open to closed state and the medicine accumulated in the recovery section 79 is retrieved, for example.

Figure 17:
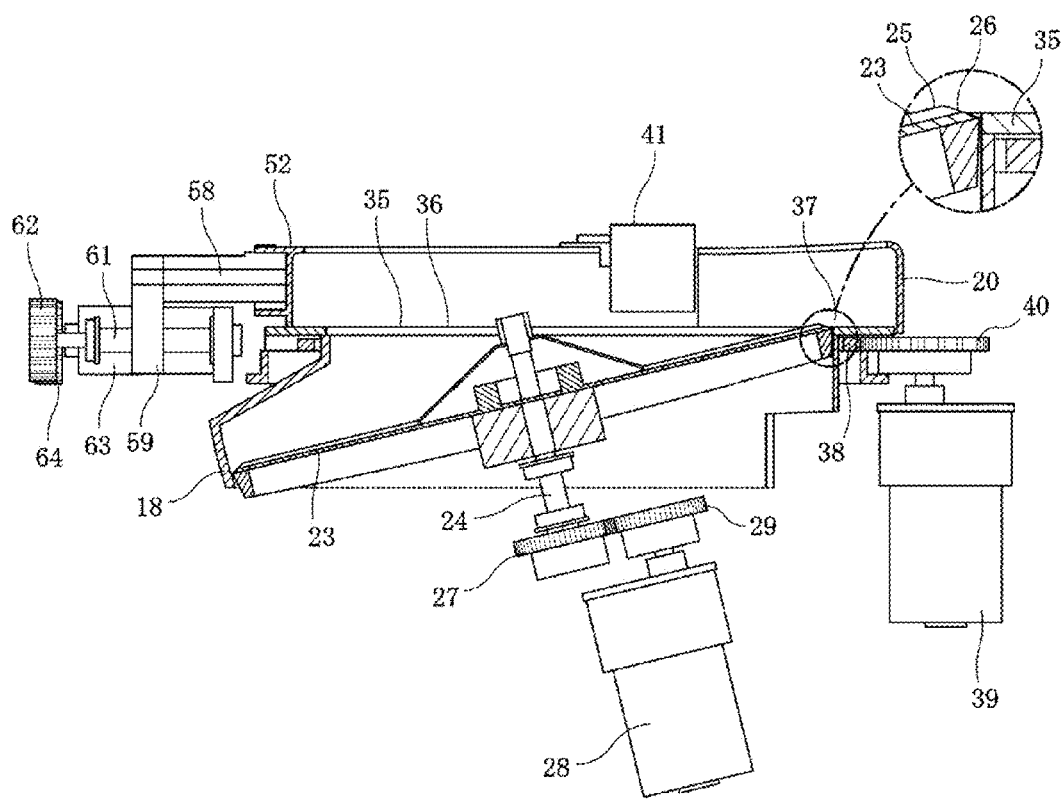
FIG. 17 is a cross-sectional view of an example of modification wherein the first rotor is made larger than the second rotor.

In the embodiment described above, the first rotor 23 was formed smaller than the second rotor 35 and arranged in the projection area of the inner circumference of the second rotor 35, however, as shown in FIG. 17, it is also possible to have a configuration wherein the first rotor 23 is made larger than the second rotor 35, and a part of the outer circumference that is opposite to the movement section 37 of the second rotor 35 is disposed outside the outer circumference of the second rotor 35.

Although the embodiment described above is provided with a monitoring function of confirming the medicine ID and prescription ID, it is also possible to provide an inventory operation support function wherein only the medicine ID is confirmed, and this medicine ID and count value of the medicine are recorded. With the inventory operation support function, beyond the business hours of a pharmacy, it will be possible to determine the amount of the stock inventories of the medicines that are regularly used in the pharmacy. Or it may include a counting function in which the quantity of medicine is simply counted without confirming the medicine ID and prescription ID.

Figure 20:
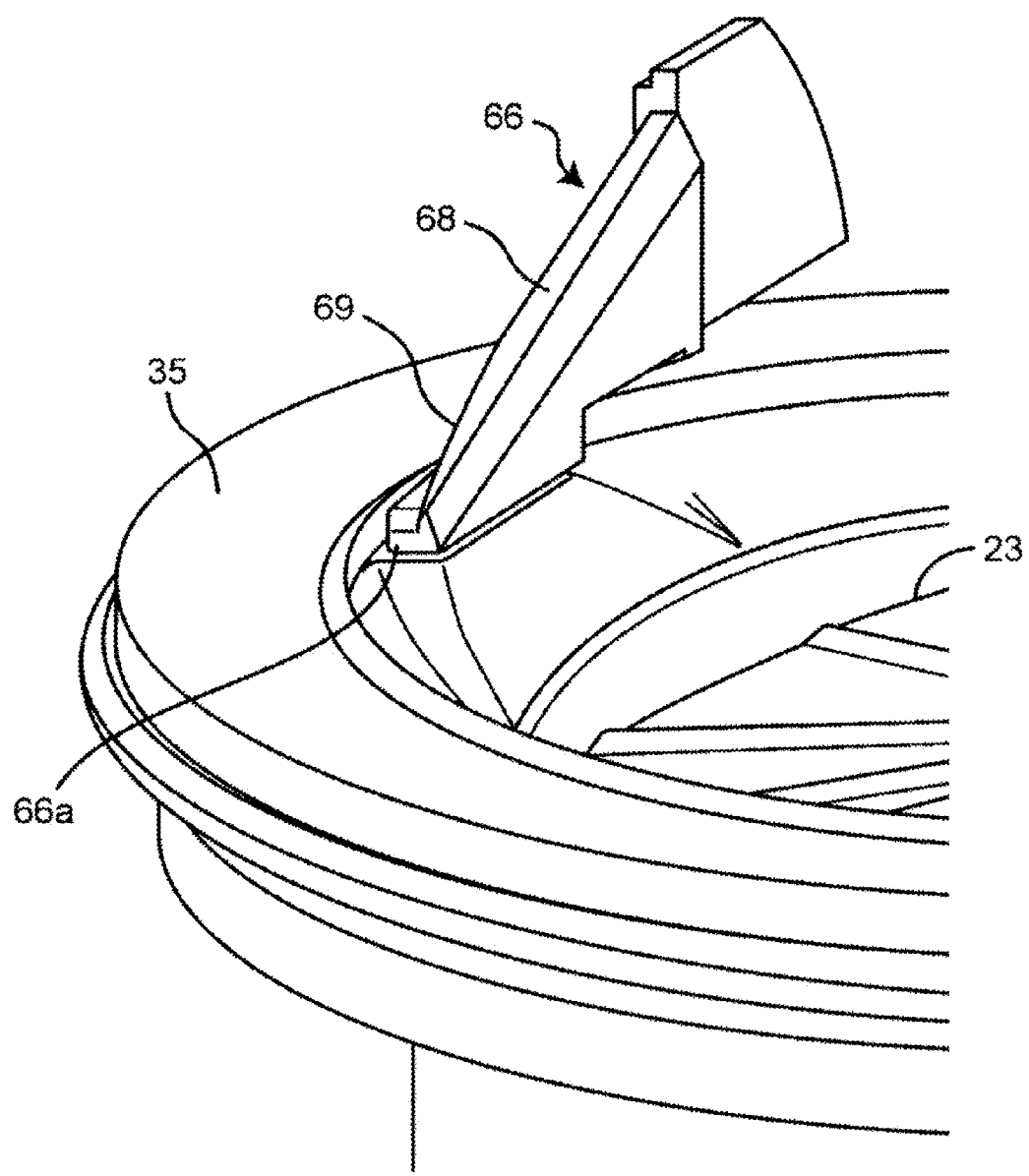
FIG. 20 is a perspective view showing a modified example of the inside guide.

If the tip of the inner guide 66 (the tip in the upstream side of rotational direction of the second rotor 35) of the embodiment described above is at a higher position than the top surface of the second rotor 35, there is a risk of the medicine that is being transported on the second rotor 35 colliding with the tip of the inner guide 66 and getting damaged. Therefore, it is preferable that the tip of the inner guide 66, as shown in FIG. 20, is on the inside of the inner circumferential edge of the second rotor 35, and also at a position lower than the top surface of the second rotor 35. Moreover, in FIG. 20, unlike in the embodiment described above, the second rotor rotates in a clockwise direction in the drawing. It is further preferable to provide a protruding section 66a from the bottom end of the inner guide 66 toward the inner circumferential edge of the second rotor 35 to fill the gap between the bottom end of the inner guide 66 and the inner circumferential edge of the second rotor 35. With this, a medicine that is moved back to the second rotor 35 following contact with the inclined surface 69 can be prevented from falling from the gap between the bottom end of the inner guide 66 and the inner circumferential edge of the second rotor 35.

(Vertical Movement Mechanism of the First Rotor)

In the embodiment described above, the vertical position of the first rotor 23 is fixed with respect to the second rotor 35. In such case, the volume of medicine supply space on the first rotor 23 is limited. Accordingly, the first rotor 23 may be provided as vertically-movable with respect to the second rotor 35. The vertical movement mechanism of the first rotor 23 is described below.

Figure 21:
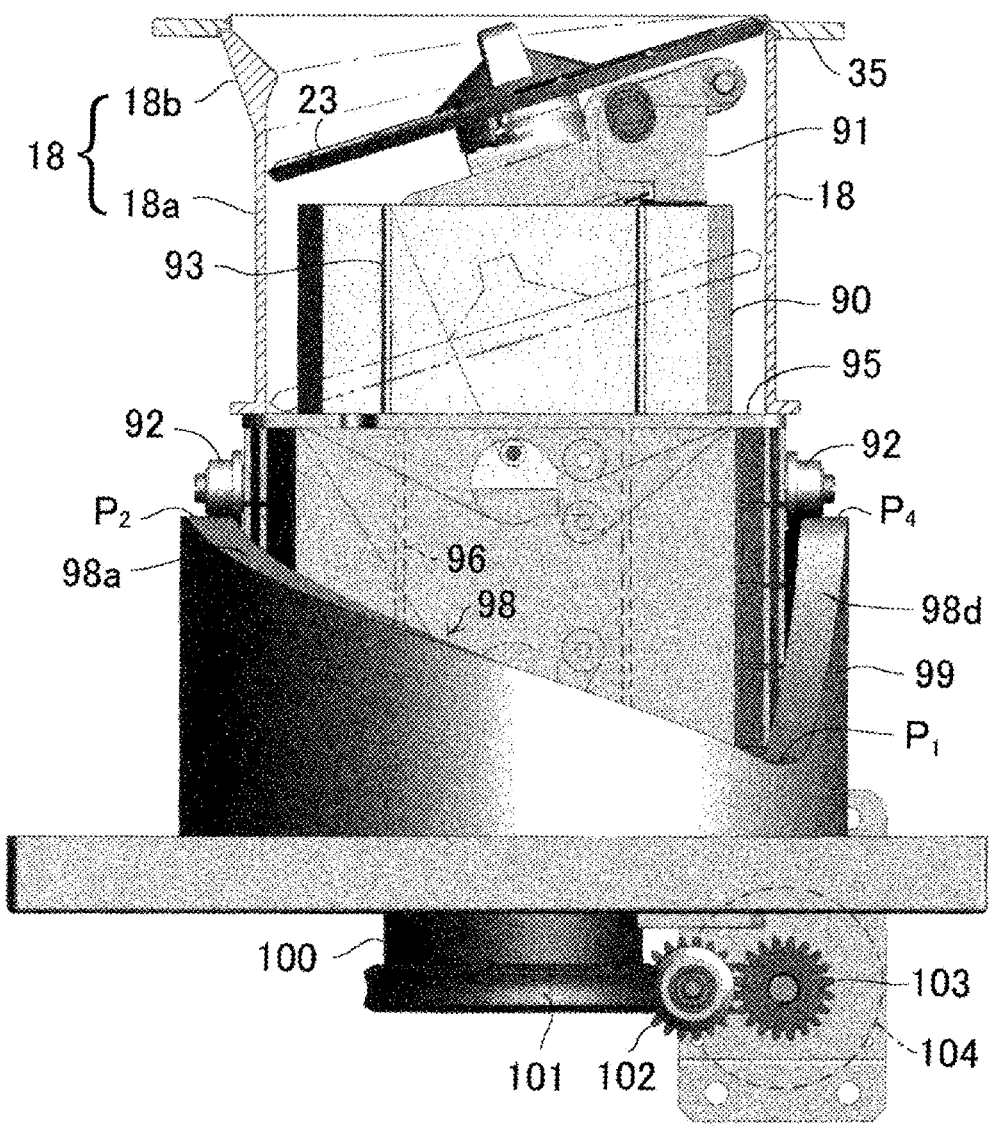
FIG. 21 is a partial cross-sectional frontal view of lifting movement mechanism of the first rotor.
Figure 22:
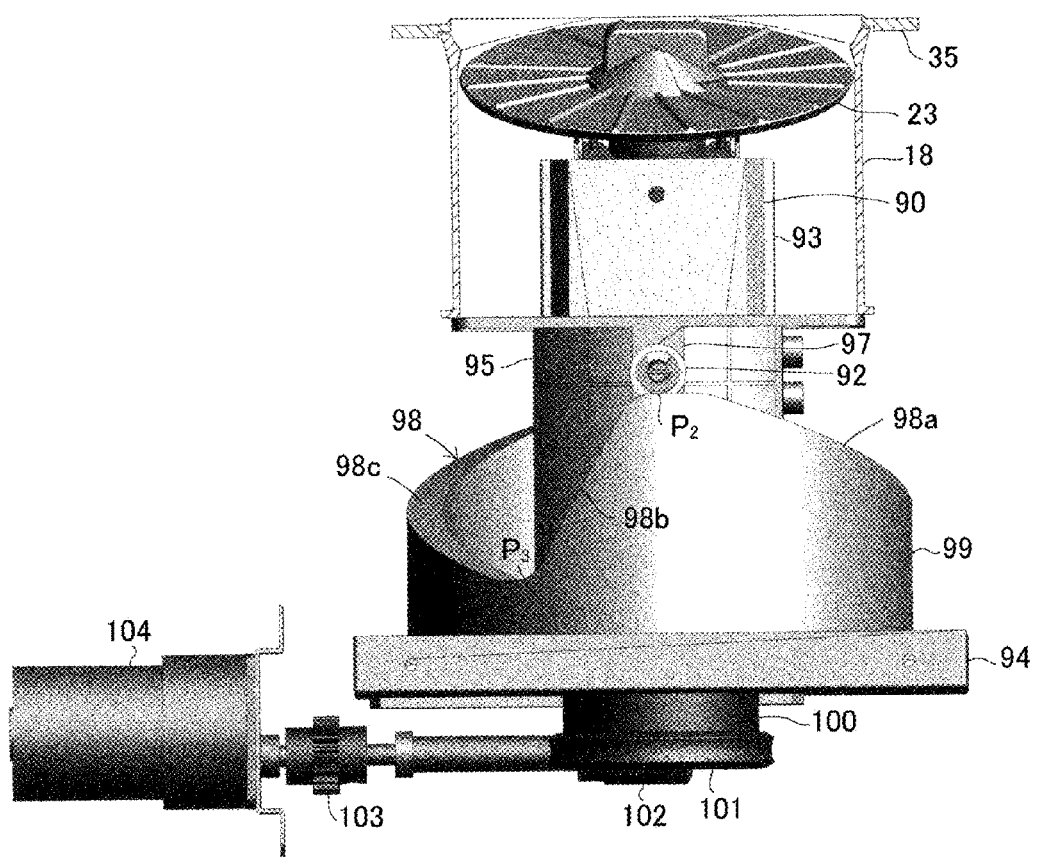
FIG. 22 is a partial cross-sectional side view of FIG. 21.

FIG. 21 and FIG. 22 show an embodiment wherein the first rotor 23 is provided so as to be vertically-movable with respect to the second rotor 35 parallel to the second shaft (not shown) of the second rotor 35. The first rotor 23 is supported along with the first drive motor 28 at the top end of the rectangular cylindrical movable frame 90 by a bracket 91. In the outer surface of walls on both sides of the lower end of the movable frame 90 is provided with one pair of rollers 92 as cam followers. In the outer surface of walls on other both sides of the movable frame 90 where rollers 92 are not provided, a ridge 93 extending in the vertical direction is formed. The movable frame 90 is housed inside a rectangular cylindrical fixed frame 95 fixed to the base plate 94 of the device body. A guide projection 96 that extends vertically and to which the ridge 93 of the movable frame 90 is engaged slidably is provided inside the fixed frame 95. A notch 97 orienting downward from the top end of both side surfaces of the fixed frame 95 is formed, and the shaft of the roller 92 is fitted to this notch 97 such that the roller 92 is positioned outside of the notch 97.

A cam tube 99 provided with a cam surface 98 at the top end is rotatably mounted on the base plate 94 of the device body. On the cam surface 98, rollers 92 of the movable frame 90 are placed such that they can be rolled. The cam surface 98 is made of a first inclined surface 98a ascending at an inclination of about 20° from the first point P1 of the very bottom, a second inclined surface 98b descending at an inclination of about 60° from a second point P2 at topmost position of the first inclined surface 98a, a third inclined surface 98c ascending at an inclination of about 20° from a third point P3 of the second inclined surface 98b, and a fourth inclined surface 98d descending at an inclination of about 60° from fourth point P4 at the topmost position of the third inclined surface 98c up to the first point P1. When the rollers 92 of the movable frame 90 are at the first point P1 and third point P3 at the very bottom, the first rotor 23 supported by the movable frame 90 is located at the lowermost position, and when the rollers 92 are at the second point P2 and fourth point P4 in the topmost position, the first rotor 23 is at the topmost position. The cam cylinder 99 has a drive shaft 100 projecting downward from the base plate 94. The drive shaft 100 is provided with a worm gear 101, and this worm gear 101 is coupled to the elevating motor 104 via a worm 102 and drive gear 103. When the cam cylinder 99 is rotated by driving the elevating motor 104, the roller 92 of the movable frame 90 rolls along the cam surface 98 of the cam cylinder 99, the movable frame 90 slowly ascends from the first point P1 and third point P3 at the very bottom to the second point P2 and fourth point P4 at the topmost position, and rapidly descends from the second point P2 and fourth point P4 that are at topmost position. It is also possible to use a rack and pinion mechanism in lieu of such a cam mechanism.

The lower end of the cylindrical partition wall 18 is attached to the top end of the fixed frame 95. The partition wall 18 is constituted of an oval-shaped lower part 18a and a substantially conical shaped upper part 18b. The lower part 18a of the partition wall 18 is an oval-shaped cylinder wherein the inclined first rotor 23 is accommodated with a minimum gap. The top end of the lower part 18a is an oval shape, and is connected to the lower end of the upper part 18b that inclines along the outer circumferential edge of the first rotor 23 located at the topmost position. A section of the lower end of the upper part 18b opposite to the highest position of the inclined first rotor 23 coincides with the upper end of the lower part 18a, and the section opposite to lowest position of the inclined first rotor 23 extends obliquely upward so as to separate in the outer direction from the upper end of the lower part 18a. The top end of the upper part 18b is circular so as to extend along the inner circumferential edge of the second rotor 35.

Figure 23:
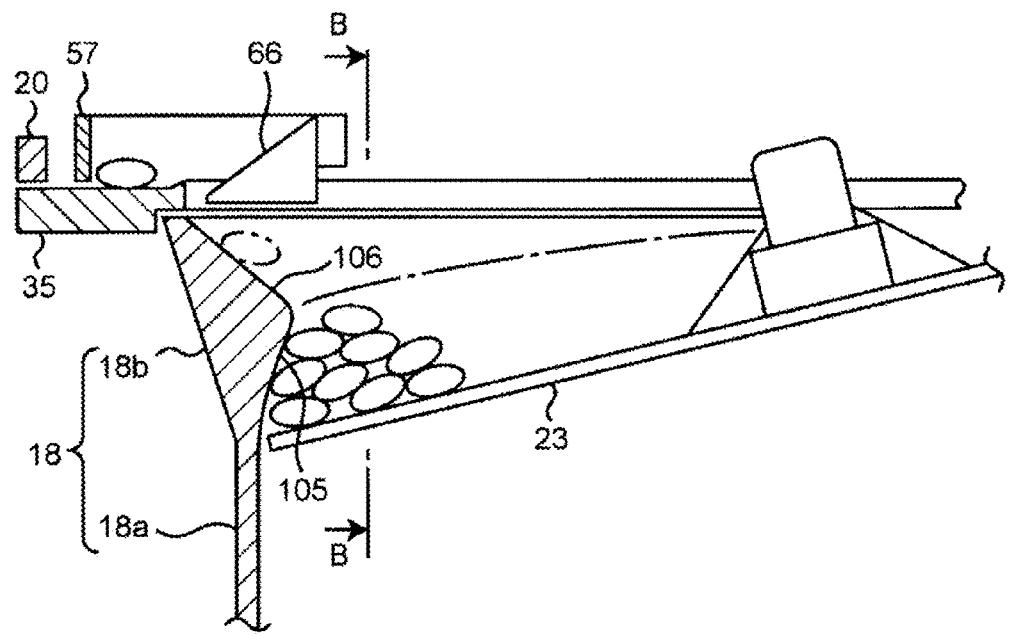
FIG. 23(A) is a partly magnified cross-sectional view of partition wall at the bottom of the first rotor of lifting movement mechanism of FIG. 21, and (B) is a cross-sectional view along the B-B line of (A).
Figure 23:
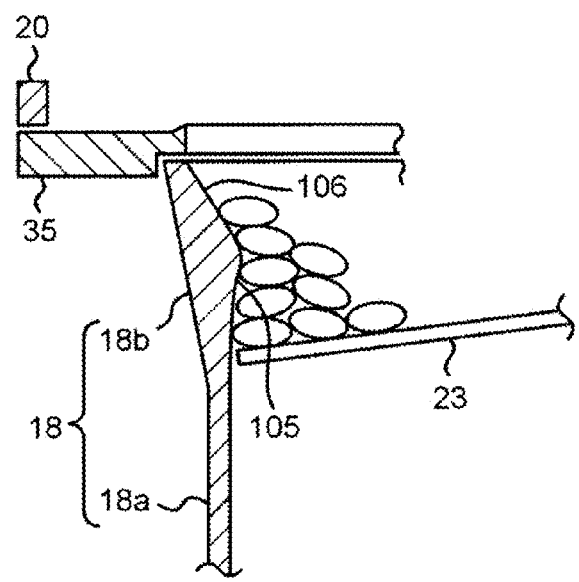
Figure 24:
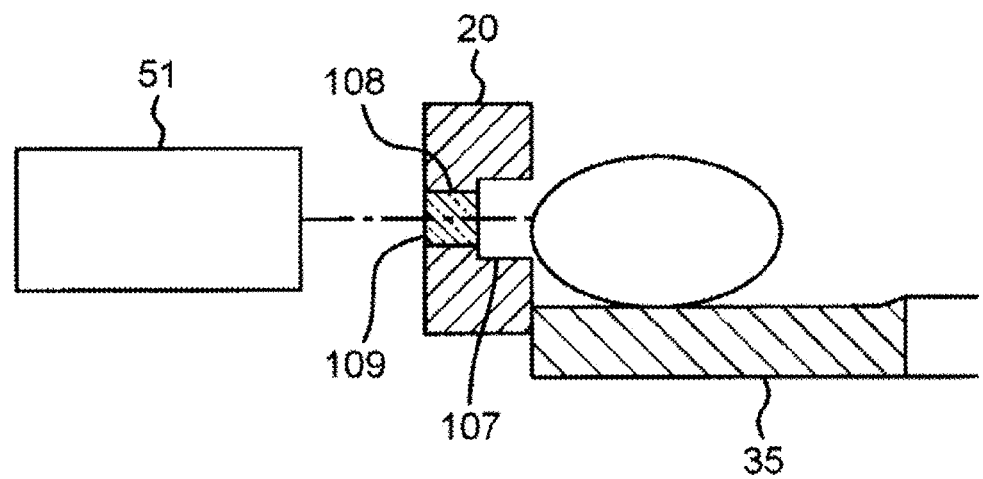
FIG. 24 is a cross-sectional view of a sensor hole in the outer wall provided on the second rotor of the lifting movement mechanism of first rotor of FIG. 21.
Figure 25:
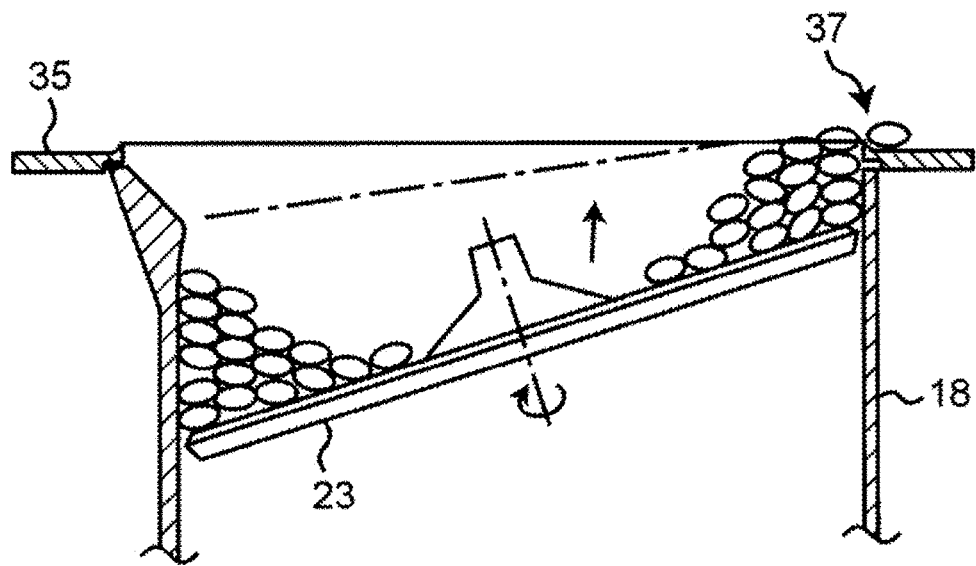
FIG. 25 is a cross-sectional view showing the operation of the lifting movement mechanism of FIG. 21.

On the inner surface of a section of the upper part 18b of the partition wall 18 opposite to the lowest position of the inclined first rotor 23, as shown in FIG. 23(A), a tablet-rise-suppression surface 105 inclining upwards so as to approach the first rotor 23 from the lower end, and a tablet-drop-guide surface 106 inclining downwards so as to approach the first rotor 23 from the upper end are provided. The tablet-rise-suppression surface 105, by gathering the tablets, which have accumulated in the outer circumference with the rotation of the first rotor 23, toward the center of the first rotor 23, prevents these tablets from reaching the second rotor 35 above to merge with the tablets that are transported on the second rotor 35 and blocking the space between the inner guide 66 and the outer guide 57. In the downstream of the inner guide 66 of the second rotor 35, the need to inhibit the rise of the tablets is eliminated, and rather the tablets must be lifted from the first rotor 23 towards the movement section 37 of the tablets to the second rotor 35, and therefore, as shown in FIG. 23(B), the inclination of the tablet-rise-suppression surface 105 is moderate.

The operation of the vertical movement mechanism of the first rotor 23 is described. When operating the vertical movement mechanism of the first rotor 23, the medicine detection sensor 51 for detecting the medicine transported on the second rotor 35 is used. The medicine detection sensor 51 is provided in the outer wall 20 of the circumference of the second rotor 35. A recess 107 of a size which a tablet cannot enter is provided in the inner surface of the outer wall 20, and a hole 108 is provided at the bottom of this recess 107 to embed a lens 109, which transmits the light of the medicine detection sensor 51, in this hole 108. With this, because tablets do not contact with the lens 109, it is possible to prevent damage to the lens 109 due to contact with the lens 109 while being transported on the second rotor 35.

When a medicine is supplied to the first rotor 23, the first rotor 23 is in the lowermost position. When the first rotor 23 and the second rotor 35 are rotated, tablets on the first rotor 23 accumulate and pile up in the outer circumference, moves from the first rotor 23 on to the second rotor 35 through the movement section 37, and transported on the second rotor 35 and discharged as described above.

Along with the sequential discharge of the medicine, because the pile of medicine on the first rotor 23 decreases, the medicine will not be able to move from the first rotor 23 onto the second rotor 35 through the movement section 37, and the medicine transported on the second rotor 35 will become exhausted. Then, because the medicine detection sensor 51 will not be able to detect medicine transported on the second rotor 35, the first rotor 23 is lifted so as to be closer to the second rotor 35. With this, the medicine on the first rotor 23 is transported from the first rotor 23 to the second rotor 35 through the movement section 37, and since the medicine detection sensor 51 detects the medicine transported on the second rotor 35, and therefore, the lifting of the first rotor 23 is stopped. With this, it is possible to continue the discharge of the medicine. By repeating this, all the medicine on the first rotor 23 can be discharged.

When supplying the medicine on to the first rotor 23, in order to ensure the accommodating space, the first rotor 23 is descended so as to separate from the second rotor 35.

Figure 26:
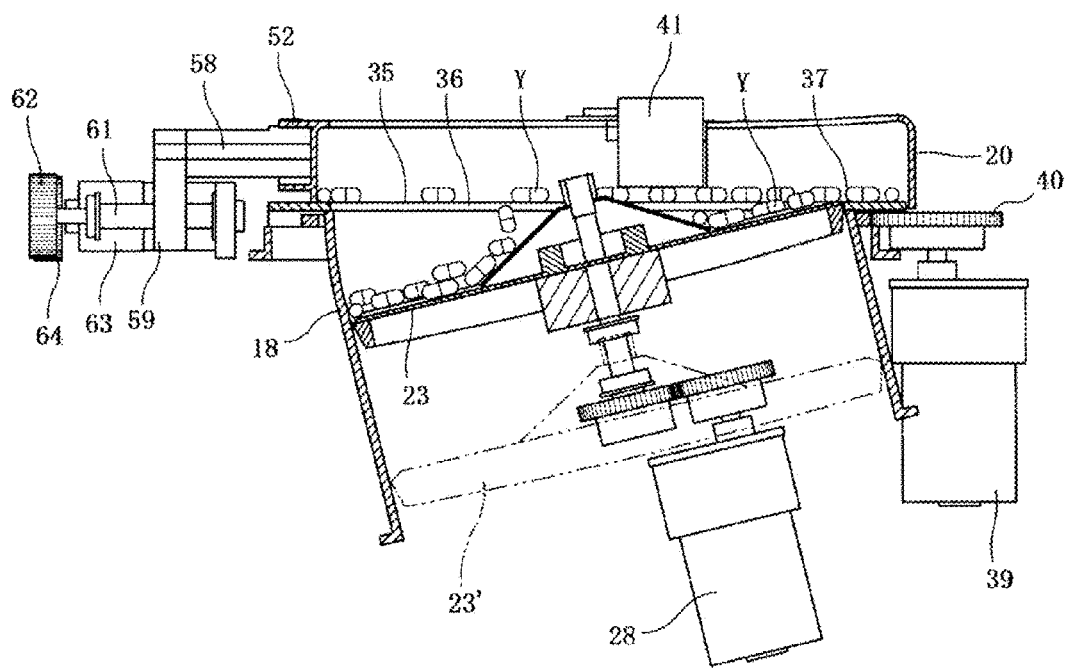
FIG. 26 is a cross-sectional view showing a modified example of the lifting movement mechanism of the first rotor.

The vertical movement mechanism of the second rotor 35 is not limited to the embodiment described above and, as shown in FIG. 26, the first rotor 23 may be lifted parallel to the first shaft 24.

Figure 27:
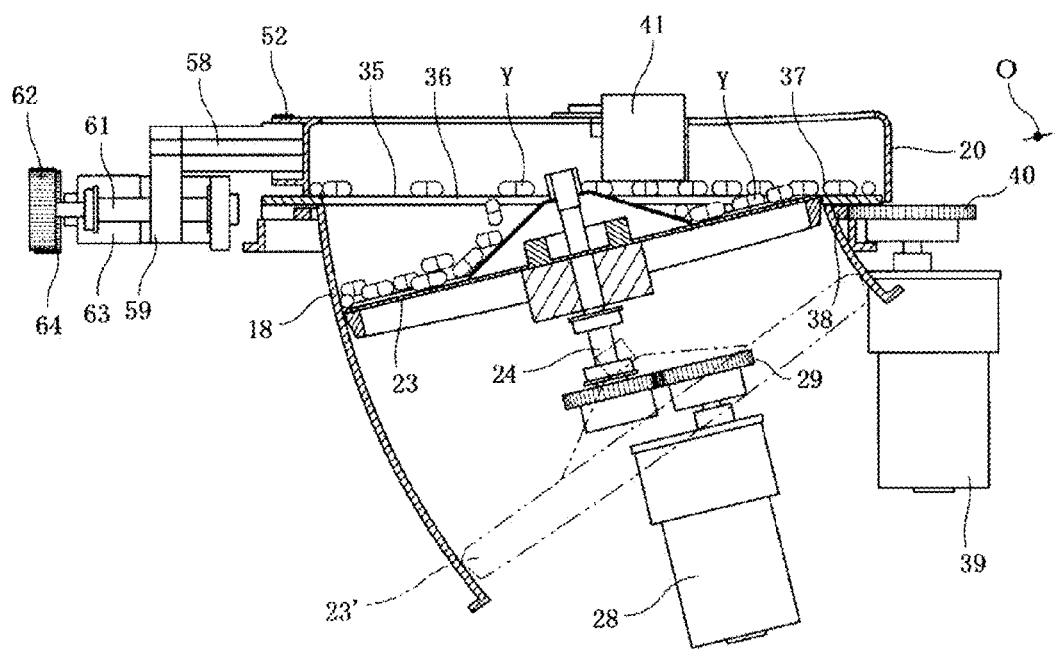
FIG. 27 is a cross-sectional view showing another modified example of the lifting movement mechanism of the first rotor.

Further, as shown in FIG. 27, it is also possible to elevate the first rotor 23 along an arc S with the point O as the center in the plane formed by the first shaft 24 of the first rotor 23 and the second shaft (not illustrated) of the second rotor 35. In this case, it is preferable to configure the center point O of the arc, though optional, such that highest position of the first rotor 23 is toward the center of the arc. With this, if the first rotor 23 is moved downward along the arc, the inclination of the first rotor 23 becomes larger. In general, the greater the quantity of the medicine loaded on the first rotor 23, the easier it is for the top surface of the medicine cluster to become flat. If the top surface of the medicine cluster is flat, the top surface of the medicine cluster on the lowest position of the first rotor 23 reaches the inner guide 66 of the second rotor 35, and will mix with the medicine that is being transported as a single line by the inner guide resulting in a problem of clogging of the medicine. However, as shown in FIG. 27, if the inclination of the first rotor 23 that has moved downward is larger, even if a large number of medicines are loaded on the first rotor 23, it will be difficult for the top surface of the medicines to become flat. As a result, in the vicinity of the inner guide 66, the top surface of the tablet cluster on the first rotor 23 will be lower than the second rotor 35, and the problem of occurrence of clogging due to mixing with the medicine transported on the second rotor 35 described above can be avoided.

(Medicine Supply System)

Figure 28:
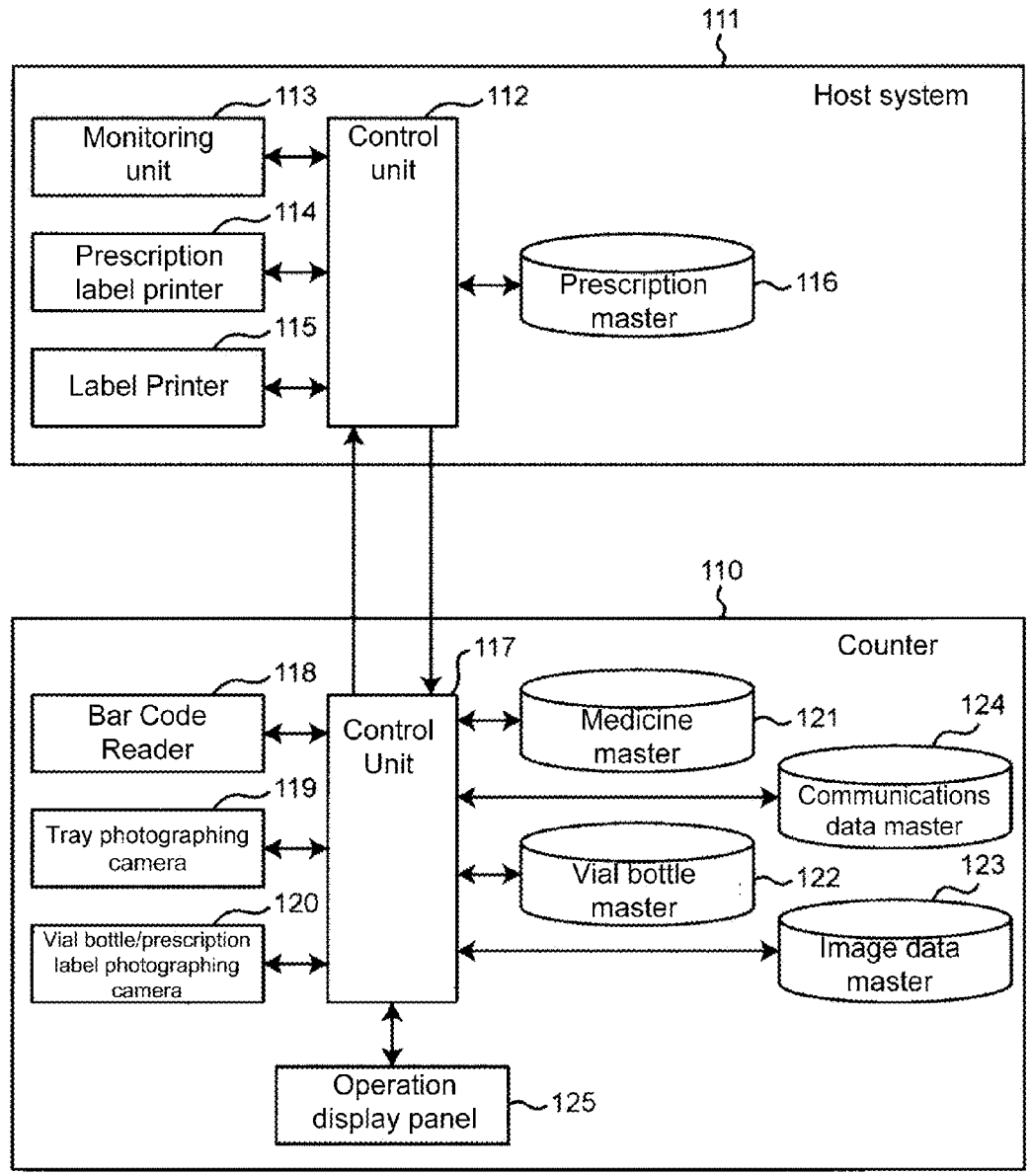
FIG. 28 is a block diagram of a medicine supply system.

The medicine supply system that processes the counting operation of the medicine counting device according to the present invention (hereinafter simply referred to as counter 110) by linking to the prescription data will be explained based on the block diagram of FIG. 28, flow charts of FIGS. 29 to 36, and screen diagrams of FIG. 37 to 43.

Several numbers of counters 110 are installed in a large pharmacy, and are connected along with other medicine feeding devices and medicine packaging devices to a host system 111111 of the pharmacy. There are resident pharmacists performing inspection of the host system 111111, and there are resident operators (medicine technicians) carrying out operation of the counter 110 on the counter 110 side.

A host system 111 is a system for dispensing required medicine as per the prescription data of a patient and supplying it to the patient. The host system 111, as shown in FIG. 28, is provided with:

a counter 110 or other medicine feeding device,
a control unit 112 for data communication with a medicine packaging device,
a monitoring unit 113 to verify the medicine to be supplied to the patient against the prescription data,
a prescription label printer 114 to print a label according to the prescription data,
a label printer 115 for printing the label to be pasted on to the vial bottle according to the prescription data, and
a prescription master 116 storing the prescription data, etc.

The counter 110 is provided with:
a control unit 117 that controls the operation of the counter 110 and also communicates data with a control unit 112 of the host host system 111,
a bar code reader 118 to read the bar code on a stock bottle of a prescription label or of medicine, and vial bottle,
a tray photographing camera 119 (similar to the third camera 89c in the embodiment described above) for photographing the medicine present on the tray (a medicine accommodation area primarily consisting of the first rotor 23, second rotor 35 and partition wall 18 of the embodiment described above) of the counter 110, and
a vial bottle/prescription label photographing camera 120 for photographing the vial bottle and the prescription supplied to the patient.

In addition, the counter 110 is provided with:
a medicine master 121 for storing the names, shapes, sizes and the like of various types of medicines,
a vial bottle master 122 for storing such as sizes of vial bottles and accommodating capacities of various types of medicines,
an image data master 123 for storing the images obtained with tray photographing camera 119 and vial bottle/prescription label photographing camera 120,
a communications data master 124 for storing the communication data received from or sent to the control unit 112 of the host host system 111, and
a touch-panel type operation display panel 125.

(Power-On and the Login Operation)

Figure 29:
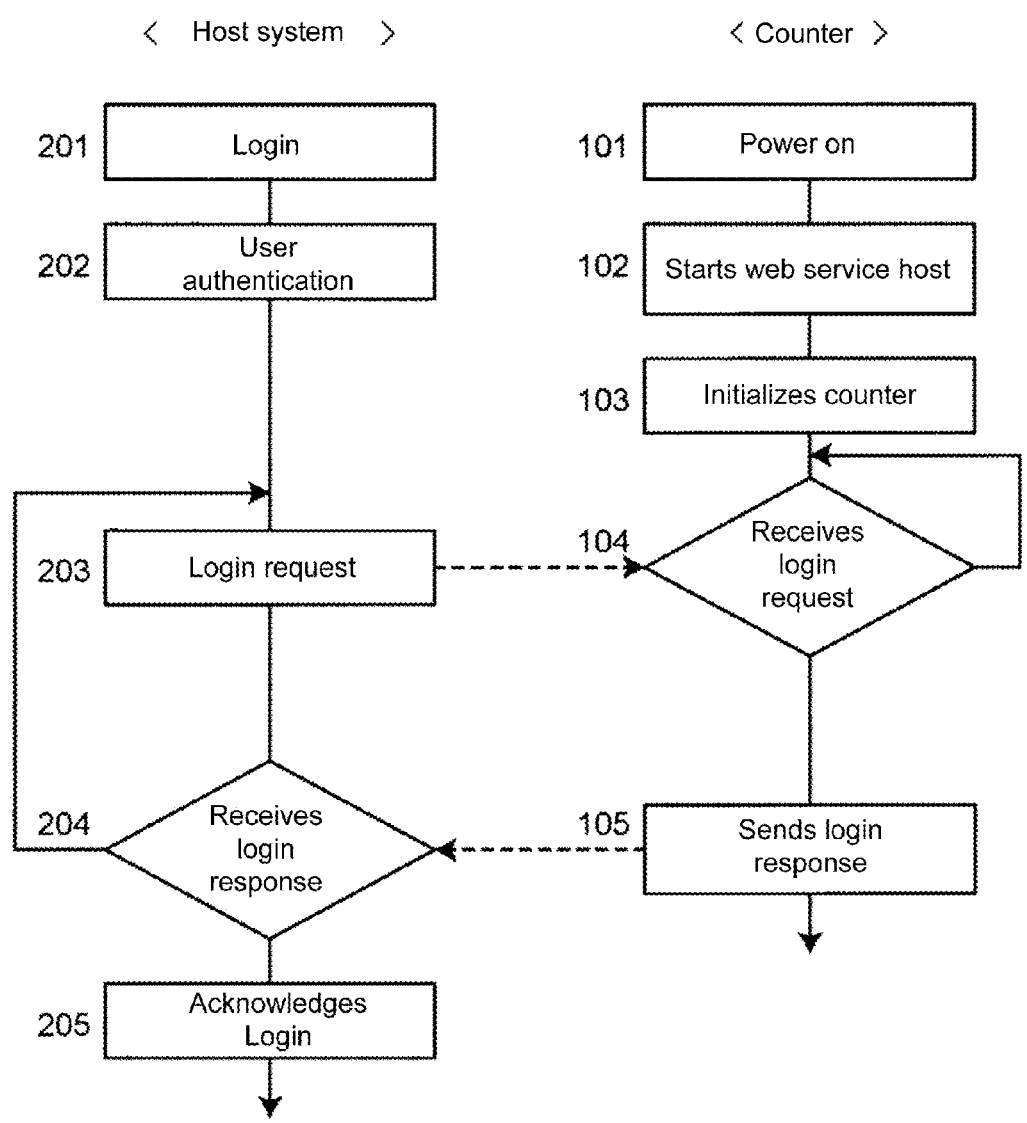
FIG. 29 is a flowchart showing the operation of a host system 111 and counter 110.
Figure 30:
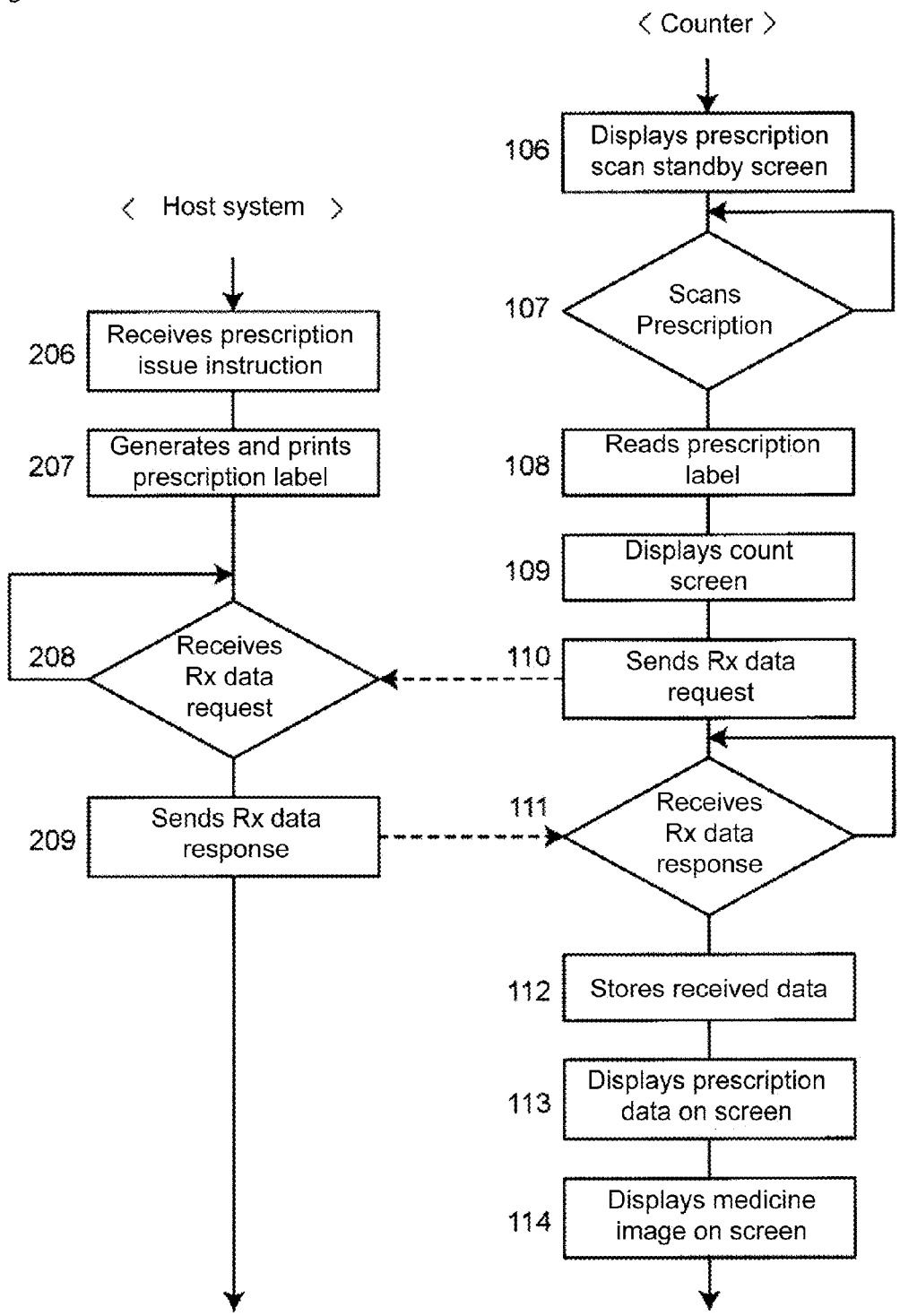
FIG. 30 is a flowchart continued from FIG. 29.
Figure 31:
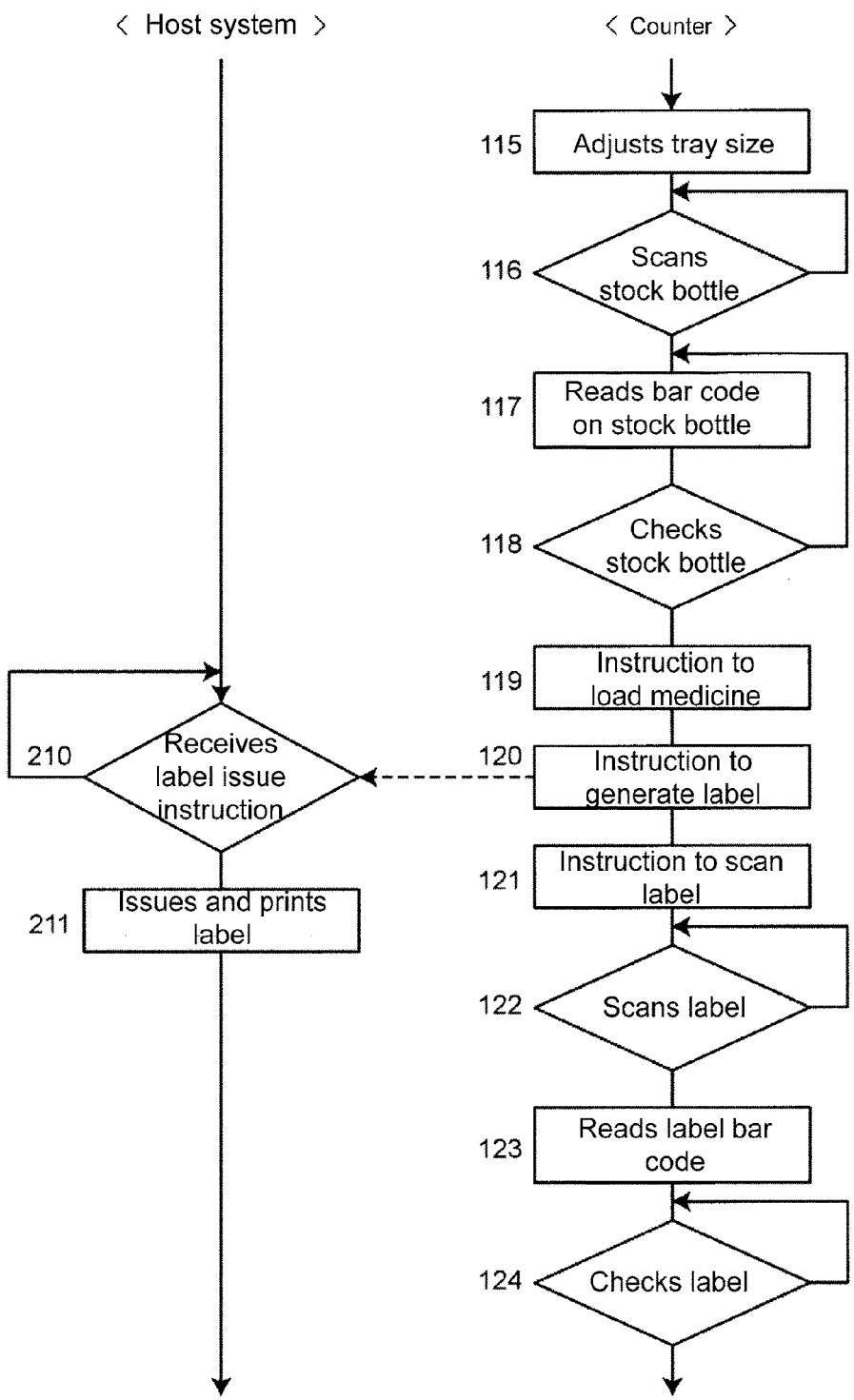
FIG. 31 is a flowchart continued from FIG. 30.
Figure 32:
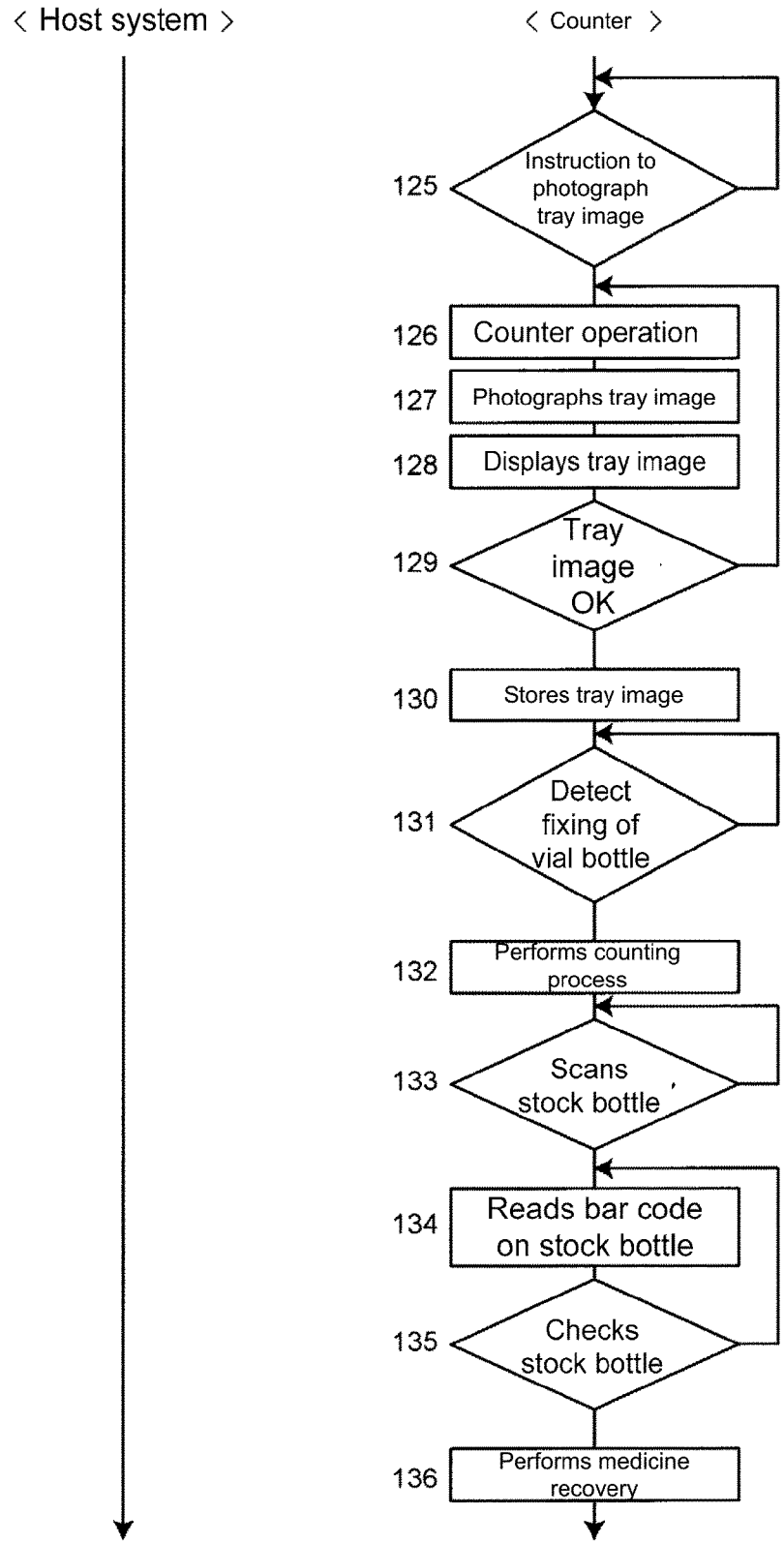
FIG. 32 is a flowchart continued from FIG. 31.
Figure 33:
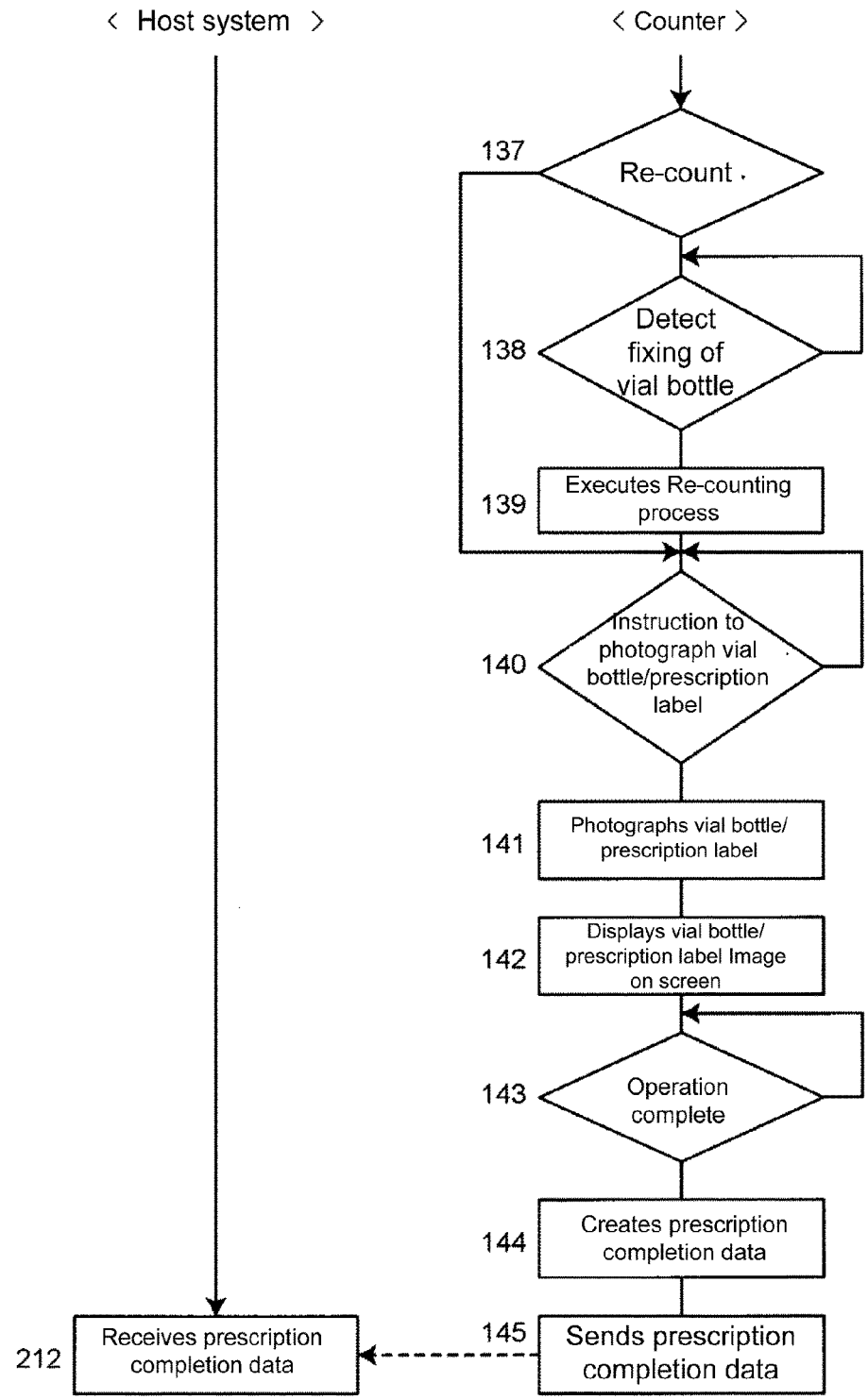
FIG. 33 is a flowchart continued from FIG. 32.

As shown in FIG. 29, on the counter 110 side, when an operator powers on the counter 110 (S101), the control unit 117 starts the application, awaits the login from the host system 111, starts the web service host (S102), and initializes the counter 110 (S103).

On the other hand, on the host system 111 side, when a pharmacist logs into the host system 111 (S201) based on the power-on of the counter 110, the control unit 112 of the host system 111 performs authentication of the user (S202) and forwards a login request to the counter 110 (S203). With this, when the login request from the host system 111 is received at the counter 110 (S104), the login response is sent to the host system 111 (S105). Upon receiving the login response from the counter 110, the host side system 111 acknowledges the login (S204). In this way, unless a login request from the host system 111 side is received, the counter 110 side cannot perform the counting process linking to prescription.

Figure 37:
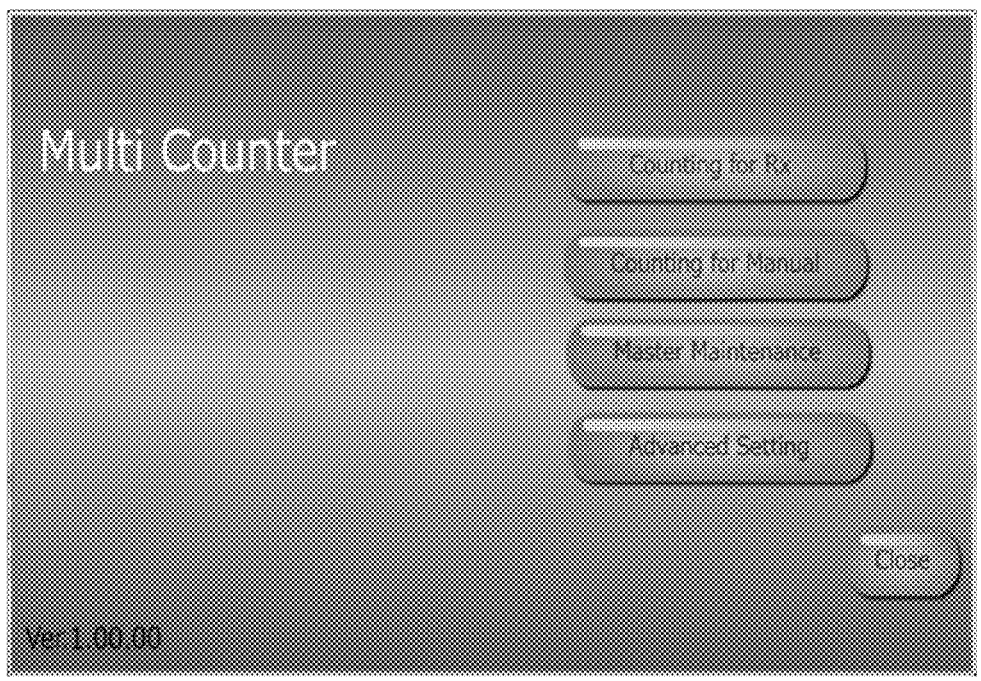
FIG. 37 shows a main menu screen of counter 110.

On login, a menu screen shown in FIG. 37 is displayed on the operation display screen of the counter 110. The menu screen is composed of a touch panel, and is provided with
a counting process (Counting for Rx) button for prescription wherein the counting process linked to prescription (Rx) is performed,
a manual counting process (Counting for manual) button wherein the counting of required quantity of medicine is performed without linking to prescription,
a master maintenance (Master Maintenance) button to add or correct a medicine in the medicine master 121, and
an advanced setting (Advanced Setting) button for environmental setting or the like.

(Medicine Prescription Process by the Counter)

Figure 38:
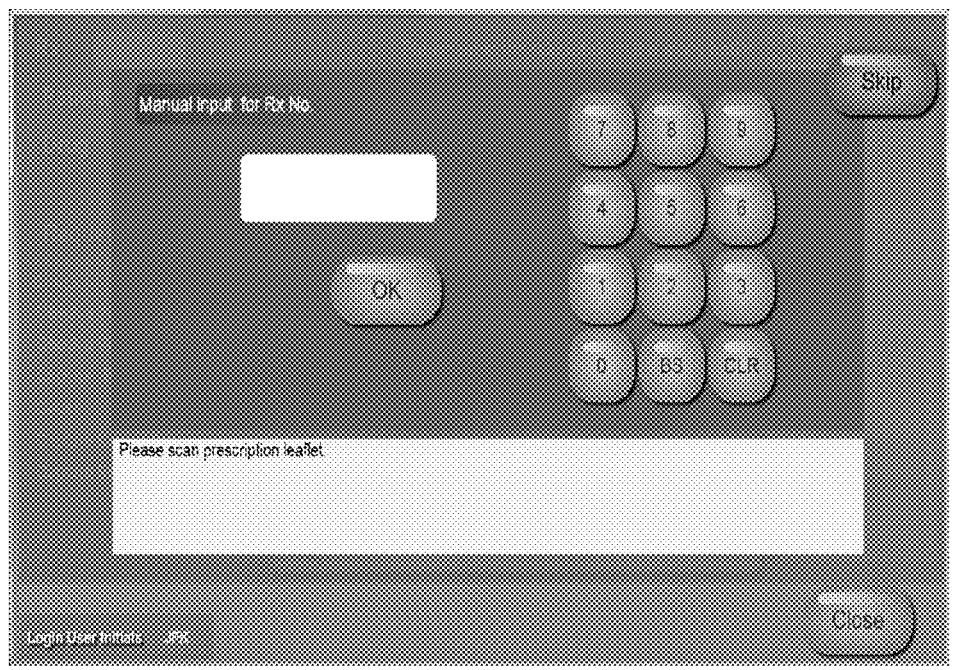
FIG. 38 shows the prescription scan standby screen.

When the operator of the counter 100 touches the button of the counting process for the prescription, a prescription scan standby screen shown in FIG. 38 is displayed (S106)

When the operator issues the prescription issue instruction to the host system 111, the control unit 112 of the host system 111 receives the prescription issue instructions (S206), generates the prescription label that is printed in the prescription label printer 114 (S207).

On the prescription scan standby screen of the counter 110, as it has been instructed to scan the prescription label as shown in FIG. 38, the operator receives the issued prescription, and scans with the bar code reader 118 of the counter 110. When the scan is performed (S107), the control unit 117 of the counter 110 reads the prescription label (S108), and displays the count screen shown in FIG. 39 (S109). Subsequently, the control unit sends Rx data request to the host system 111 for receiving detailed prescription information from the host system 111 (S110).

The host system 111, upon receiving the Rx data request from the counter 110 (S208), sends the Rx data response along with the prescription data (S209).

When the counter 110 receives the Rx data response (S111), in addition to storing the received data in the communications data master 124 (S112), also displays the prescription data (prescription number (Rx)), name of the patient (Patient), code and name of the medicine (Drug), and the requested amount (Request) on the count screen as shown in the diagram (S113), and searches the image of the medicine corresponding to the prescription data from the medicine master 121 and displays on the count screen (S114).

Figure 39:
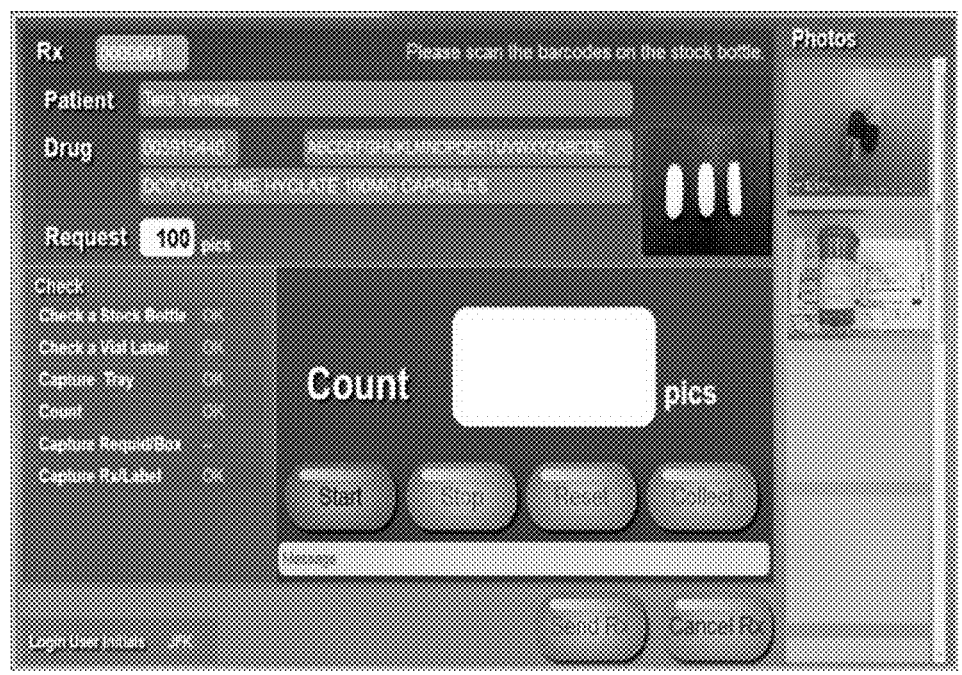
FIG. 39 shows the count screen after receiving the prescription.

Next, the control unit 117 of the counter 110 searches the size of the medicine corresponding to the prescription from the medicine master 121, and adjusts the tray size of the counter 110 according to the size of this medicine (S115). The tray size refers to the specified height by the height regulator 41 and the transport width of the second rotor 35 by the width regulator 52 described above. On the count screen, since it has been instructed to scan the stock bottle as shown in FIG. 39, the operator extracts the stock bottle corresponding to the medicine name of the prescription data, and scans with the bar code reader 118 of the counter 110. When scanning is done (S116), the control unit 117 of the counter 110 reads the stock bottle bar code (S117), checks whether the medicine of the stock bottle is the medicine to be counted (S118), and if correct, displays 'OK' for the item stock bottle check (Check a Stock Bottle) in the check (Check) column of the count screen of FIG. 39, and displays for loading the medicine (S119). When 'OK' is displayed and there is instruction for loading the medicine, the operator loads the medicine from stock bottle in the tray of the counter 110.

Next, the control unit 117 of the counter 110 issues instructions to the host system 111 for label generation (S120). The control unit 112 of the host host system 111, upon receiving the instruction from the counter 110 for issuing of label (S210), issues a label with the prescription data printed on a blank label in the label printer 115 (S211). The operator at the counter receives the issued label and pastes it onto the vial bottle. The control unit 117 of counter 110 instructs the count screen to scan the label (S121). With this, the operator scans the label pasted on the vial bottle with the bar code reader 118 of the counter 110. Following scanning (S122), the control unit 117 of the counter 110 reads the label bar code (S123), checks whether the prescription shown on the label is indeed the prescription to be counted (S124), and if correct, displays 'OK' for the item label check (Check a Vial Label) in the check (Check) column of the count screen of FIG. 39.

Figure 40:
FIG. 40 shows a camera image capture screen.

If the label check is 'OK', the operator instructs, in the count screen, start of the tray imaging. When the control unit 117 of the counter 110 receives instruction for start of the tray imaging (S125), the counter 110 operates (S126), captures the tray image (S127), and displays the captured tray image on the left side of the camera image capture screen (Live) in FIG. 40 (S128). The counter 110 is operated until the medicine on the first rotor 23 moves to the second rotor 35 and transported on the second rotor 35 and the medicine sensor 51 detects the arrival at the height regulator 41. The tray imaging captures in real time the image of the medicine stopped at this height regulator 41. The operator checks to confirm that the medicine in the tray image displayed on the camera image capture screen is same as the image of the prescription medicine (S129), and in case the stamping of the medicine or the like cannot be confirmed, the operation of the counter 110 is retried, and repeated till confirmation. The confirmation of the medicine and the instruction for retrying at this time is performed by the pharmacist who is in the monitoring unit 113 of the host system 111. If the image is confirmed (S129), 'OK' is displayed for the item tray image (Capture Tray) in the check (Check) column of the count screen of FIG. 39, and a tray image (Still picture) such as an image at the right-hand side of FIG. 40 is stored in the image data master 123 (S130).

If the tray image is 'OK', the operator fixes a vial bottle to the dispense section 78 of the counter 110. Once the fixing of the vial bottle is detected (S131), the control unit 117 of counter 110 performs the counting process (S132). When the counting is finished, the control unit 117 of the counter 110 displays 'OK' for the count (Count) item of the Check (check) column in addition to displaying the counted numerical value at the center of count screen. When the count becomes 'OK', because an instruction to scan the stock bottle (stock bottle) for recovering the medicine remaining in the tray will be displayed on the count screen, the stock bottle loaded with medicine is scanned by the bar code reader 118 of the counter 110. When the scanning is performed (S133), the control unit 117 of the counter 110 reads the stock bottle bar code (S134), checks whether the stock bottle is correct (S135), and if correct, medicine recovery process is performed (S136).

Although it is optional to recount the medicines that were counted by counter 110 and accommodated in a vial bottle for safety, if re-count is instructed by the operator (S137), and the fixing of the vial bottle is detected (S138), the control unit 117 of the counter 110 executes the process of re-counting (S139). After the re-count, the operator attaches the cap on the vial bottle, and places the vial bottle and the prescription label, which is in a state wherein the vial bottle is placed over the prescription label, underneath the vial bottle/prescription label photographing camera 120. Subsequently, the operator instructs imaging of vial bottle and prescription label on the count screen. Upon instruction for the imaging of vial bottle and prescription label (S140), the control unit 117 of the counter 110 photographs the vial bottle and prescription label (S141), and the captured image of the vial bottle and prescription label is displayed in the second tier of photograph column on the count screen (S142). In case it is not possible to confirm the contents of the label of the vial bottle or the prescription label from the captured image, it is possible to retry capturing an image of the vial bottle and prescription label When the host system 111 side pharmacist confirms the completion of a sequence of operations (S143), the control unit 117 of the counter 110 creates the prescription completion data (S144), and forwards the prescription completion data to the host system 111 (S145). The control unit 112 of the host host system 111 receives the prescription completion data (S212), and discontinues the sequence of operations.

(Splitting of Vial Bottles)

Figure 41:
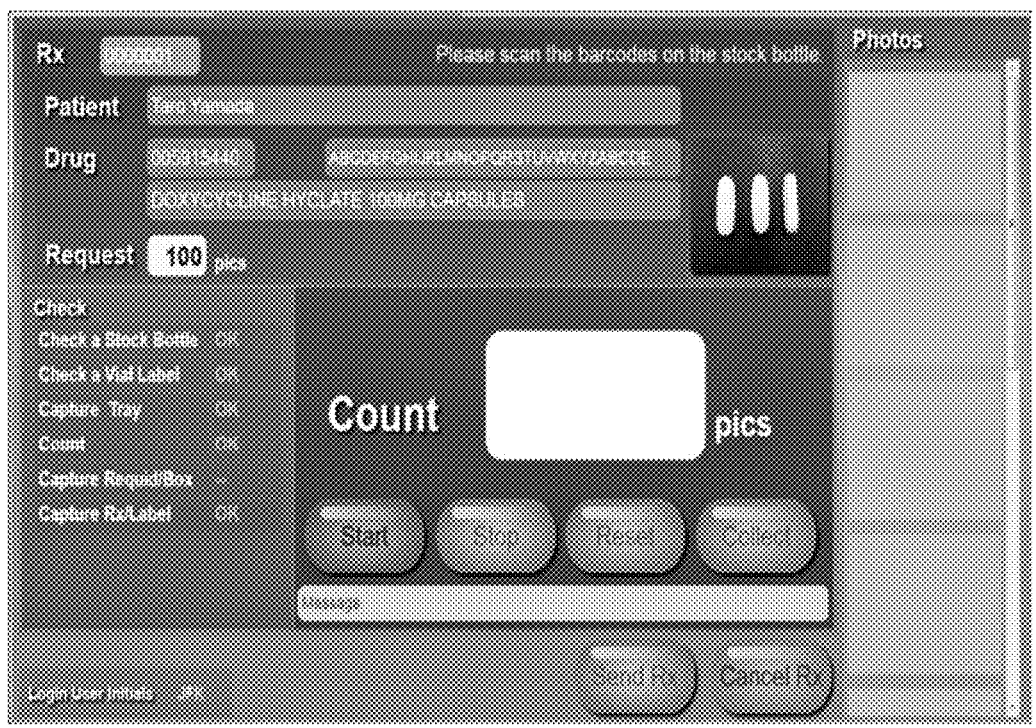
FIG. 41 shows a count screen when the vial bottles are split.
Figure 42:
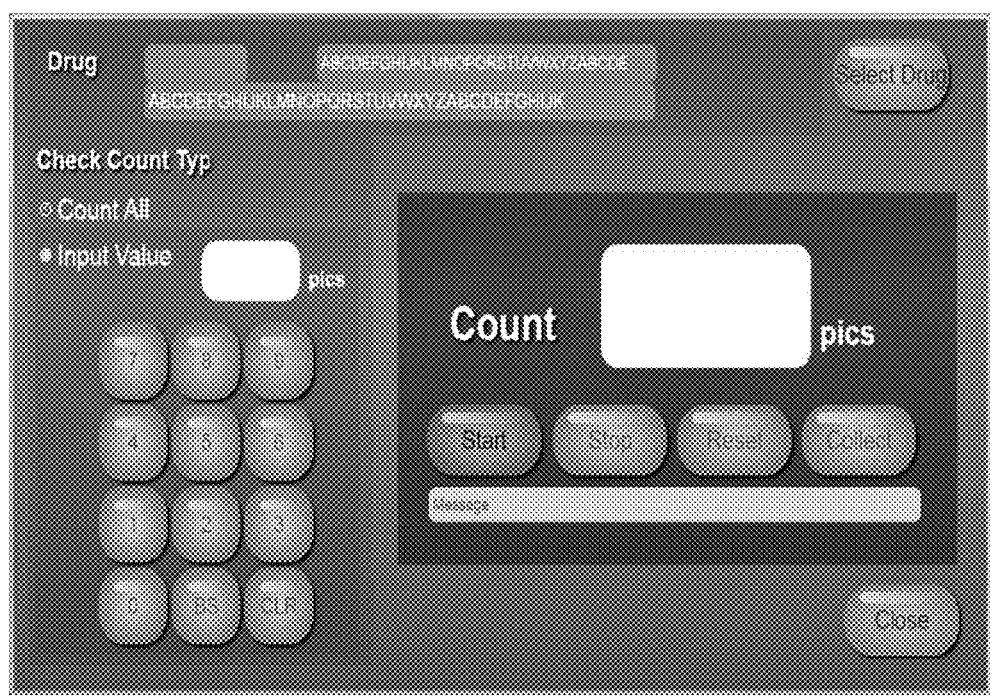
FIG. 42 shows manual count screen.

Although the control unit 117 of the counter 110 selects the size of the vial bottle based on the prescription data, in case the prescription amount cannot be accommodated in a single vial bottle, as shown in the screen of FIG. 41, multiple vial bottles (in the example of FIG. 41, 40DR 3 parts) are displayed in the vial bottle split (Split Vial) column, which indicates accommodating of 40 medicines in 2 vial bottles, and 20 medicines in one remaining vial bottle, and thereby a predetermined quantity is counted and put into each vial bottle accordingly.

(Processing of Shortage)

During the counting process, in case the medicine in the tray becomes exhausted before finishing counting the prescribed quantity of a medicine, i.e. if the tablet detecting sensor is not detecting the medicine, it results in state of shortage. In this case, it is necessary to add the medicine into the tray.

Figure 34:
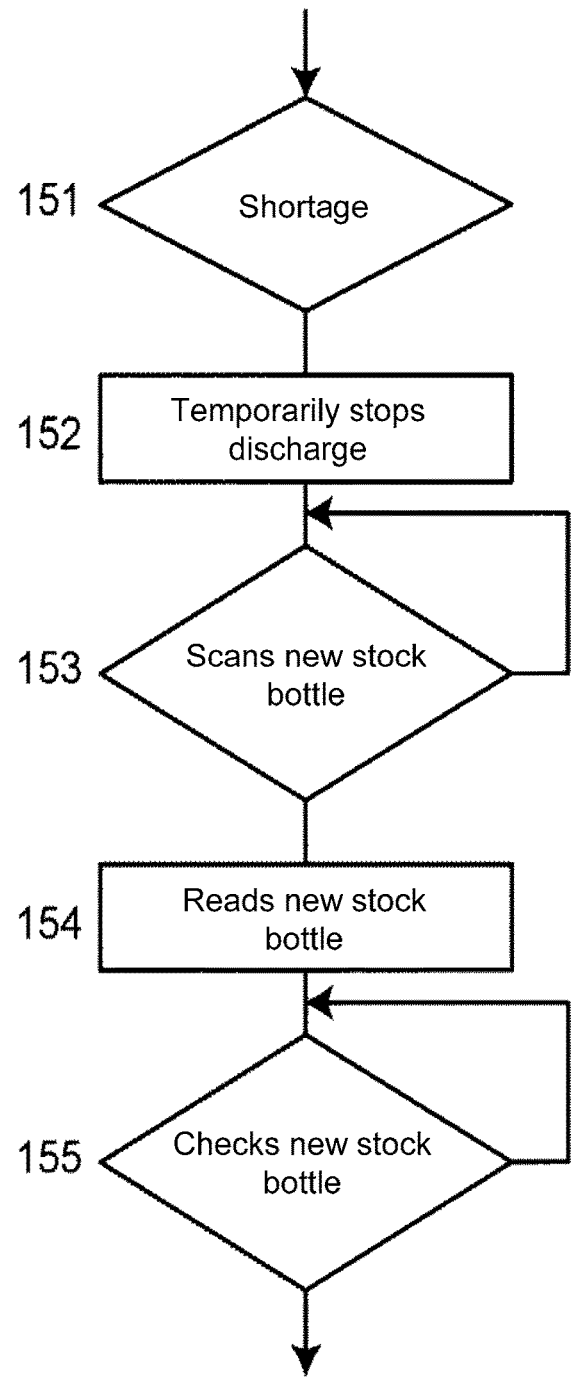
FIG. 34 is a flowchart showing the processing of a shortage.

As shown in FIG. 34, if a shortage is inferred (S151), the control unit 117 of the counter 110 temporarily stops the discharge and counting of the medicine (S152), and instructs for scanning of new stock bottle. The operator takes a new stock bottle corresponding to the medicine name of the prescription data, and scans it with the bar code reader 118 of the counter 110. When the scanning is performed (S153), the control unit 117 of the counter 110 reads the new stock bottle bar code (S154), and checks whether the medicine of the new stock bottle is the intended medicine to be counted (S118). The counting process (S132) is continued subsequently.

(Processing of Liquid Medicines and Packaged Medicine Other Than Tablets)

Bottles of liquid medicines or packaged medicines containing medicine in a box cannot be counted with the counter 110. However, it will be possible to monitor them by the counter 110 in conjunction with prescription.

Figure 35:
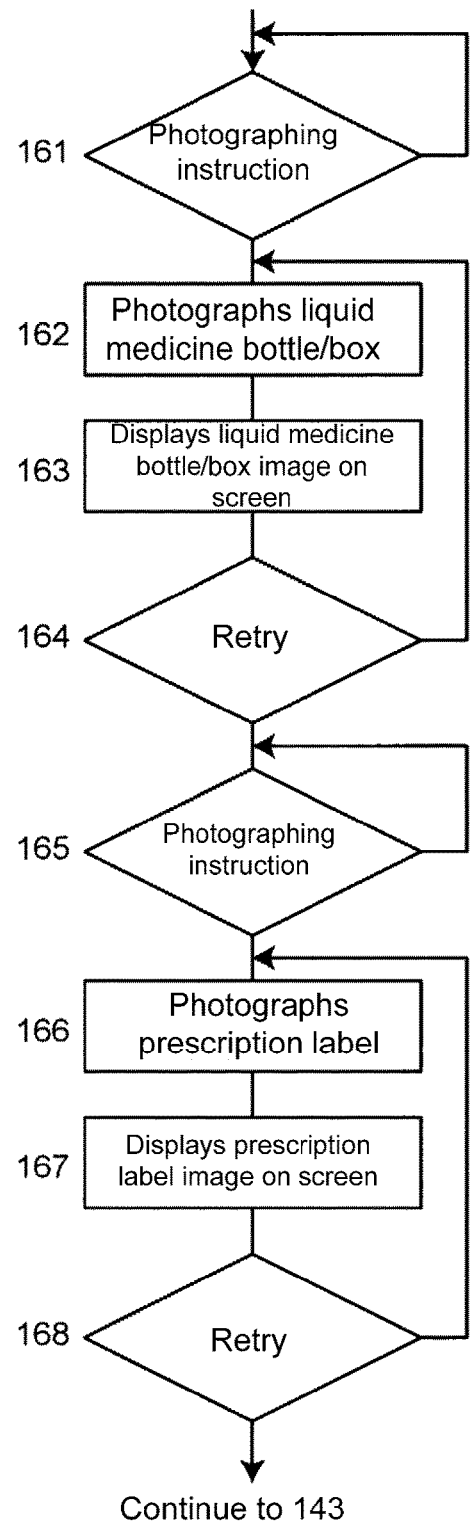
FIG. 35 is a flowchart showing the processing of solutions and boxes.
Figure 36:
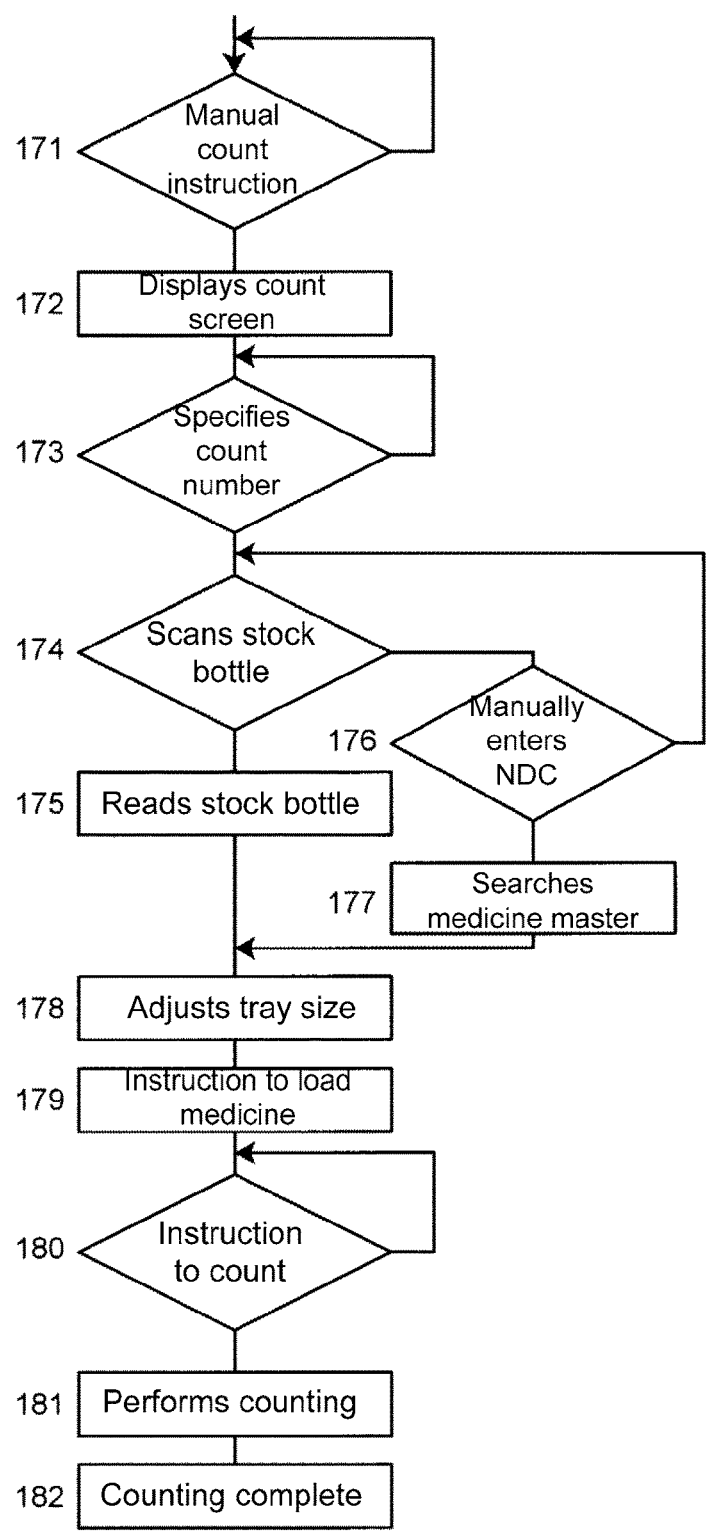
FIG. 36 is a flowchart showing the processing of manual count.

In case of prescriptions of liquid medicine or packaged medicine, the operator places the bottle of the liquid medicine, or the box underneath the vial bottle/prescription label photographing camera 120. Then, the operator instructs the imaging of liquid medicine bottle and box on the count screen. As shown in FIG. 35, when there is instruction for imaging of liquid medicine bottle and box (S161), the control unit 117 of the counter 110 captures the image of liquid medicine bottle and box (S162), and displays the image of liquid medicine bottle and box in the second tier of the image column of the count screen (S163). In case it is not possible to confirm the content of labels of the liquid medicine bottle and box from the captured image, it is possible to retry taking an image of the liquid medicine bottle and box (S164).

Next, the operator places prescription label of the liquid medicine bottle and box underneath the vial bottle/prescription label photographing camera 120. Then, the operator instructs prescription label imaging on the count screen. Upon instruction for the imaging of prescription label (S165), the control unit 117 of the counter 110 photographs the prescription label (S166), and the captured image of the prescription label is displayed in the third tier of photograph column on the count screen (S167). Further, in case the contents of the prescription label cannot be confirmed from the captured image, it is possible to retry the operation of imaging the prescription label (S168).

Processes following completion of a sequence of operation are same as after step S143.

(Manual Counting)

The medicine counting device according to the present invention can also be employed to manually count for only counting medicine without linking to prescription data.

When carrying out such manual counting, the operator touches the manual count processing button on the menu screen shown in FIG. 37. If there is instruction for manual counting (S171), the control unit 117 of the counter 110 displays manual dispense screen shown in FIG. 42 (S172). The operator specifies the required count number using the numeric keypad on the screen, takes the stock bottle to be counted, either scans with the a bar code reader 118 of the counter 110, or manually inputs the NDC on the screen.

When the scanning is done (S174), the control unit 117 of counter 110 reads the stock bottle bar code (S175). Or when manually entering the NDC (S176), medicine master 121 is searched to identify the medicine (S177). Next, the control unit 117 of counter 110 adjusts the tray size of the counter 110, i.e., the stipulated height by the height regulator 41 and transfer width of the second rotor 35 by the width regulator 52 based on the size of the medicine (S178). Next, the control unit 117 of the counter 110 prompts to charge the medicine in the tray (S179), and in case there is count instruction (S180), performs the counting (S181) and completes the counting process (S182).

In the manual count process, it is possible to select 'Count All' or 'Input Value' for specifying the count number. When "Count All" is selected, and when all the medicine loaded in the tray has been counted, it will end. When "Input Value" is selected, the input quantity is counted. In this case, if the number of medicines is less than the input quantity, shortage processing described above is carried out. In this shortage processing, it is necessary to scan the stock bottle NDC code to check whether it is same as the medicine being counted.

In the embodiment described above, although a medicine feeding device was employed in a medicine counting device, it is also possible to use it in medicine packaging devices wherein a large variety of medicines are respectively housed in cassettes, and a predetermined medicine is packed according to the prescription labels.

While the principles of the disclosure have been described above in connection with specific apparatuses and methods, it is to be clearly understood that this description is made only by way of example and not as limitation on the scope of the disclosure.

What is claimed is:

1. A medicine feeding device, comprising:
   a first rotor configured to rotate around a first axis;
   a second rotor in annular shape configured to rotate around a second axis extending in a direction different from that of the first axis;
   a partition wall extending from an inner circumference of the second rotor toward an outer circumference of the first rotor; and
   a medicine discharging port provided outside in a radial direction of the second rotor, wherein:
      a medicine fed to the first rotor is transferred by rotation of said first rotor to the second rotor from a transfer part,
      the medicine transferred to the second rotor is transported to a downstream side of the transfer part towards the medicine discharging port in a rotating direction by rotation of said second rotor, and
      a transport width of the second rotor is adjustable based, at least in part, on the medicine transferred to the second rotor.

2. The medicine feeding device according to claim 1, wherein the transport width of the second rotor is less than a full width of medicine transferred to the second rotor.

3. The medicine feeding device according to claim 2, wherein the transport width of the second rotor is equal to or greater than ½ of the full width of medicine transferred to the second rotor.

4. The medicine feeding device according to claim 1, further comprising a height regulator positioned between the transfer part and the medicine discharging port so as to have an adjustable gap which is approximately the same as a height of the medicine transferred to the second rotor from an upper surface of the second rotor.

5. The medicine feeding device according to claim 4, further comprising a width regulator positioned between the height regulator and a medicine guiding section, wherein width regulator comprises a width regulating section which is partially positioned above the second rotor and is movable in a radially outward direction of the second rotor so as to adjust the transport width of the second rotor based, at least in part, on the medicine transferred to the second rotor.

6. The medicine feeding device according to claim 1, further comprising a width regulator having a width regulating section which is partially positioned above the second rotor and is movable in a radially outward direction of the second rotor so as to adjust the transport width of the second rotor based, at least in part, on the medicine transferred to the second rotor.

7. The medicine feeding device according to claim 1 further comprising a medicine guiding section configured to guide the medicine transferred to the second rotor to the medicine discharging port, wherein the medicine guiding section comprises:
   an inner guide provided downstream of a medicine transport direction alongside the second rotor which extends from an inner circumference of the second rotor towards the medicine discharging port, wherein a tip of the inner guide at an upstream side of the rotating direction of the second rotor is positioned on an inside of said inner circumference of the second rotor; and
   an outer guide provided in parallel with respect to the inner guide in a radially outward direction of the second rotor and having a gap width which is approximately the same as a width of medicine.

8. The medicine feeding device according to claim 7, wherein the tip of the inner guide of the medicine guiding section is provided with an inclined edge inclining upward at a predetermined angle.

9. The medicine feeding device according to claim 1, wherein an angle between the first axis of the first rotor and the second axis of the second rotor is configured to be mutually variable.

10. A medicine feeding device, comprising:
a first rotor configured to rotate around a first axis;
a second rotor configured to rotate around a second axis extending in a direction different from that of the first axis such that an outer circumference of the first rotor forms a small step with respect to an inner circumference of the second rotor, wherein the second rotor is positioned above the first rotor and forms a ring as viewed in an axial direction of said second axis;
a partition wall extending from the inner circumference of the second rotor toward the outer circumference of the first rotor; and
a medicine discharging port provided outside in a radial direction of the second rotor, wherein:
a medicine fed to the first rotor is transferred by rotation of said first rotor to the second rotor from the small step formed between the outer circumference of the first rotor and the inner circumference of the second rotor,
the medicine transferred to the second rotor is transported to a downstream side of the small step towards the medicine discharging port in a rotating direction by rotation of said second rotor, and
a transport width of the second rotor is adjustable based, at least in part, on the medicine transferred to the second rotor.

11. The medicine feeding device according to claim 10, wherein the transport width of the second rotor is less than a full width of medicine transferred to the second rotor.

12. The medicine feeding device according to claim 11, wherein the transport width of the second rotor is equal to or greater than ½ of the full width of medicine transferred to the second rotor.

13. The medicine feeding device according to claim 10, further comprising a height regulator provided downstream of the transfer part alongside of the second rotor which is positioned between the transfer part and the medicine discharging port so as to have an adjustable gap which is approximately the same as a height of the medicine transferred to the second rotor from an upper surface of the second rotor.

14. The medicine feeding device according to claim 13, further comprising a width regulator positioned between the height regulator and a medicine guiding section, said width regulator comprises a width regulating section which is partially positioned above the second rotor and is movable in a radially outward direction of the second rotor so as to adjust the transport width of the second rotor based, at least in part, on the medicine transferred to the second rotor.

15. The medicine feeding device according to claim 10, further comprising a width regulator having a width regulating section which is partially positioned above the second rotor and is movable in a radially outward direction of the second rotor so as to adjust the transport width of the second rotor based, at least in part, on the medicine transferred to the second rotor.

16. The medicine feeding device according to claim 10 further comprising a medicine guiding section configured to guide the medicine transferred to the second rotor to the medicine discharging port, wherein the medicine guiding section comprises:
an inner guide provided downstream of a medicine transport direction alongside the second rotor which extends from an inner circumference of the second rotor towards the medicine discharging port, wherein a tip of the inner guide at an upstream side of the rotating direction of the second rotor is positioned on an inside of said inner circumference of the second rotor; and
an outer guide provided in parallel with respect to the inner guide in a radially outward direction of the second rotor and having a gap width which is approximately the same as a width of medicine.

17. The medicine feeding device according to claim 16, wherein the tip of the inner guide of the medicine guiding section is provided with an inclined edge inclining upward at a predetermined angle.

18. The medicine feeding device according to claim 10, wherein an angle between the first axis of the first rotor and the second axis of the second rotor is configured to be mutually variable.

19. A medicine counting device provided with a medicine feeding device, comprising:
a first rotor configured to rotate around a first axis;
a second rotor in annular shape configured to rotate around a second axis extending in a direction different from that of the first axis;
a partition wall extending from an inner circumference of the second rotor toward an outer circumference of the first rotor; and
a medicine discharging port provided outside in a radial direction of the second rotor, wherein:
a medicine fed to the first rotor is transferred by rotation of said first rotor to the second rotor from a transfer part,
the medicine transferred to the second rotor is transported to a downstream side of the transfer part towards the medicine discharging port in a rotating direction by rotation of said second rotor, and
a transport width of the second rotor is adjustable based, at least in part, on the medicine transferred to the second rotor;
a medicine detector means for detecting a medicine that is discharged from the medicine discharging port; and
a counting means for counting number of medicines supplied based on a detection performed by the medicine detector means.

* * * * *